(12) United States Patent
Smith

(10) Patent No.: US 6,901,430 B1
(45) Date of Patent: May 31, 2005

(54) ONLINE SYSTEM AND METHOD OF LOCATING CONSUMER PRODUCT HAVING SPECIFIC CONFIGURATIONS IN THE ENTERPRISE PRODUCTION PIPELINE AND INVENTORY

(75) Inventor: Stephen Smith, White Lake, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/539,392

(22) Filed: Mar. 31, 2000

Related U.S. Application Data
(60) Provisional application No. 60/163,755, filed on Nov. 5, 1999.

(51) Int. Cl.[7] ............................................. G06F 15/16
(52) U.S. Cl. ........................... 709/206; 705/16; 705/22; 705/26; 705/28; 705/29
(58) Field of Search ........................... 709/206; 705/16, 705/22, 26–29

(56) References Cited

U.S. PATENT DOCUMENTS

| | | | |
|---|---|---|---|
| 5,757,917 A | | 5/1998 | Rose et al. .................... 380/25 |
| 5,758,328 A | * | 5/1998 | Giovannoli .................. 705/26 |

(Continued)

OTHER PUBLICATIONS

Tamara Gignac, "Descarte tracks inventory through cyberspace" Computer Dealer News; Willowdale; Dec. 21, 1998.*

Wallace et al. "Drive to the Web—Automaker fight back as online services challenge traditional business models." Sep. 27, 1999, Information Week, 22, ISSn 8750–6874.*

Moad, Jeff, "Web over haul" Dec. 23, 1996 PC Week, v13, n51, pE1(3), ISSN: 0740–1604.*

Auto–By–Tel "Http://www.autobytel.com/index.cfm" Dec. 12, 1997.* wysiwyg://132/http://carpoint.msn.com/home/New.asp new–car buying service.

http://www.autobytei.com/content/buy/Newindex.cfm?id= abt New car purchase Center.

http://www.ford.com/default.asp?pageid=114 Buyer Connection.

wysiwyg://45/http://www.gmbuypower.applications.Session.Driver the gmexperiencelive.

(Continued)

*Primary Examiner*—Hosain Alam
*Assistant Examiner*—Liang-che Alex Wang
(74) *Attorney, Agent, or Firm*—Brooks Kushman P.C.; David B. Kelley

(57) ABSTRACT

An online system of locating consumer product having specific configuration in an enterprise production pipeline and inventory is provided. The system includes a locate client process operable to receive product configuration data and generate a search request message incorporating the product configuration data in response to user input, and an inventory database storing product availability data in the enterprise production pipeline and in inventory. A locate server process is operable to receive the search request message from the locate client process, and search the product availability data in the inventory database for products matching and substantially matching the product configuration data. The locate server is further operable to generate a search reply message containing the matching products and return the search reply message to the locate client process.

43 Claims, 40 Drawing Sheets

U.S. PATENT DOCUMENTS

| | | | |
|---|---|---|---|
| 5,765,139 A | 6/1998 | Bondy | 705/8 |
| 5,774,873 A | 6/1998 | Berent et al. | 705/26 |
| 5,794,219 A | 8/1998 | Brown | 705/37 |
| 5,802,497 A | 9/1998 | Manasse | 705/27 |
| 5,809,479 A | 9/1998 | Martin et al. | 705/11 |
| 5,826,241 A | 10/1998 | Stein et al. | 705/26 |
| 5,839,112 A | 11/1998 | Schreitmueller et al. | 705/4 |
| 5,878,401 A * | 3/1999 | Joseph | 705/22 |
| 5,884,300 A * | 3/1999 | Brockman | 707/3 |
| 5,887,271 A | 3/1999 | Powell | |
| 5,890,137 A | 3/1999 | Koreeda | 705/26 |
| 5,890,138 A | 3/1999 | Godin et al. | 705/26 |
| 5,895,454 A | 4/1999 | Harrington | 705/26 |
| 5,897,622 A | 4/1999 | Blinn et al. | 705/26 |
| 5,899,980 A | 5/1999 | Wilf et al. | 705/26 |
| 5,905,974 A | 5/1999 | Fraser et al. | 705/37 |
| 5,905,975 A | 5/1999 | Ausubel | 705/37 |
| 5,913,210 A | 6/1999 | Call | |
| 5,950,173 A | 9/1999 | Perkowski | |
| 5,960,408 A | 9/1999 | Martin et al. | 705/11 |
| 5,960,411 A | 9/1999 | Hartman et al. | 705/26 |
| 5,970,472 A | 10/1999 | Allsop et al. | 705/26 |
| 5,970,475 A | 10/1999 | Barnes et al. | 705/27 |
| 5,983,199 A | 11/1999 | Kaneko | 705/26 |
| 5,991,739 A * | 11/1999 | Cupps et al. | |
| 6,009,413 A | 12/1999 | Webber et al. | 705/26 |
| 6,012,045 A | 1/2000 | Barzilai et al. | 705/37 |
| 6,014,628 A | 1/2000 | Kovarik, Jr. | |
| 6,016,504 A * | 1/2000 | Arnold et al. | 709/200 |
| 6,047,264 A * | 4/2000 | Fisher et al. | 705/26 |
| 6,070,149 A * | 5/2000 | Tavor et al. | 705/26 |
| 6,125,391 A * | 9/2000 | Meltzer et al. | 709/223 |
| 6,141,653 A * | 10/2000 | Conklin et al. | 705/80 |
| 6,167,448 A * | 12/2000 | Hemphill et al. | 709/224 |
| 6,339,763 B1 * | 1/2002 | Divine et al. | 705/27 |
| 6,341,271 B1 * | 1/2002 | Salvo et al. | 705/28 |
| 6,341,282 B1 * | 1/2002 | Sharpe et al. | 707/3 |
| 6,379,212 B1 * | 4/2002 | Miller | 446/85 |

OTHER PUBLICATIONS http://www.gateway.com/home/index.shtml Choose.

U.S. Appl. No. 09/532,833 entitled *Method of Conducting Online Competitive Price Quoting Events,* filed Mar. 21, 2000, 60 pages.

U.S. Appl. No. 09/561,644 entitled *Method and System for Configuring and Ordering Consumer Product,* filed May 2, 2000, 31 pages.

U.S. Appl. No. 09/538,516 entitled *Communication Schema of Online System and Method of Status Inquiry and Tracking Related to Orders for Consumer Product Having Specific Configurations,* filed Mar. 29, 2000, 122 pages.

U.S. Appl. No. 09/537,190 entitled *Online System and Method of Status Inquiry and Tracking Related to Orders for Consumer Product Having Specific Configurations,* filed Mar. 29, 2000, 118 pages.

U.S. Appl. No. 09/542,413 entitled *Online System and Method of Reporting Related to Orders for Consumer Product Having Specific Configurations,* filed Apr. 1, 2000, 119 pages.

U.S. Appl. No. 09/542,637 entitled *Communication Schema of Online System and Method of Ordering Consumer Product Having Specific Configurations,* filed Apr. 14, 2000, 122 pages.

U.S. Appl. No. 09/543,833 entitled *Communication Schema of Online Reporting System and Method Related to Online Orders for Consumer Products Having Specific Configurations,* filed Apr. 5, 2000, 118 pages.

U.S. Appl. No. 09/543,686 entitled *Online System and Method of Ordering and Specifying Consumer Product Having Specific Configurations,* Apr. 5, 2000, 119 pages.

U.S. Appl. No. 09/543,860 entitled *Communication Schema of Online System and Method of Locating Consumer Product in the Enterprise Production Pipeline,* filed Apr. 5, 2000, 135 pages.

MSN CarPoint web page at http://carpoint.msn.com/newcar/default.asp?src=home New–Car buying service, ©2000, 5 pages.

ATKearney, "Creating Supply Advantage$^{SM}$,"Computer–Aided Sourcing System, $CAS^3$ Auction Discussion at Ford, Mar. 19, 1999, 19 pages.

FREEMARKETS ONLINE®, Online Industrial Market Making Brochure, date unknown, pp. 1–12.

Timothy Aeppel, "Bidding for E–Nuts and E–Bolts On the Net," Reprinted from *The Wall Street Journal*, Mar. 12, 1999, 2 pages.

Glen Meakem, "How Bazaar," *CIO WebBusiness,* Section Two, Aug. 1, 1998, 5 pages.

FreeMarkets, *Publicity,* <http://www.freemarkets.com/scripts/publicity.asp>, date unknown, 10 pages.

"The $300 Billion Stealth Economy," *Inc. Technology* 1998, No. 3, reprinted with permission of Inc. magazine, copyright 1998, *Goldhirsh Group, Inc.,* 4 pages.

Scott Woolley, "E–muscle," Technology Web Solver, undated, reprinted by permission of *FORBES* magazine, Mar. 9, 1998 Issue, © 1998, *FORBES Inc.*, 1 page.

Clinton Wilder, "Electronic Purchasing—What's Your Bid, "*Informationweek,* Nov. 10, 1997, 4 pages.

Robert D. Hof, "the Buyer Always Wins," *BusinessWeek,* undated, reprinted from *BusinessWeek,* Mar. 22, 1999 copyright by *The McGraw–Hill Companies, Inc.,* 2 pages.

UBid.com Help Pages, <wysiwyg://8/http://www.ubid.com/help/auctions.asp>, date unknown, 11 pages.

BuyGroup.com web page, <http://ag.buygroup.com/>, date unknown, 3 pages.

CattelOfferings.com web page, <http://www.CattleOfferings.com/>, *Cattle Offerings Worldwide & Farms.com,* copyright 1999, 10 pages.

Marex.com web page, <http://www.marex.com/about/about.asp>, date unknown, 2 page.

FastParts.com web page, <http://webt1.sanjose.fastparts.com/>, date unknown, 4 pages.

MetalSite web page, <http://www.MetalSite.com/>, *MetalSite, L.P.,* Copyright 1999, 8 pages.

Chemdex Accelerating Science web page, <wysiwyg://36/http://www.Chemdex.com/about_chemdex/index.html>, *Chemdex Corporation,* copyright 1999, 32 pages.

eBay™ web page, <wysiwyg://19/http://www.ebay.com/index.html>, *eBay, Inc.,* Copyright 1995–2000, 26 pages.

* cited by examiner

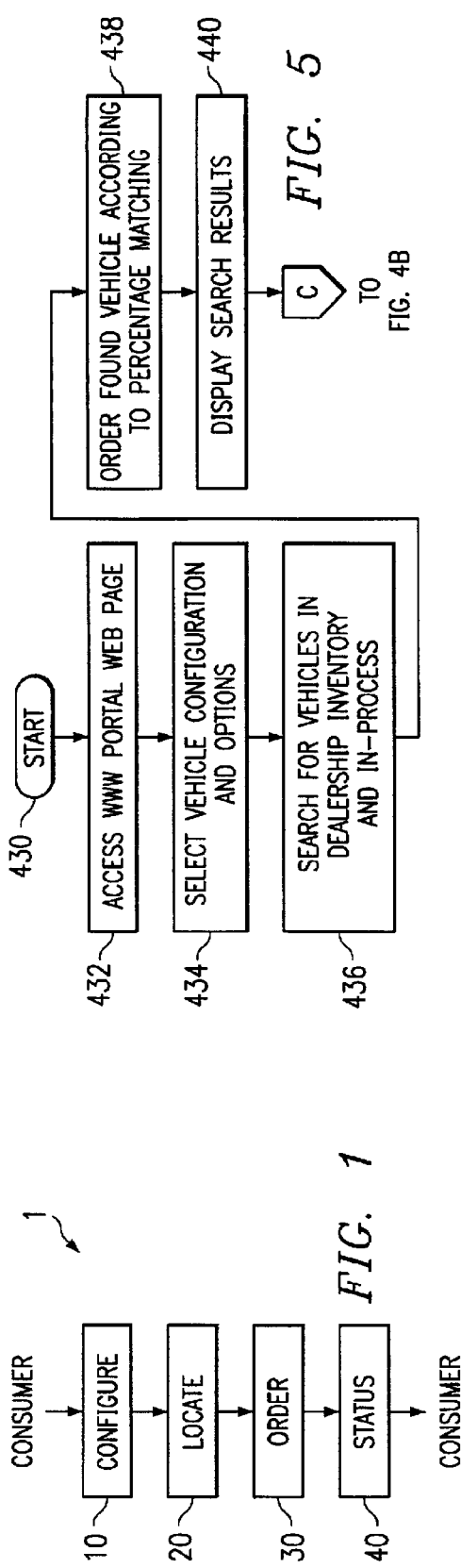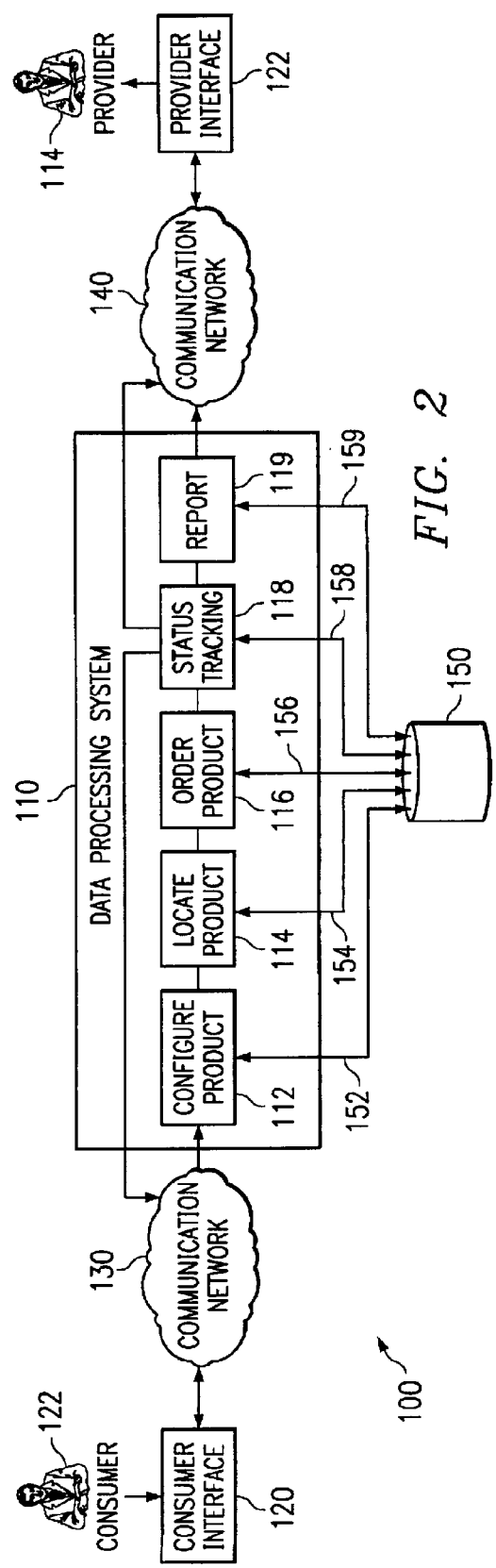

ONLINE SYSTEM AND METHOD OF LOCATING CONSUMER PRODUCT HAVING SPECIFIC CONFIGURATIONS IN THE ENTERPRISE PRODUCTION PIPELINE AND INVENTORY

RELATED PATENT APPLICATIONS

This application claims the benefit of U.S. patent application Ser. No. 09/561,644, filed May 2, 2000, and Method and System for Configuring and Ordering Consumer Product, which claims benefit of U.S. Provisional Application Ser. No. 60/163,755, filed Nov. 5, 1999, and entitled Automotive Internet Business Methods and Systems.

This application is related to co-pending U.S. application Ser. No. 09/538,516, filed on Mar. 29, 2000, and entitled, "Communication Schema of Online System and Method of Status Inquiry and Tracking Related to Orders for Consumer Product Having Specific Configurations."

This application is related to co-pending U.S. application Ser. No. 09/542,637, filed on Apr. 4, 2000, and entitled, "Communication Schema of Online System and Method of Ordering Consumer Product Having Specific Configurations."

This application is related to co-pending U.S. application Ser. No. 09/542,413 filed on Apr. 4, 2000, and entitled, "Online System and Method of Reporting Related to Orders for Consumer Product Having Specific Configurations."

This application is related to co-pending U.S. application Ser. No. 09/543,833 filed on Apr. 4, 2000, and entitled, "Communication Schema of Online Reporting System and Method Related to Online Orders for Consumer Products Having Specific Configurations."

This application is related to co-pending U.S. application Ser. No. 09/543,686 filed on Apr. 5, 2000, and entitled, "Online System and Method of Ordering and Specifying Consumer Product Having Specific Configurations."

This application is related to co-pending U.S. application Ser. No. 09/543,860, filed on Apr. 5, 2000, and entitled, "Communication Schema of Online System and Method of Locating Consumer Product in the Enterprise Production Pipeline."

This application is related to co-pending U.S. application Ser. No. 09/537,190 filed on Mar. 29, 2000, and entitled, "Online System and Method of Status Inquiry and Tracking Related to Orders for Consumer Product Having Specific Configurations."

TECHNICAL FIELD OF THE INVENTION

The present invention relates in general to the field of electronic commerce and computer software systems. More particularly, the invention relates to an online system and method of locating consumer product having specific configurations in the enterprise production pipeline and inventory.

BACKGROUND OF THE INVENTION

On-line shopping is quickly becoming the preferred means for obtaining consumer products and services. More consumers, for example, are now using the Internet to browse, comparison shop and order products on-line. On-line shopping systems have made product information, including pricing and availability, readily available to consumers and have facilitated the location and purchasing of desired products at lower cost and with added convenience.

Accordingly, many retailers have established "electronic store fronts" to offer all kinds of products ranging from clothes and groceries to computers and automobiles. Conventional electronic store fronts, however, are often modeled after traditional catalogs and are limited in the information disseminated to the consumer. With typical electronic store fronts, for example, a consumer is prompted to search for a desired product by entering one or more keywords. A search result of relevant items is then displayed along with a product description and price. The customer then places the desired items in an "electronic shopping cart," which the customer uses to place an order with the on-line merchant. If an item is not in the merchant's inventory, the customer is informed either immediately or within a prescribed period of time. If the customer is dissatisfied or unwilling to wait or desires to purchase the item elsewhere, the customer then returns to the store front or calls the on-line merchant to cancel or change the order.

Still other systems, such as Dell Computer Corporation's dell.com, allow consumers to configure or customize selected products in accordance with available features or options. Dell.com, for example, allows a consumer to customize computer systems by allowing the consumer to select various options, e.g., memory, hard drive, monitor, CD/DVD drives, video card, sound card, etc. An updated price is then obtained based on the selected options. The configured system is placed in a shopping cart and an order submitted by selecting a "checkout" option. Order status information can then be obtained upon providing an order number and verification data.

A shortcoming of conventional systems, however, is that product status and tracking information is available only after an order is placed. No information is available to the consumer, prior to the placement of the order, relating to the availability or status of a matching or similar configured product already in the product's manufacturing and delivery process or so-called "product pipeline." For example, conventional systems do not provide real-time information relating to inventory, in-transit stock, scheduled and unscheduled orders, etc., that may influence the consumer's decision to order or not order the configured product. Such information may be important to a consumer who may choose to select or not select a particular option because of a lack of inventory or delay in scheduled production. Also, in cases where time is of the essence, such information may be used to notify a customer that the configured product is not readily available. A new order can therefore be placed or a preexisting one updated without the customer having to cancel a previously submitted order. The availability of status and tracking information, prior to the placement of an order by the consumer, can therefore be used to minimize the risk that the customer will become inconvenienced and dissatisfied with the merchant's on-line ordering services.

SUMMARY OF THE INVENTION

The aforedescribed limitations and inadequacies of on-line shopping systems are substantially overcome by the present invention. The present invention provides a method and system wherein a consumer is provided real-time information, prior to the placement of an order or purchase by the consumer, regarding the availability and status of a configured product in relation to the product's manufacturing and delivery process or "pipeline."

The present invention provides an on-line method and system wherein the product delivery time to a consumer is reduced by locating and "tagging" an available product already in a product pipeline. The present invention allows a consumer to locate and tag the desired product at various stages of the pipeline, including but not limited to scheduled and unscheduled order banks, final assembly, in-plant inventory, in-transit stock, dealer inventory, etc. A located product may be tagged, for example, using a customer credit card, checking account number or electronic voucher or gift certificate.

The present invention provides an on-line method and system wherein the consumer configures a product as required and places a product order when no acceptable matches are found in the product pipeline. Alternatively, pre-existing or even canceled orders can be modified as required to fulfill the product order.

The invention also provides an on-line method and system wherein expected delivery dates are calculated and updated based upon the progress of an ordered or tagged product through the product pipeline.

The present invention also provides an on-line method and system wherein real-time pricing and comparison data is provided for individual product features or options.

The present invention also provides an on-line method and system wherein a consumer tracks the progress of an ordered product through the product pipeline. Real-time status can be provided as requested or automatically in accordance with the occurrence of a predefined or significant event.

The present invention provides an on-line method and system wherein consumer preferences and trends are reported.

In one embodiment of the present invention, an online system of locating consumer product having specific configuration in an enterprise production pipeline and inventory is provided. The system includes a locate client process operable to receive product configuration data and generate a search request message incorporating the product configuration data in response to user input, and an inventory database storing product availability data in the enterprise production pipeline and in inventory. A locate server process is operable to receive the search request message from the locate client process, and search the product availability data in the inventory database for products matching and substantially matching the product configuration data. The locate server is further operable to generate a search reply message containing the matching products and return the search reply message to the locate client process.

In another embodiment of the present invention, An online method of locating consumer product having specific configuration in an enterprise production pipeline and inventory is provided. The method includes receiving a search request message having product configuration data submitted by a user, formulating a search query with search criteria corresponding to the product configuration data, and searching an inventory database for a product matching the product configuration data. The inventory database contains product on the order bank, in-production, in-transit, and in-inventory. The method then generates a search reply message containing any product substantially matching the product configuration data, and sends the search reply message to the user.

In yet another embodiment of the present invention, an online method of locating automotive vehicles having specific configuration in an enterprise production pipeline and inventory for purchase is provided. The method includes receiving a search request message having vehicle configuration data submitted by a user, formulating a search query with search criteria corresponding to the vehicle configuration data, and searching an inventory database for a vehicle matching the vehicle configuration data. The inventory database contains vehicles on the order bank, in-production, in-transit, and in-inventory at the dealerships. Then a search reply message containing any vehicle substantially matching the vehicle configuration data is generated. The search reply message includes a vehicle identifier and vehicle configuration data of each substantially matching vehicle. The search reply message is then sent to the user.

In another embodiment of the present invention, an online method of purchasing a vehicle includes displaying vehicle configuration data, receiving user online input on vehicle configuration, including make, model, and color of the vehicle, and receiving user online input to search for a vehicle having the vehicle configuration. The method further includes generating a search request message incorporating the user-entered vehicle configuration, and sending the search request message to a locate process. Thereafter a search reply message including a list of vehicles substantially matching the user-entered vehicle configuration is received, and the list of vehicles is displayed to the user.

BRIEF DESCRIPTION OF THE DRAWINGS

For a better understanding of the present invention and the advantages thereof, reference may be made to the accompanying drawings, in which:

FIG. 1 is a flow diagram showing a method for product ordering and tracking according to a preferred embodiment of the present invention;

FIG. 2 is a preferred embodiment of a system for implementing the method shown in FIG. 1;

FIG. 5 is another flowchart of another embodiment of the web-based custom vehicle ordering and tracking method of the present invention;

DETAILED DESCRIPTION OF THE INVENTION

Figure 3:
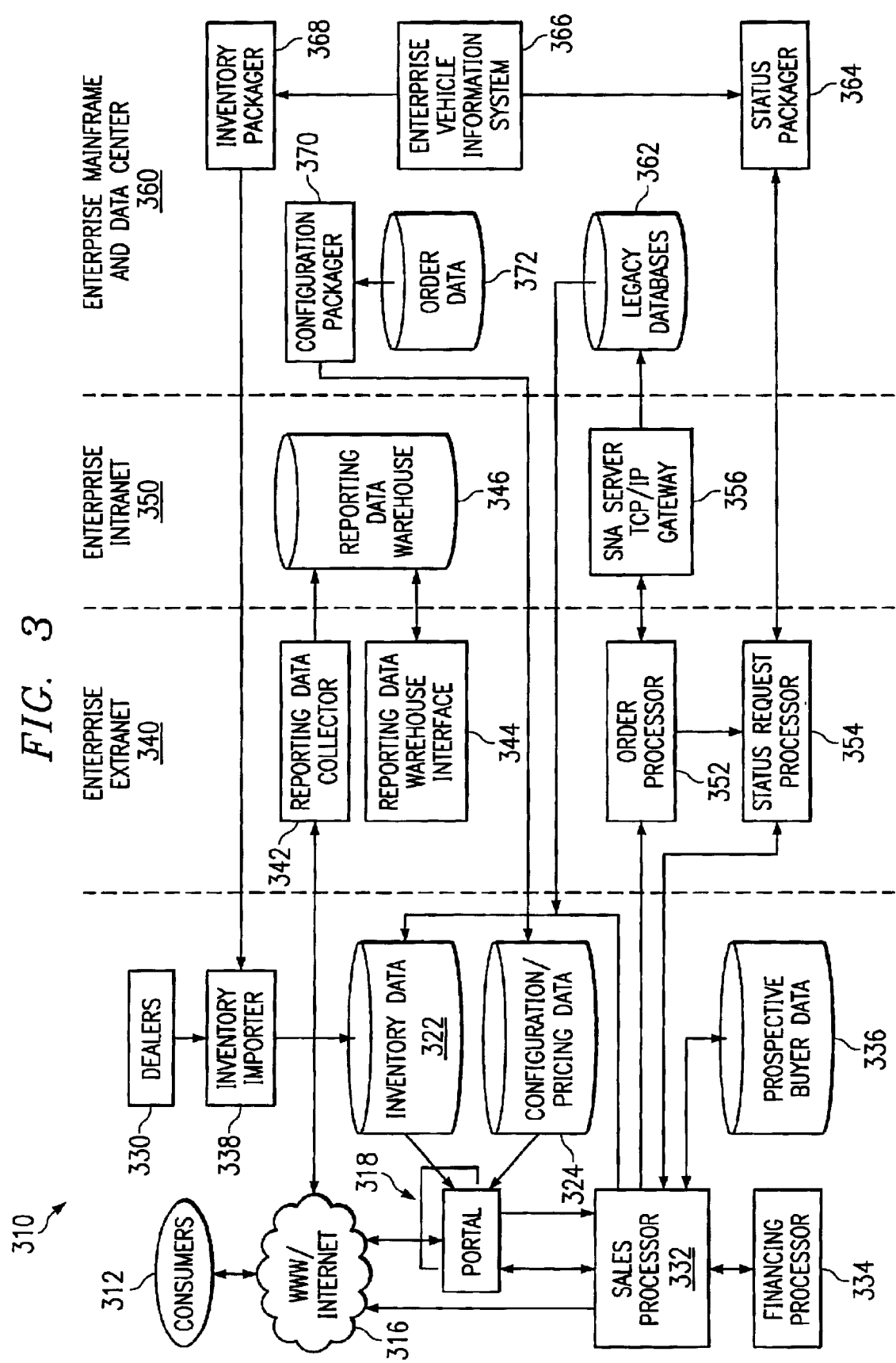
FIG. 3 is a block diagram of an embodiment of the web-based custom vehicle ordering and tracking system constructed according to the teachings of the present invention.

As described above, there is a need to provide immediate feedback to on-line customers as to the availability of selected merchandise. Furthermore, it is advantageous to somehow satisfy the customer's order even when the selected item is not in inventory. Although these features are desirable for any on-line merchant, they are especially advantageous for big-ticket items such as automobiles where a customer may choose among a myriad of options and features, and where a single completed sale translates to large dividends.

FIG. 1 is a flow diagram of a preferred method for ordering and tracking consumer products. As shown in FIG. 1, a consumer desiring to purchase a product first selects and configures the product as desired based upon available product features or options, as shown in block 10. Dealer inventory and "in-process" product inventory are then searched to locate products that matched or substantially matched the consumer selected product configuration, as shown in block 20. An in-process product is defined as a product that is on the order bank to be manufactured, a product in the manufacturing process, or a product that is in transit to the retail outlet or dealerships. If no matching or otherwise acceptable at-dealer or in-process product can be located, then the consumer is provided the option to order the configured product, as shown in block 30. If a matching or similar product is located, then the located product is "tagged" or designated for purchase and/or delivery to the consumer. The consumer is then notified that a product has been located and tagged, and may be further notified that the actual purchase or delivery of such product may be conditioned, for example, upon payment or credit verification. The consumer may be warned that there is a possibility that the vehicle has been tagged or sold to someone who may have purchased the vehicle prior to the consumer's effort to locate and tag the vehicle. This may occur due to lag time in updating the inventory databases. The consumer is then provided an estimated product delivery date. Real-time status and tracking information regarding the progress of the ordered or tagged through the product pipeline is also provided, as shown in block 40.

FIG. 2 is a block diagram of a system 100 for product ordering and tracking in accordance with the preferred method of FIG. 1. System 100 includes consumer and product provider user interfaces 120 and 122, respectively, for communicating via networks 120 and 140 with data processing system 110. A "consumer" or "customer" can be any purchaser or user of a product, and "product provider" can be, for example, a retailer, dealer or even manufacturer of the product offered for sale. The user interfaces 120 and 122 can be any suitable graphical user interfaces for use over any Internet, intranet, extranet, or similar communication network. Communication networks 120 and 140 can be different networks, or the same network. The data processing system 110, which is preferably embodied as one or more computer programs running on a suitable computer processor or processors, includes a configure product routine 112, a locate product routine 114, an order product routine 116 and a status/tracking routine 118 for performing the method of FIG. 1.

As further shown in FIG. 2, a product knowledge base 150 is used by the data processing system to provide real-time configuration, ordering and tracking information to the consumer. Communication link 152, for example, represents configuration and pricing data, business rules and/or other like constraints limiting the options and configurations available to the consumer. Inventory data, which includes, but is not limited to, scheduled and unscheduled order banks, final assembly, in-plant inventory, in-transit stock, dealer inventory, is provided by the knowledge base via link 154. Ordering rules and constraints, including information about the product's manufacturing and delivery process, is provided via link 156. Status related data and rules are likewise provided via link 158.

Further as shown in FIG. 2, system 110 can optionally include a report process routine 119 for communicating customer trend, preference and other customer-related data to the provider of the product or products offered for sale. Reporting rules and constraints, such as privilege or security data, is provided by product knowledge base 150.

FIG. 3 is a block diagram of a preferred embodiment of a system 310 for product ordering and tracking in accordance with the teachings of the present invention. Although the system 310 is shown as a web-based system for ordering and tracking custom vehicles, the system 310 may be modified as known and understood by those of skill in the art for ordering and tracking various other consumer products over any intranet, extranet or other suitable type of communications network. System 310 in particular provides on-line customers the ability to enter vehicle search criteria, and search for the vehicle in the dealership inventory and in-process. If the search does not yield a vehicle satisfying the search criteria, then a customer may search for near-match vehicles or place a custom order for the desired vehicle. In this way, the customer is provided immediate feedback as to the availability of the vehicle not only in inventory but also in the pipeline at the manufacturer leading to the dealer. The customer is also afforded satisfactory alternatives that lead to the completion of a sale.

The system 310 of the present invention, by way of example and not limitation, includes consumer "front end" 339, enterprise extranet 340, enterprise intranet 350 and enterprise data center 360. As shown in FIG. 3, consumer front end provides consumer-to-business (C2B) functionality, enterprise extranet 340 provides business-to-business (B2B) functionality and enterprise intranet 350 and enterprise data center 360 provide functionality internal to the enterprise, e.g., the product providing entity. The various system components, however, can be distributed within any of the segments 339, 340, 350 and 360 as required. FIG. 5, for example, shows another preferred embodiment of the present invention wherein a reporting data collector 342 and a reporting data warehouse 346 are shown as part of the consumer front-end 539 instead of the enterprise extranet 340 as previously shown in FIG. 3.

Referring again to FIG. 3, the consumer front end 339 includes one or more portals or web sites 318 accessible over the World Wide Web (WWW) or the Internet 316 over which consumers 312 can access the system 310. The system can be accessed using browser software applications running on client computers, machines or devices to download and access files called web pages stored on servers connected to the Internet. Using the same browser applications, consumers can also enter and send information to the servers. The Web pages can be single or multimedia documents created using hypertext markup language (HTML), extensible markup language (XML), all of the HTML and XML variations and extensions, client-side scripting languages, cascading style sheets, Java applets and serverlets, Active Server Pages (ASP), Cold Fusion, and other languages and methods. Portals 318 may include a web page that is part of the manufacturer's web site (e.g. Ford.com) that contains links to other related web pages and content dedicated to system 310. Portals 318 may also include customizable general purpose web pages that contain short summaries of current news, weather, financial news and serve as a starting point for many web surfers. Portals 318 may also include a web site dedicated to automotive sales of one or more makers, or a web site owned and operated by a dealership selling automobiles of one or more makers. In this manner, portals 318 serve as a multimedia user interface that interfaces between the users and system 310.

Portals 318 are capable of accessing an inventory database 322 and a configuration and pricing database 324. Inventory database 322 contains data related to the availability of any in-process or at-dealership product that may match the specifications dictated by the consumer. Configuration and pricing database 324 contains data on vehicle models and the available configuration and options that may be specified by the consumer. For example, a consumer may desire a white Ford Excursion with cream-colored leather seats, a V10 engine, premium aluminum wheels, and other options. Portal 318 is able to access configuration and pricing database 324 and present the data to the on-line consumer so that the consumer can indicate which configurations and options are desired. The price of the vehicle may be dynamically updated and displayed to reflect the price of the vehicle with the selected vehicle configuration and options. The vehicle configurations and options may be grouped into packages so that the on-line consumer may make his/her selection based on the desired packages.

After the on-line consumer selects the vehicle make and model, configurations and options, he/she may submit the vehicle selection and perform a search in inventory to determine if one is currently available. Inventory database 322 receives its data from an inventory importer 328, which obtains inventory data from dealers 330 for their current inventory. Dealers 330 may also represent any sales entity that has an inventory of products for sale or lease to the public or to businesses. Inventory importer 328 further obtains data from an inventory packager 368 within the enterprise mainframe and data center 360 of the manufacturer for data on vehicles in-transit from the manufacturing plant to the dealers, in manufacturing, and on the order bank. Therefore the entire product pipeline is searched for a match or a near match, if so desired. If no match or near match is found, the consumer may place a custom order for the vehicle. Inventory importer 328 is responsible for obtaining the relevant data from one or more sources, reformatting the data as necessary, and storing the data in inventory database 322.

Portals 318 are also in communication with a sales processor 332, which may be owned and operated by a dealership organization or any entity that operates as a retail outlet for the manufacturer. The vehicle selection information submitted by the consumer for purchase or lease is relayed to sales processor 332 for processing. A financing processor 334 may be used to receive and verify customer credit information and to process financing and complete the sale. A consumer who is not currently interested in purchasing or leasing the vehicle may cause the vehicle selection information to be stored, such as at a prospect/buyer database 336 or a database that is directly accessible by portals 318. Portals 318 may recall the stored information when the same consumer visits the web site again and allow the consumer to place the order at that time.

Sales processor 332 is also in communication with an order processor 352 that may be part of an enterprise extranet 340 of the company. Communication between the sales processor 332 and the order processor 352 is preferably done using an appropriate messaging scheme and message routers (not shown). Order processor 352 accepts submitted orders from sales processor 332 and communicates the order to legacy databases 362 in enterprise mainframe and data center environment 360 via a systems network architecture (SNA) server transmission control protocol/Internet protocol (TCP/IP) gateway 356. Also in communication with sales processor 332 is a status request processor 354, which may reside in the extranet. Status request processor receives requests from sales processor 332 and obtains the order status from a status packager 364 in enterprise mainframe and data center environment 360. Status packager 364 obtains status information from an enterprise vehicle information system 366, which keeps track of in-plant and in-transit vehicle inventory as well as vehicles on the order bank. Order data database 372 contains vehicle pricing information for vehicle configurations and options. A configuration packager 370 is operable to access order data database 372 and provide this information to configuration/pricing data database 324 at the front end.

Portals 318 are able to collect statistics and personal data on visitors and report this data to a reporting data collector 342 in extranet 340. Traditional means of obtaining data on the visitors, such as using cookie files, user entry forms, and the like may be used to collect data. This data is then stored in a reporting data database 346 in intranet 350. A reporting data warehouse interface 344 is provided for users who has authority to access the data in reporting data database 346. Analysis on the collected may be performed to achieve a better understanding of potential buyer likes and dislikes and to determine potential buyer profiles.

For security reasons, firewalls separate the World Wide Web and the Internet from extranet 340, which is also separated from enterprise intranet 350, and enterprise mainframe and data center 360 by firewalls. Account identifiers, user identifiers, passwords, etc. are needed to access the extranet, intranet and enterprise mainframe and data center systems.

Figure 4A:
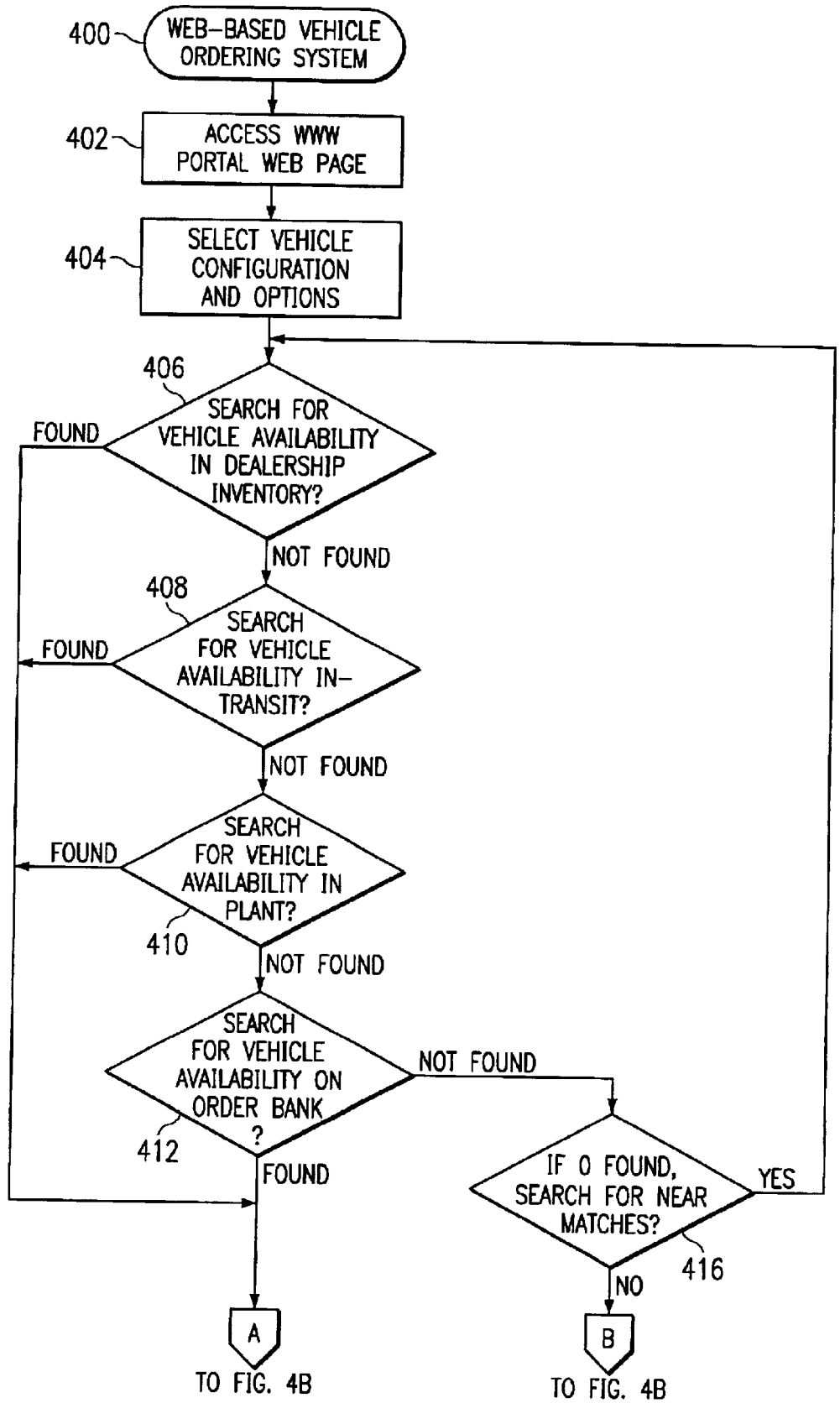
FIG. 4 is a simplified flowchart of an embodiment of the web-based custom vehicle ordering and tracking method according to the teachings of the present invention.
Figure 4B:
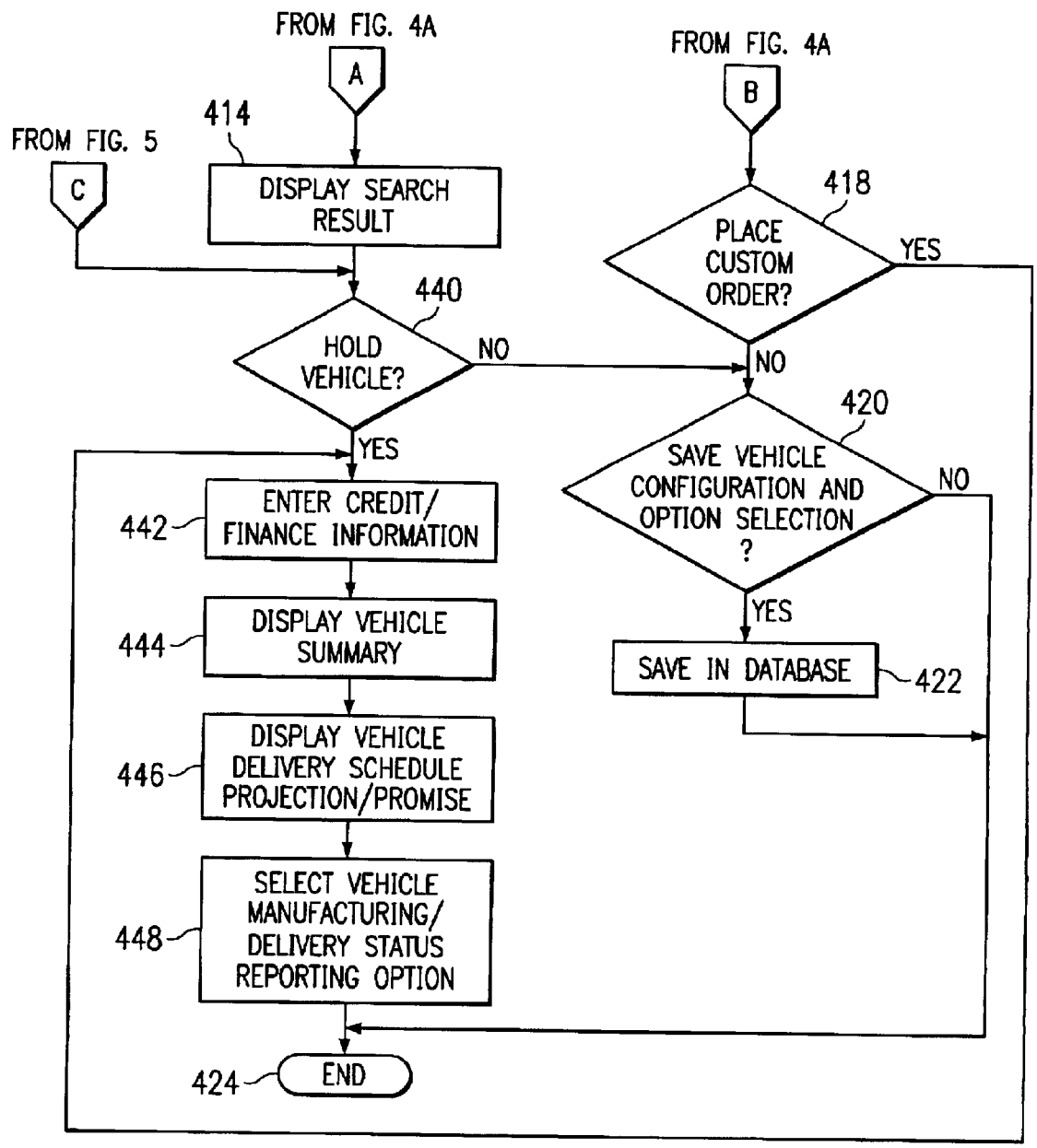

FIG. 4 is a simplified flowchart of an embodiment of the web-based custom vehicle tracking and ordering process 400 according to the teachings of the present invention. A user accesses a World Wide Web web page, as shown in block 402. The consumer is then able to enter or select from pull-down lists or other types of lists the vehicle make, model, color, configurations and options, as shown in block 404. System 310 of the present invention then searches for vehicles matching the entered criteria in dealership inventory and in-process. Two alternate methods of searching and locating a matching vehicle are shown in FIGS. 4A–4B and FIG. 5.

Referring to block 106 in FIG. 4A, the system begins by first searching in dealership inventory. The search may be performed by accessing inventory database 322. If a vehicle is not found, system 310 then searches database 322 for matching vehicles that are in-transit, as shown in block 408. If a vehicle is not found, then system 310 searches inventory database 322 for vehicles that are in-plant being manufactured, assembled, etc., as shown in block 410. If such a vehicle is still not located, then system 310 searches for a matching vehicle that is on the order bank to be constructed, as shown in block 412. All vehicles matching the search criteria are displayed, as shown in block 414. If no vehicle matching the criteria is located, then near matches are searched in inventory database 322 if so instructed by the consumer, as shown in block 416.

Referring to FIG. 5, an alternate method 430 of searching for and locating a vehicle matching or substantially matching the entered criteria is shown. Similarly, the consumer accesses the system via portal web pages, and enters desired vehicle configuration and options, as shown in blocks 432 and 434. Dealership inventory and in-process vehicles are searched for a match or near match, as shown in block 436. In block 438, all found vehicles are sorted according to how closely it matched the entered search criteria, from highest percentage to lowest percentage. The vehicles may further be sorted by status, for example, in-inventory vehicles are grouped together, in-transit vehicles are grouped together, etc. The sorted found vehicles are then displayed to the consumer, as shown in block 440.

Returning to FIG. 4B, if no match or near match is found, if the consumer does not want to search for near matches, or the consumer is not satisfied with any found vehicle in the search result, the consumer may indicate that he/she desires to place a custom order, as shown in block 418. If the consumer does not desire to place a custom order at this time, then the vehicle selection criteria may be saved in a database, such as prospective buyer database 336, as shown in blocks 420 and 422. The process ends in block 424.

If, on the other hand, the search located a vehicle matching or nearly matching the selection criteria, the consumer may "tag" or place a "hold" on the vehicle, as shown in block 440. In order to reserve a vehicle, the consumer is asked to provide credit and/or other financial information, as shown in block 442. Typically, a consumer is asked to provide a credit card account number from which a predetermined amount or a certain percentage of the vehicle price is charged to hold the selected vehicle. Alternatively, the consumer may opt to merely save the vehicle configuration and option selection and postpone the purchasing decision until later, as shown in block 420.

In block 444, after the consumer has decided to hold a vehicle and have provided the credit information, a summary of the selected vehicle and the transaction may be displayed to the consumer. This page may be saved or printed by the consumer as a receipt. In block 446, a vehicle delivery schedule projection may be displayed. The vehicle delivery schedule may indicate that the vehicle is immediately available if it is currently on the lot of a dealership or in two months in the case of a custom order, for example. This step may also be performed simultaneously with the search result information in block 414. The consumer may further select a means of reporting the vehicle delivery status and a frequency for the report, as shown in block 448. For example, the consumer may elect to receive status update reports via email, facsimile, or a web page. The status update reports may further provide an updated delivery date, if it is changed from the original date due to changes in the manufacturing or transportation schedule. The process ends in block 424.

Figure 6:
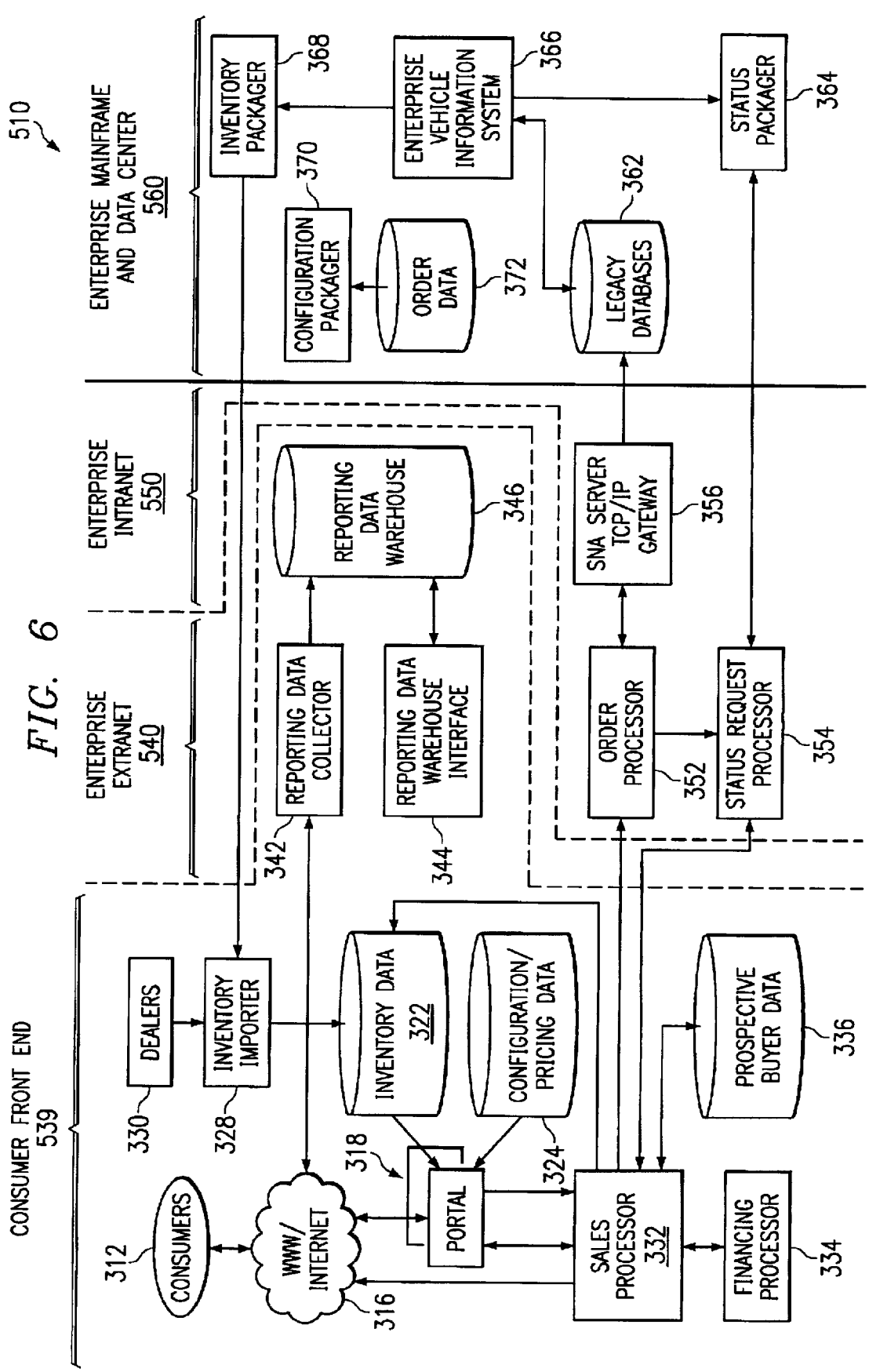
FIG. 6 is a block diagram of another embodiment of the web-based custom vehicle ordering and tracking system according to the teachings of the present invention.

FIG. 6 is an alternate embodiment 510 of the present invention similar to that shown in FIG. 3. It may be seen that the boundaries between consumer front end 539, enterprise extranet 540, enterprise intranet 550, and enterprise mainframe and data center 560 may be somewhat flexibly delineated, thus some of the system components may exist in the consumer front end rather than the enterprise extranet, for example. As shown in FIG. 5, reporting data collector 342 and reporting data warehouse 346 may exist in consumer front end 539 instead of enterprise extranet 540 and enterprise intranet 550, respectively. Further, order processor 352 and status request processor 354 may reside in enterprise intranet 550 rather than enterprise extranet 540.

Figure 7A:
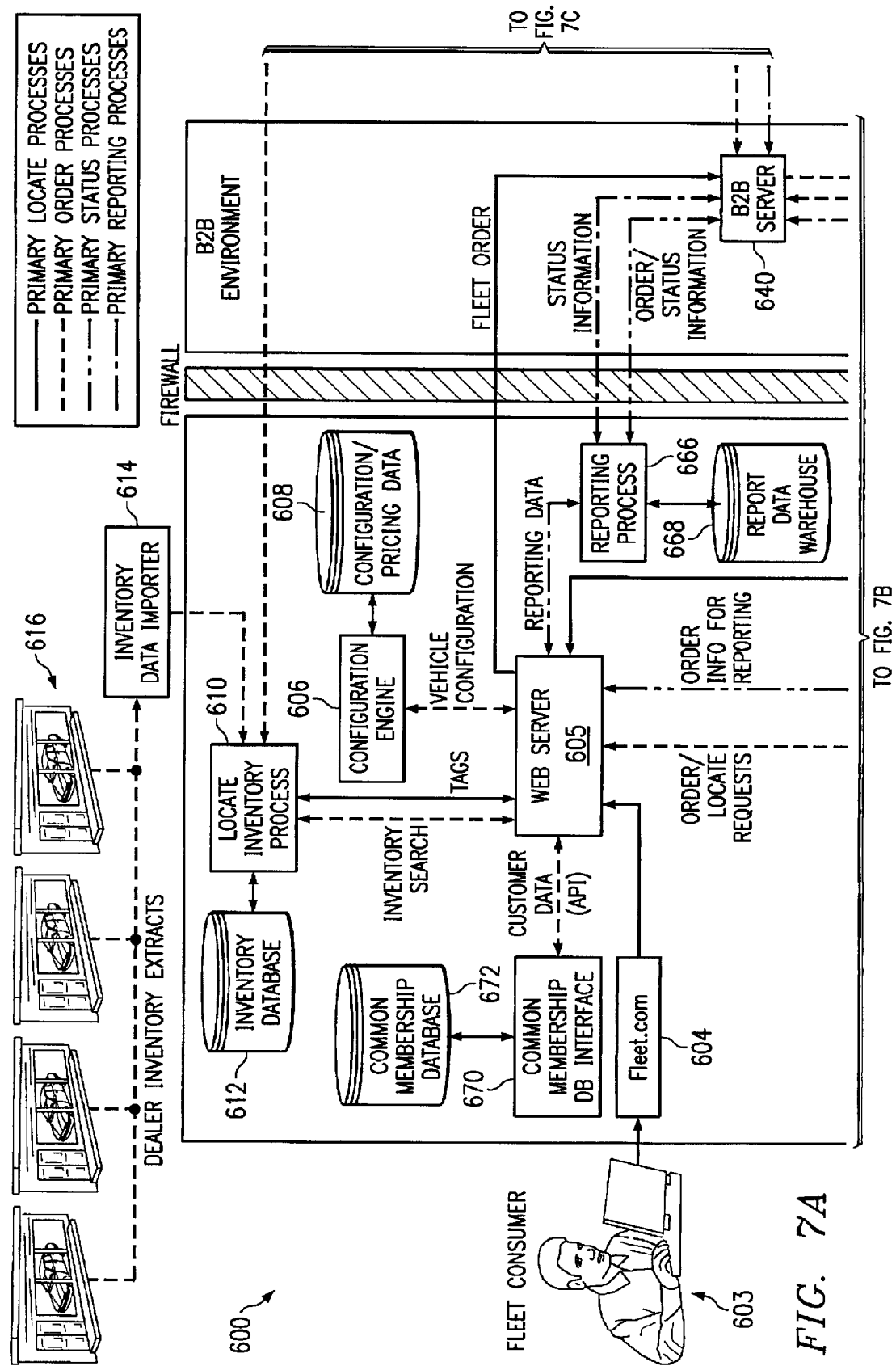
FIGS. 7A–7C provide a more detailed block diagram of an embodiment of the web-based custom vehicle ordering and tracking system according to the teachings of the present invention.
Figure 7B:
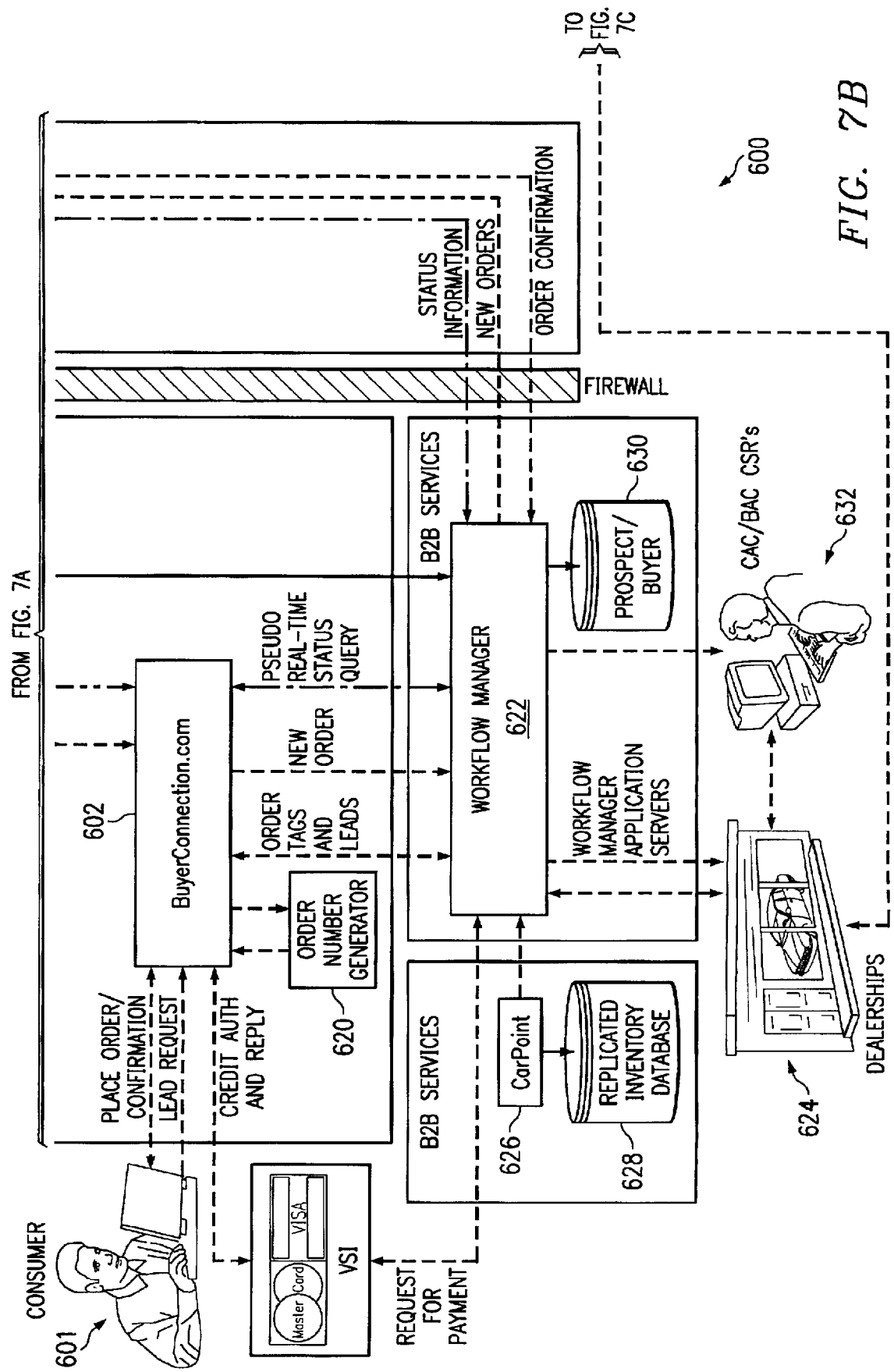
Figure 7C:
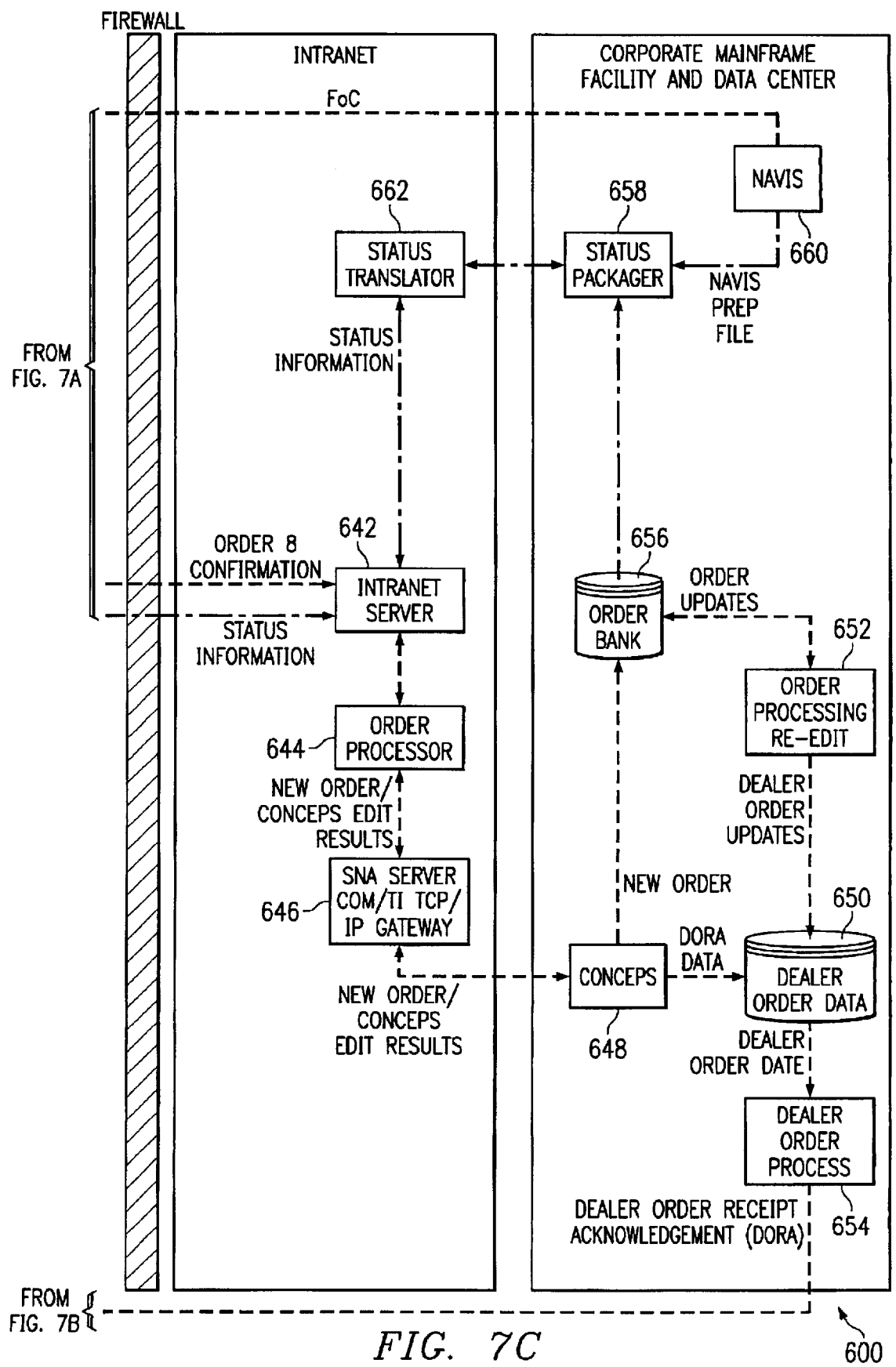

Referring to FIGS. 7A–7C, a more detailed block diagram of an embodiment of the web-based custom vehicle ordering and tracking system 600 according to the teachings of the present invention is shown. System 600 includes multiple web sites or portals, such as BuyerConnection.com™ 602 and Fleet.com™ 604, which provide an online interface to consumers 601 and fleet consumers 603 via the Internet. These portals or web sites communicate with a web server 605, which processes consumer requests and generates responses thereto. For example, a consumer 601 may select a number of options and features for the product (an automobile, for example). A configuration engine 606 and configuration/pricing database 608 are used to provide product configuration and pricing information. The consumer may then submit a search request to BuyerConnection.com 602 to locate a vehicle with the selected options and features in dealer inventory, in-transit, in production, or on the order banks. BuyerConnection.com then generates a locate request and sends it to web server 605 (L1). In one embodiment of the present invention, the locate request is an XML (extended markup language) message, that specifies a set of desired vehicle attributes or criteria, the relative importance of each criterion, and the type of information to be returned by the search. For example, the response may be a summary of a list of vehicles or detailed information of a few selected vehicles. Web server 605 routes the search request to a locate inventory process 610, which is responsible for locating the product which matches or nearly matches the search criteria submitted by the consumer.

Locate inventory process 610 accesses an inventory database 612, which contains the updated inventory data at all the dealerships and products in-process (in-transit, in production, and on the order bank). An inventory data importer 614 performs the inventory data import batch process in a periodic manner, such as nightly, to update the data in inventory database 612. Inventory data importer 614 may use a modem dial-up connection, file transport protocol (FTP) and/or other mechanism to pull inventory records from the dealerships. A data cleansing or inventory data verification process may be used to remove spelling mistakes and verify the VIN (vehicle identification number) against the make, model, and other features of the vehicle. The data cleansing process Ensures that the inventory data is in a consistent and accurate format that is suitable for consumer searching and display. Inventory database 612 may be batch processed or updated in real-time as necessary so that the most recent data is available for searching. Weekly full extract may be performed in addition to nightly updates on new data.

A second input to locate process 610 and inventory database 612 is an enterprise vehicle information process 660, which contains and processes data related to vehicles that are in-process. Locate inventory process 610 searches inventory database 612 and returns a list of matches and near matches (L2), preferably in decreasing order of matching percentile. The consumer may peruse the list and decide to tag a vehicle on the list. He or she can submit a tag request message (L3). The tag request message is sent from a workflow manager 622 to web server 605. The data in inventory database 612 associated with the selected vehicle is updated to indicate that it has been tagged and that subsequent searches should yield results with the tagged vehicle suppressed. Preferably, a consumer is able to tag a vehicle only after a down payment has been paid or the consumer's credit has been approved, for example. A consumer may tag a vehicle that is in inventory, in-transit, in production, or on the order bank. A tag response message (L4) is then generated and returned to workflow manager 622 to confirm that the selected vehicle has been successfully tagged for purchase. The response may be formatted and displayed to the consumer to indicate success or failure and perhaps also provide an estimate of the vehicle delivery or available date. A tag order message (O3) is generated and sent to workflow manager process 622 for processing. Workflow manager process 622 is one or more application servers which process vehicle orders and conveys this order to dealerships 624.

If the search response indicates that no match was found or the consumer is not satisfied with the near matches, the consumer has the option of placing a custom order for a vehicle with the desired options and features (O1 or O2). Fleet orders (O1) placed by fleet consumers are routed via web server 605 to a B2B server 640, which in turn sends the order to an order process 644 via an intranet server 642. B2B server 640 is preferably situated in an intranet environment behind a firewall that safeguards it from the outside world. Order process 644 processes the fleet order and then sends it to a corporate on-line communications entry point system (CONCEPS) 648 via an SNP server gateway 646. CONCEPS generates a new order, which is put on an order bank 656.

A retail order (O2) is also sent to workflow manager process 622, which sends it to B2B server 640 and then to CONCEPS 648 via intranet server 642, order process 644, and SNA server gateway 646. The new order is updated in order bank 656.

CONCEPS 648 returns an order status or confirmation message (O5) that confirms the fleet or retail order. The order status message is routed to workflow manager process 622.

A consumer may also request for a lead on a dealer that may have vehicles he/she is interested in test driving, for example. The BuyerConnection.com web site routes the consumer lead request (O4) to workflow manager 622, which is sent to customer service representatives and to dealerships 624. The dealerships may then contact the consumer directly either by postal mail, electronic mail, or telephone.

The BuyerConnection.com web site 602, CarPoint 626, or other presentation applications may send a status query request message (S1) to workflow manager process 622. The status request message contains an order source identifier (OrderSourceId) and a customer identifier (CustomerId), which are used by workflow manager 622 to identify all the active orders for a customer. A common membership database 672 stores such customer data for the presentation applications (portals and web sites). A common membership database interface 670 may be used as an interface between common membership database 672 and web server 605. The workflow manager then returns the status history for all vehicles ordered by the customer. The reply message (S2) is sent from Workflow manager 622 to the presentation application.

Periodically, workflow manager process 622 sends a request for status message (S3) to B2B server 640, which in turn is sent to a status packager 658 via a status translator 662 and intranet server 642. The update request may be XML message that contains the order number, order line number, and item number, which uniquely identify the order within a prospect/buyer database 630. The request message also may contain the model year, body style, vehicle line, and dealer code, which uniquely identify the order in enterprise vehicle information system (NAVIS) 660 until the vehicle is scheduled for manufacturing and a vehicle identification number (VIN) is assigned to the vehicle. The VIN, status code, sub-status code, and estimated time of arrival are sent to status packager 658 residing on the mainframe. These values are compared with the values in the mainframe systems and status packager 658 returns any deltas or differences. This status request may be a batch process done nightly or every predetermined time period to update the status of the orders. A status information message (S4) is generated by status packager 658 and returned to workflow manager 622. The status information message contains new values of fields that were found in the mainframe systems that were different than what was in the status request message.

A report process 666 is operable to access a report data warehouse 668 and generate report data messages (R1 and R2) related to the retail orders and tagged orders, respectively, for reporting purposes. The report data are routed to BuyerConnection.com web site 602 via web server 605. Dealer lead messages (R3) are generated through a customer request to have a dealer contact the customer about a certain vehicle that the customer has selected online.

Locate Process and Locate Process Communication Message Schema

As described above, external applications are operable to submit search requests to locate process 610 to find vehicles in-process and at dealership which match or substantially match the search criteria. The search requests may be submitted in the form of XML (extended markup language) messages and the responses be received in an XML. The search request messages contain the search criterion, the relative importance or weight of each criteria, and the type of data to be returned. A client or presentation application may request information for a number of reasons. For example, the client application may request a list of identifier and value pairs for a number of criteria, such as make and model of the desired vehicle. The returned values are then used to populate the criteria definition elements of the client application user interface, such as pull-down lists of available makes and models. The client application may then compile the user selected criteria preferences into a second XML message that requests a list of matching vehicles in inventory database 612. The returned response message may be compatible with known formats, such as the auto-lead data format (ADF).

Figure 8:
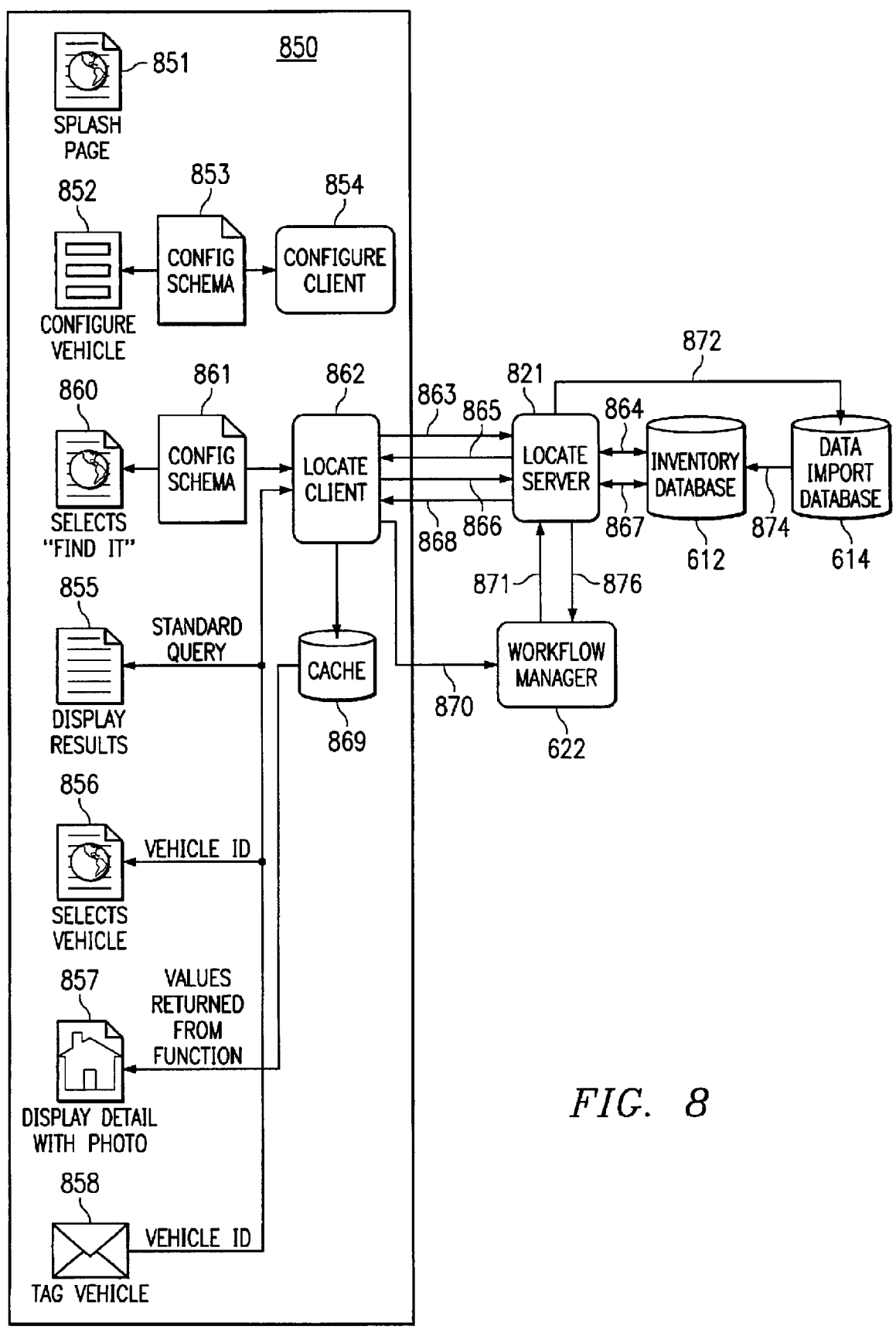
FIG. 8 is a more detailed block and flow diagram of an embodiment of the web-based custom vehicle locate process according to the teachings of the present invention.

Referring to FIG. 8, a message flow diagram of an embodiment of the locate process according to the present invention is shown. The locate process includes a configure client 854 and a locate client 862 that reside in a client side application 850, and a locate server 821 in the server side application. A consumer calls up or downloads web pages 852 to enter the desired make, model, options and features of the product, a configure message 853 is generated and sent to configure client 854. The consumer may also submit the same product criteria in a configure message 861 of the desired product via a web page 860 to search or locate vehicles matching or generally matching the search criteria. Configure message 861 is sent to locate client 862, which generates a locate search request message 863 containing the configuration content of configure message 861 and routes it to a locate server 821. Locate server 821 parses and uses the search criteria in the locate search request to query inventory database 612. Search results are then returned to locate server 821. Locate server 821 then generates a response message 865 containing a summary of the matched vehicles and sends it back to locate client 862. The returned response is parsed, formatted and stored in a database 869. The list of vehicles that match or generally match the submitted criteria is then displayed as content in a web page 855 to the consumer.

The consumer may then provide a selection input 856 of a particular vehicle from the list displayed in the web page, which sends a unique vehicle identifier to locate client 862. Locate client 862 generates a request message 866 containing the vehicle identifier, which is then routed to locate server 821. Locate server 821 sends a query to inventory database, 612 and data 867 is returned with more detailed vehicle information, which may include the URL (uniform resource locator) of a photographic image of the selected vehicle. Locate server 821 then generates a response message 868 that includes the detailed vehicle information and routes it to locate client 862. The returned detailed vehicle information is stored in cache 869 as well as displayed to the consumer in a web page 857.

The consumer may "tag" a selected vehicle after viewing the vehicle information to secure the right to purchase the vehicle. The consumer generates a tag message 858 that contains the unique vehicle identifier, which is delivered to locate client 862. This may be accomplished by clicking on a link on the web page, which may be represented by the image of the vehicle, for example. Locate client 862 then forwards the tag message to workflow manager 622. Workflow manager 622 sends a temporary tag to locate server 821. Locate server 821 then sends a message 872 to data import database 614 to "hide" the selected vehicle therein. Data import database 614 replicates the tag and vehicle identifier information 874 and sends it to inventory database 612. Locate server 821 further generates a tag confirmation message 876 and sends it to workflow manager 622 to indicate that the data associated with the selected vehicle has been updated to indicate that it has been tagged. The consumer may then complete the purchase of the tagged vehicle.

Figure 9:
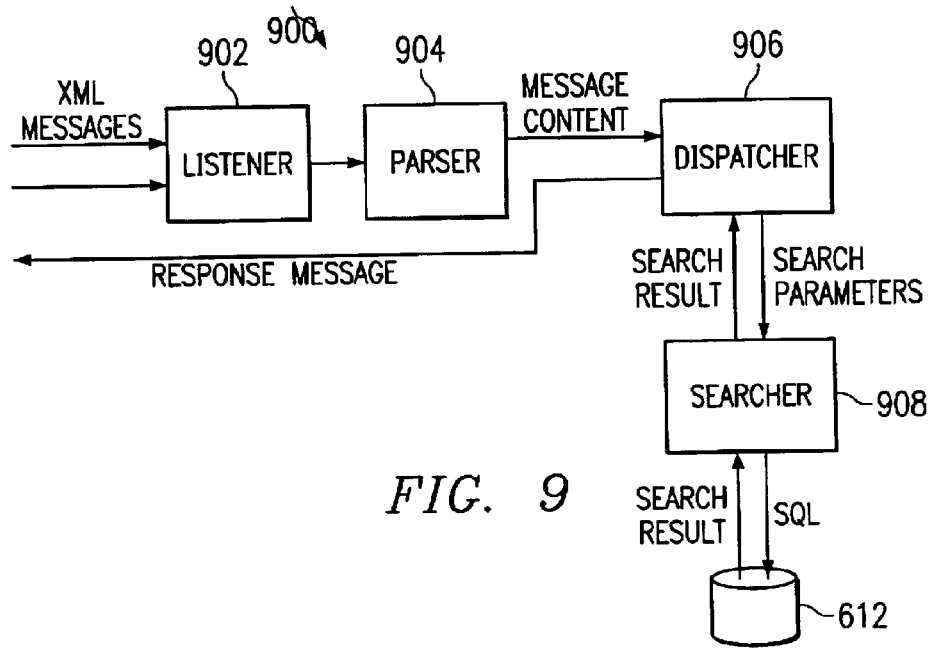
FIG. 9 is a more detailed block and flow diagram of an embodiment of message processing of the locate process according to the teachings of the present invention.

FIG. 9 is a locate server message flow diagram 900 according to an embodiment of the present invention. A listener 902 is preferably a secured XML listener on port 80 of locate server 821 that accepts XML messages sent from requesting presentation applications. Listener 902 provides support for authenticating whom the request is from using private key infrastructure (PKI) encrypted user credentials, for example. Based on the requester's identity, listener 902 applies pre-assigned business rules to the request to allow or deny access to specific functions and data sets supported by locate server 821. Listener 902 then sends the message to a parser 904.

Parser 904 reads the request messages and parses out specific portions thereof, which are passed as parameters to the underlying search processes via a dispatcher 906. Each parser 904 is persistent until a response is received from dispatcher 906. The content of the request messages generally includes request conditions or request criteria. Request conditions include required fields, optional fields, relevance weights, maximum record count, etc. Request criteria include specific vehicle configuration, such as make, model, options, and features to search for. Two types of vehicle searches are supported, one that returns a summary of vehicles that fits the search criteria, and one that returns detailed information of selected vehicles or a smaller subset of vehicles.

Dispatcher 906 examines the content of incoming parameters received from parser 904 and determines which underlying locate server function is needed to process the request. For example, the request may be a search request for vehicles that match a set of criteria or a tag request on a particular vehicle. Dispatcher 906 may examine the parameters against business rules defined for the requesting application, and replace any offending parameters with permissible parameters. Dispatcher 906 may also provide the overall locate server monitoring and control functions for spawning additional processes or threads to service incoming requests, and to manage the overall creation and destruction of pooled database sessions.

Searcher 908 is a locate server process that receives the incoming parameters from dispatcher 906 and converts them into an SQL (structured query language) query against inventory database 612. Searcher 908 uses the passed parameters to select one or more vehicles that match or generally match the required field values, and then evaluate the optional or preferred values of each vehicle. Weight factors may be used to calculate a relevance value for each vehicle. The relevance calculations are dynamic, and therefore can support any mix of weighted factors and values, not only by application, but by individual requests. This allows applications to vary the weight factors to determine the mix that most accurately returns a relevance based on their business needs, or alternatively, allow the consumers to provide their own relevance values.

Search values are returned from inventory database 612 to searcher 908, which passes the returned values to dispatcher 966 and then to parser 904. Parser 904 constructs a response XML message and sends it to the requesting application.

Figure 10:
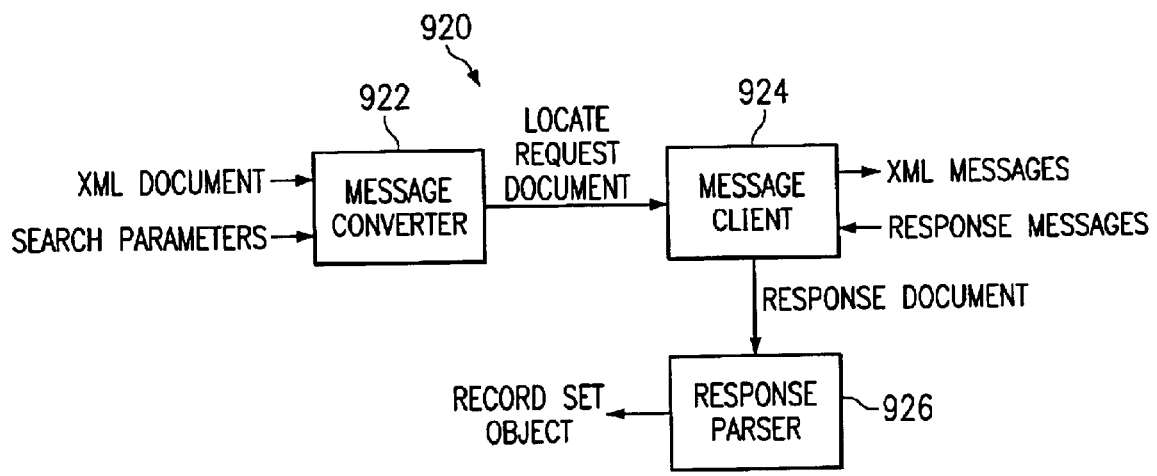
FIG. 10 is a more detailed block and flow diagram of an embodiment of message processing of the locate process according to the teachings of the present invention.

Processing on the locate client side according to the teachings of the present invention is shown in FIG. 10. A message converter 922 is operable to receive an XML document from the configure process and search criteria parameters as input to generate a locate request XML formatted document output. Using message converter 922, applications are not required to modify their application when new versions of communication schemas are rolled out. Message converter 922 is also operable to accept text inputs to generate a locate request document. A sub-function of message converter 922 is a tag parser that creates supported tag messages and returns the status from the tag response message.

A message client 924 is a multi-threaded HTTP hypertext transfer protocol) process that provides the required functions to received the XML formatted document, then generates and sends XML messages and application credentials to and from the locate server.

A response parser 926 receives and processes the response XML documents. Response parser 926 outputs an ADO record set object that can easily be inserted into an application cache for paging, sorting or other application specific data functions.

Figure 11:
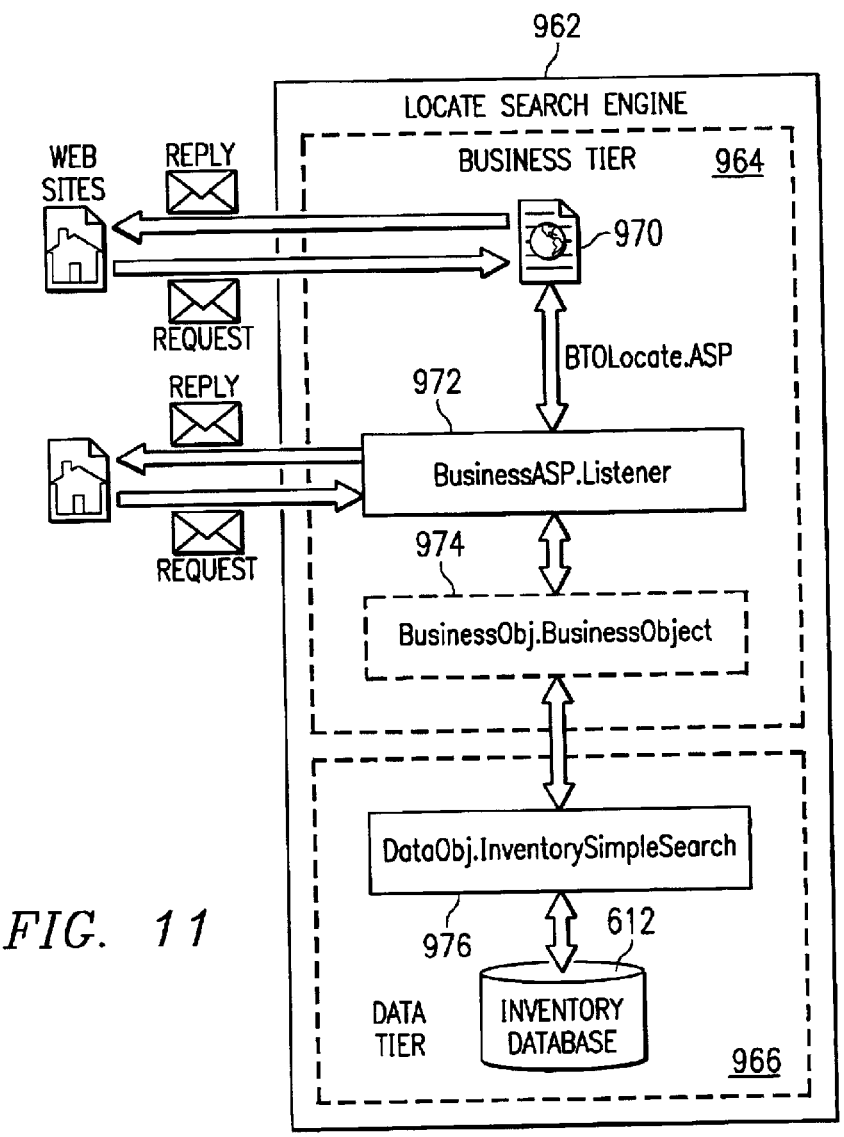
FIG. 11 is a more detailed block and flow diagram of an object-oriented embodiment of the web-based custom vehicle locate process according to the teachings of the present invention.

Referring to FIG. 11, a block diagram of an embodiment of a search engine 962 of the locate process is shown. Search engine 962 includes at least two layers or tiers—a business tier 964 overlaying a data tier 966. Data tier 966 includes inventory database 612, which contains data on enterprise-wide in inventory and in-process products. Data tier 966 also includes a DataObj.InventorySimpleSearch object 976. DataObj.InventorySimpleSearch object 976 exposes a set of methods that may be called by business tier 964 to search inventory database 612. Business tier 964 includes a BusinessASP.Listener object 972 and a BusinessObj.BusinessObject object 974. BusinessObject object 974 is the main component that implements the business rules and validates user privilege. The listener object 972 parses the request XML messages received from the web sites and interprets the information for the BusinessObject. The listener object 972 is also operable to generate the XML reply messages. A Locate.ASP page 970 is operable to fetch the request XML messages received from the web sites and passes it to the listener object 972. Locate.ASP page 970 is also operable for pushing the reply XML messages back to the web site that submitted the search request messages.

A search request can be submitted to search engine 962 by using the HTTP by posting an XML request message to Locate.ASP page 970. Locate.ASP page 970 may respond by returning a reply XML message containing the search results. The search request is contained in the body of an HTTP message and the search result is contained in the body of a returned HTTP message. A valid user name and password with the necessary privilege is required to post a request to the Locate.ASP page 970.

A number of alternative means of initiating the locate search request is available depending on the operating system. For example, on the Windows NT 4.0 platform, the request message may be posted using the WinInet™ API (application program interface), the WINSOCK™ API, or the Microsoft.XMLHTTP™. Other means are available as known in the art.

Optionally, the search request message can be submitted to search engine 802 by passing the XML message to a Business.Listener COM (common object model) object. This object exposes a single method, ProcessXMLRequest, that accepts the XML message as a string.

Search engine 802 will accept a search request submitted by web sites that has a valid user name and password with the necessary privileges. Roles are assigned to the web sites that identify the web sites and its available functionality. Business tier 804 verifies that the web site has the correct role to perform the requested task. A site role uniquely identifies the web site that is using the user name to request service from search engine 802. For example, the BuyerConnection.com web site is required to have the SiteBuyerConnection role. The site role assignments are used to accomplish site-specific validations. A second role, functionality role, is used to identify the privilege of the user or web site. For example, to search the dealer inventory database, the user needs the FunctionalitySearchDealerInventoryDatabase role assigned thereto.

As described above, the locate processes involves generating and sending XML messages in one embodiment, such as sending search request XML messages and search response XML messages. XML is primarily used to support application-to-application data exchange formats, such as that found in traditional EDI (electronic data interchange) over the Internet. The format of these XML messages are now described. It should be noted that the XML implementation of the messages is but one embodiment of the messaging schema, and that other languages and communication schemes can also be used.

In XML, tags are used to demarcate data content and data fields so that the content can be interpreted and manipulated. In XML, ELEMENT TYPE tags are used to define the various fields or parameters, a NAME tag sets out the name of the field, and a CONTENT tag sets out the data content of the field. Nested ELEMENT TYPE may be defined to describe a more complex data structure. For example,

```
<ElementType name= "Vehicle" content=eltOnly" order="seq">
    <element type= "Identification"/>
    <element type= "Status"/>
    <element type= "DealerCode"/>
    <element type= "ConfiguredModel"/>
    <element type= "Warranty"/>
</ElementType>
```

It may be seen that the vehicle field has five parameters that contains data on the vehicle.

Figure 12:
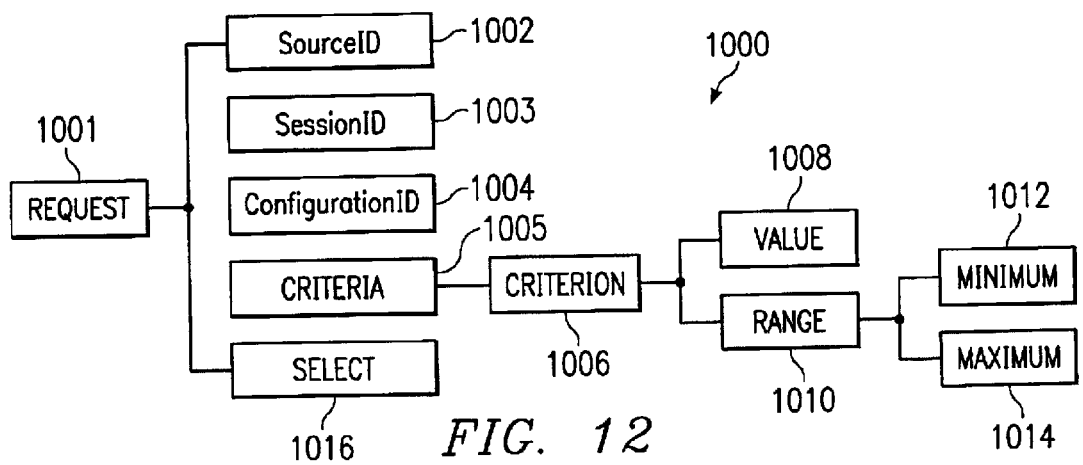
FIG. 12 is a diagram of an embodiment of a search request message schema according to the teachings of the present invention.

A search request message contains a specification of a set of vehicle attributes to be searched. For example, a search request message may have the format 1000 shown in FIG. 12. A search request tag 1002 is the top level tag for the locate request. A request message may include many request parameters that describe many attributes, with each following the same general format shown. Each search request 1002 includes a criteria tag 1004, which "wraps" all criterion 1006 for one search query. The valid values for criterion include dealer, make, model, and other options and features.

```
<ElementType name = "Criterion" content = "eltOnly" order = "seq">
    <Attribute Type name = "type" dt:type = "enumeration"
dt:values = "vin dealer make model year package engine transmission
tires exteriorpaint interiortrim roofcolor seattrim accentcolor stage
option msrp bodystyle vehicletype category askingprice condition
wheels audiotype"/>
    <Attribute Type name = "required" dt:type = "boolean"
required = "yes"/>
    <Attribute Type name = "weight" dt:type = "number"/>
    <attribute type = "type"/>
    <attribute tvpe = "required"/>
    <attribute type = "weight"/>
    <element type = "Value" minOccurs = "0" maxOccurs = "*"/>
    <element type = "Range" minOccurs = "0" maxOccurs = "*"/>
</ElementType>
```

At least one criterion 1006 includes a value parameter 1008 and/or a range of values 1010 that specify the weight or relative importance of the criterion. Range of values 1010 is specified by a minimum value 1012 and a maximum value 1014. Request 1002 further includes a select parameter 1016 specified by an item parameter 1018. Select and item parameters 1016 and 1018 are used to specify whether a vehicle summary or vehicle detailed information is requested.

Figure 13:
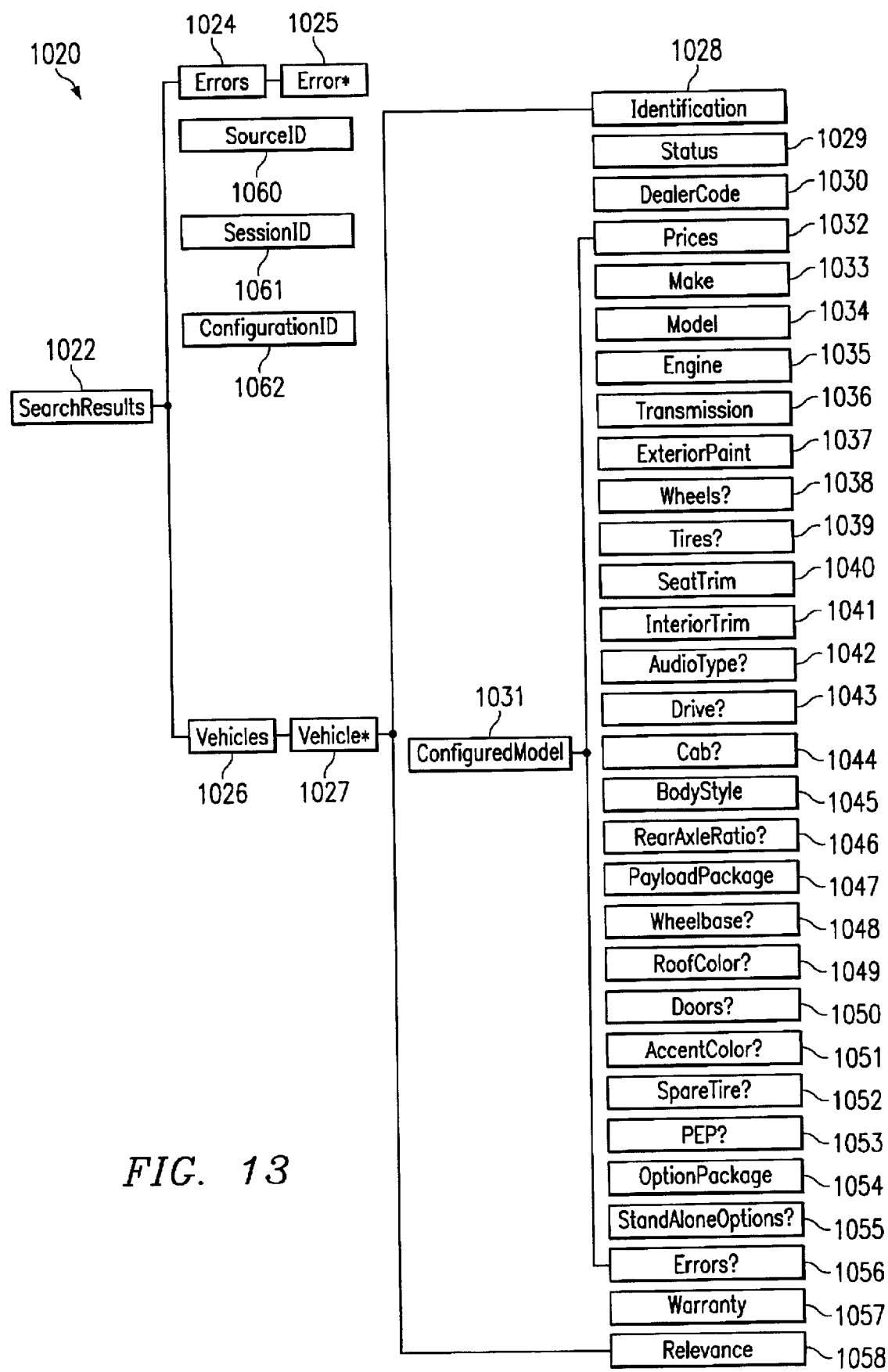
FIG. 13 is a diagram of an embodiment of a search result message schema according to the teachings of the present invention.

Referring to FIG. 13, an embodiment of the format of a search response 1020 is specified by search results tag 1022. Search results tag 1022 include an errors tag 1024 and a vehicles tag 1026. Errors tag 1024 is used to return information if the search is unsuccessful. Vehicles tag 1026 contains data on one or more vehicle 1027 that fits the search criteria. An identification tag 1028 contains a unique VIN and/or stock number that is used to identify the vehicle. A status tag 1029 contains the status of the vehicle, including condition, process tag, days in inventory, and description. A dealer code tag 1030 contains an identifier that specifies the dealership that has the vehicle in inventory. Configured model tag 1031 is used to specify detailed information of the vehicle, including price information (type, value, currency) 1032, make (code, description) 1033, model (code, name, year, trim, description) 1034, engine specifications (code, displacement, number of cylinders, fuel type) 1035, transmission specifications (code, type, speed, description) 1036, exterior paint color (code, description) 1037, wheel specifications (code, diameter, description) 1038, tire specifications (code, manufacturer, description) 1039, seat trim color 1040, interior trim materials 1041, audio system specifications (code, radio, cassette, CD, description) 1042, two-wheel or four-wheel drive 1043, cab style 1044, body style 1045, rear axle ratio 1046, payload package (extra payload or towing capacity) 1047, wheel base length 1048, roof color 1049, number of doors 1050, accent color (such as exterior paint color for the bottom half of the vehicle) 1051, spare tire specification 1052, preferred equipment package (PEP) 1053, option package 1054, stand alone options 1055, and any error message 1056. Lastly, warranty information is contained in a warranty parameter 1057.

Figure 14A:
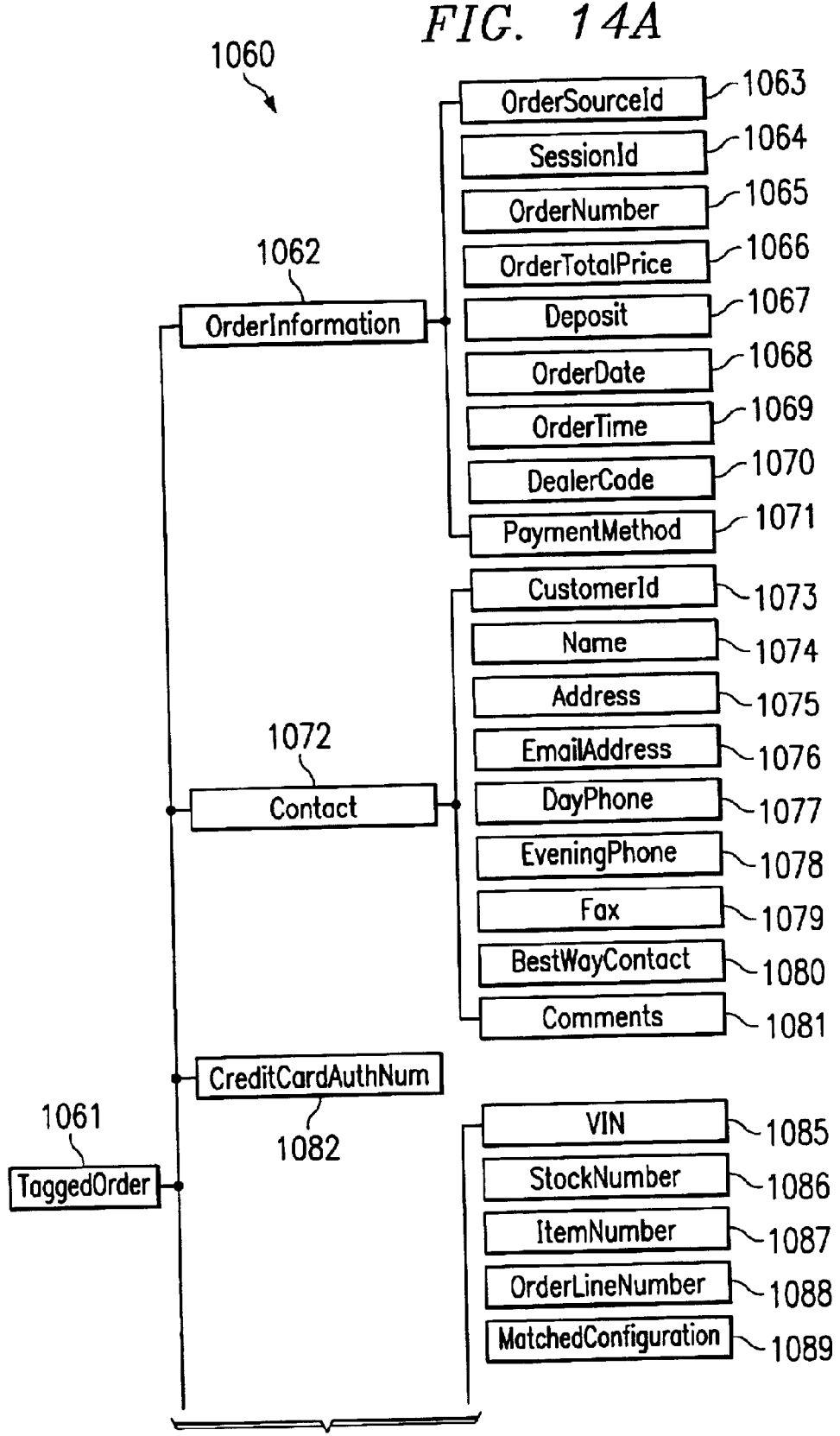
FIG. 14 is a diagram of an embodiment of a tag request message schema according to the teachings of the present invention.
Figure 14B:
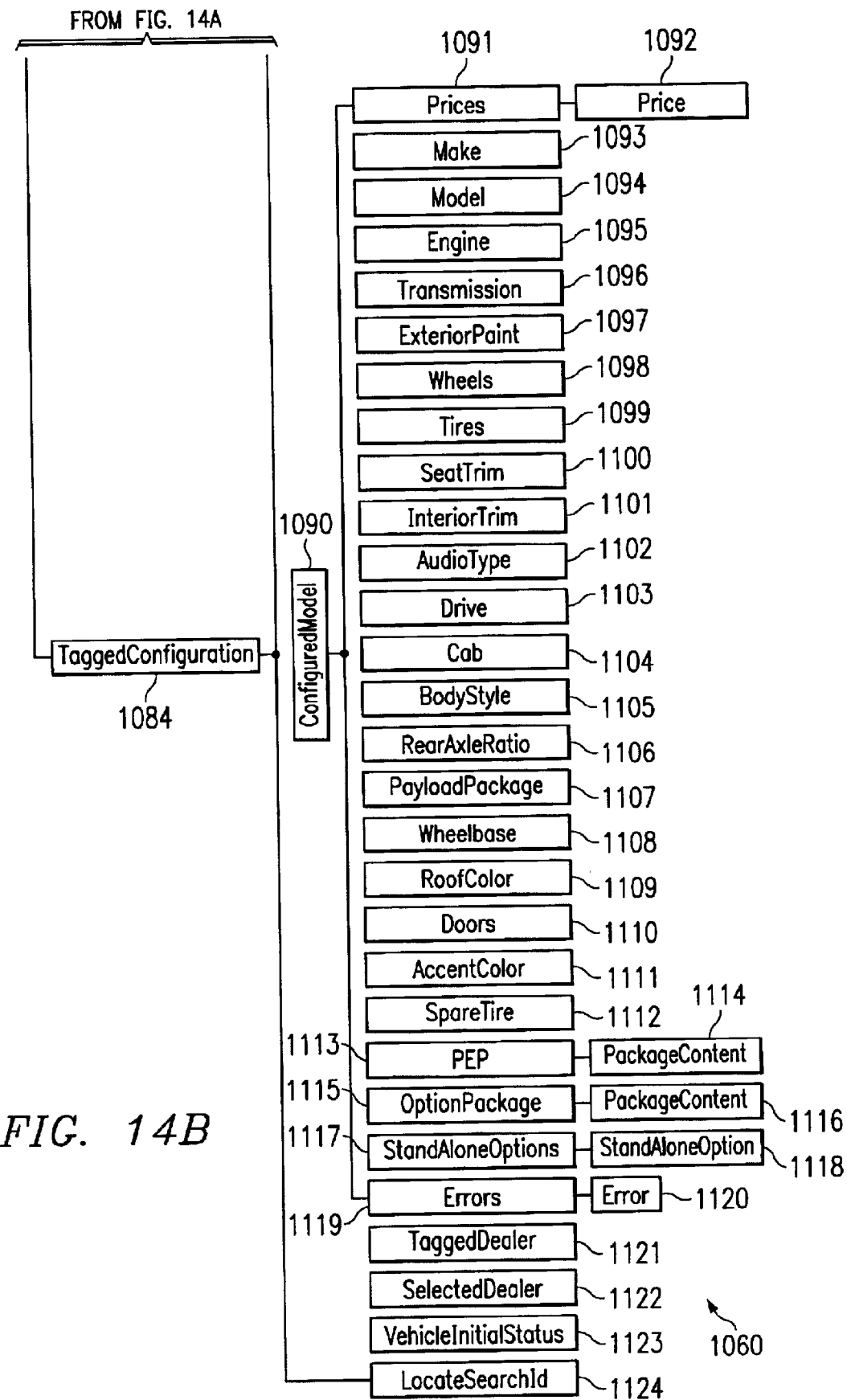
Figure 15:
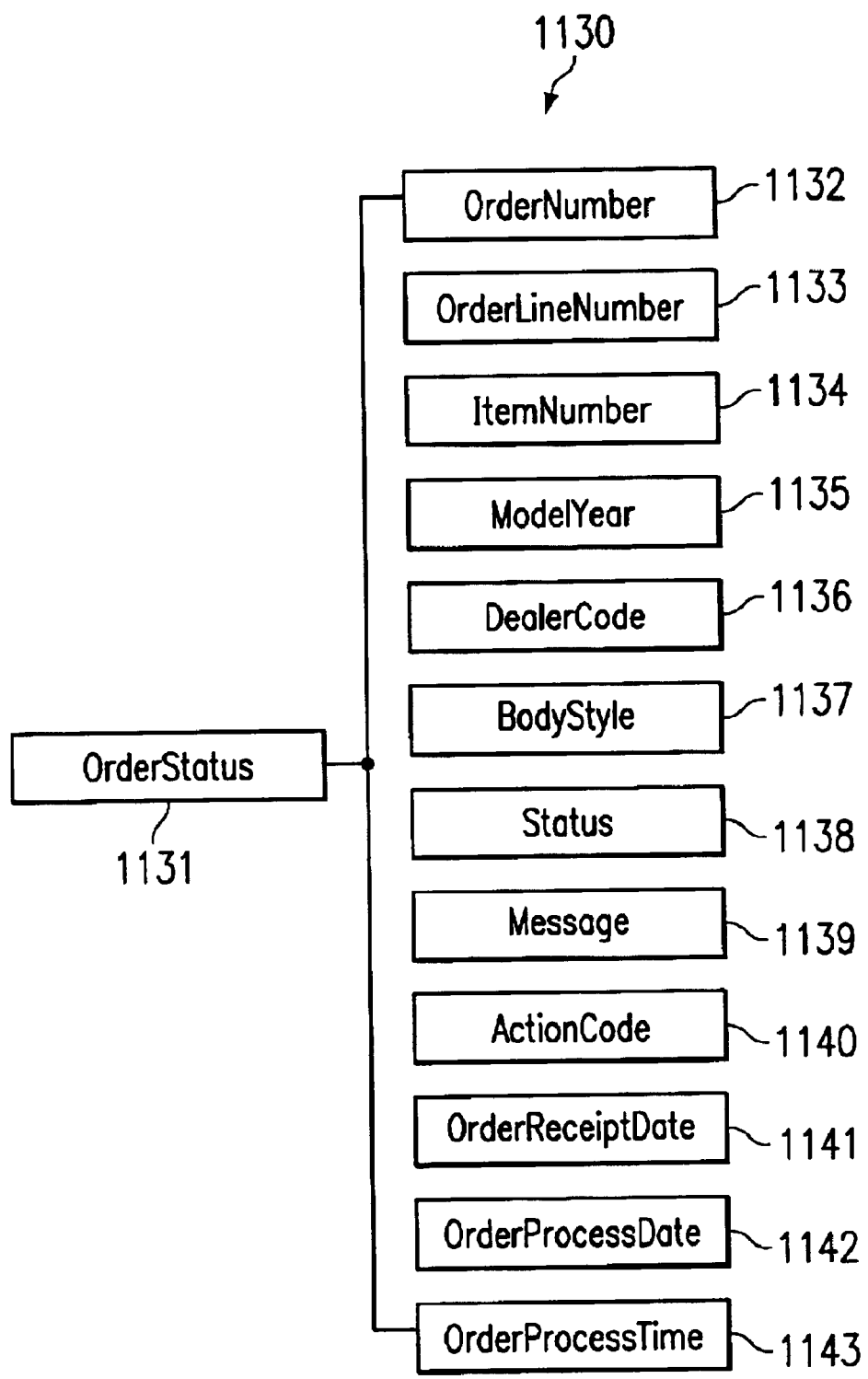
FIG. 15 is a diagram of an embodiment of a tag response message schema according to the teachings of the present invention.

A tag request message is sent from the workflow manager to the locate process in order to tag a vehicle for purchase. An embodiment of the tag request message format 1060 is similar to a tagged order message schema, which is shown in FIG. 14. Tag request format 1060 includes a top-level tagged order tag 1061. Tag request message 1060 includes four additional tags or parameters: order information 1062, contact 1072, credit card authorization number 1082, and tagged configuration 1084. Order information 1062 includes the following parameters: order source identifier 1063, session identifier 1064, order number 1065, order total price 1066, deposit amount 1067, order date 1068, order time 1069, dealer code 1070, and payment method 1071. Order source identifier 1063 and session identifier 1064 are used to identify the web site and session that submitted the order. Order number 1065 is a unique identifier generated and assigned to the order.

Contact 1072 contains customer contact information, such as a unique customer identifier 1073, name 1074, address 1075, email address 1076, daytime phone number 1077, evening phone number 1078, fax number 1079, a field 1080 describing the best method to contact the customer, and any other comments 1081.

Credit card authorization number 1082 is the authorization number generated in response to approving the use of the customer's credit card to tag the vehicle for purchase.

The tagged configuration parameter 1084 contains data of the tagged vehicle: VIN 1085, stock number 1086, item number 1087, order line number 1088, matched configuration 1089, configured model 1090, tagged dealer 1121, selected dealer 1122, vehicle initial status 1123 (new, used, in-stock), and locate search identifier 1124. Stock number 1086 is a number assigned to the vehicle by the dealer, item number 1087 is a number assigned to the vehicle by the enterprise mainframe. Matched configuration 1089 is a Boolean value (true or false) that indicates whether the tagged vehicle is exactly the same as the configured vehicle. Locate search identifier 1124 identifies the tagged configuration selected by the customer to place an order. The configured model 1090 parameter contains the same data on the configured vehicle, including prices 1091 (tag for price information), price 1092 (price offered to-the Internet customer, manufacturer's suggested retail price, invoice price), make 1093, model 1094, engine specifications 1095, transmission specifications 1096, exterior paint color 1097, wheels 1098, tires 1099, seat trim 1100, interior trim 1101, audio type 1102, drive 1103, cab 1104, body style 1105, rear axle ratio 1106, payload package 1107, wheel base 1108, roof color 1109, number of doors 1110, accent color 1111, spare tire 1112, PEP 1113, PEP package content 1114, option package 1115, option package content 1116, stand alone options tag 1117 for stand alone option 1118, errors tag 1119 for error 1120.

Tagged dealer 1121 is a tag for the dealer code of the dealer that has the requested vehicle. Selected dealer 1122 is the tag for the dealer code that the customer has selected from whom to purchase the vehicle. Vehicle initial status 1123 is the new, used, or in-stock status of the vehicle when it is tagged. Locate search identifier 1124 is used to identify the tagged configuration selected by the consumer to place the order.

In response to the tag request, a tag response message is generated. The tag response schema may include the order number, order line number, item number, model year, dealer code, body style, VIN, stock number, status type, status, message, action code, receipt date, process date, and process time. The tag response message is returned to Workflow manager as a confirmation that a vehicle has been successfully tagged in the database for purchase.

Order Process and Order Process Communication Message Schema

Figure 16:
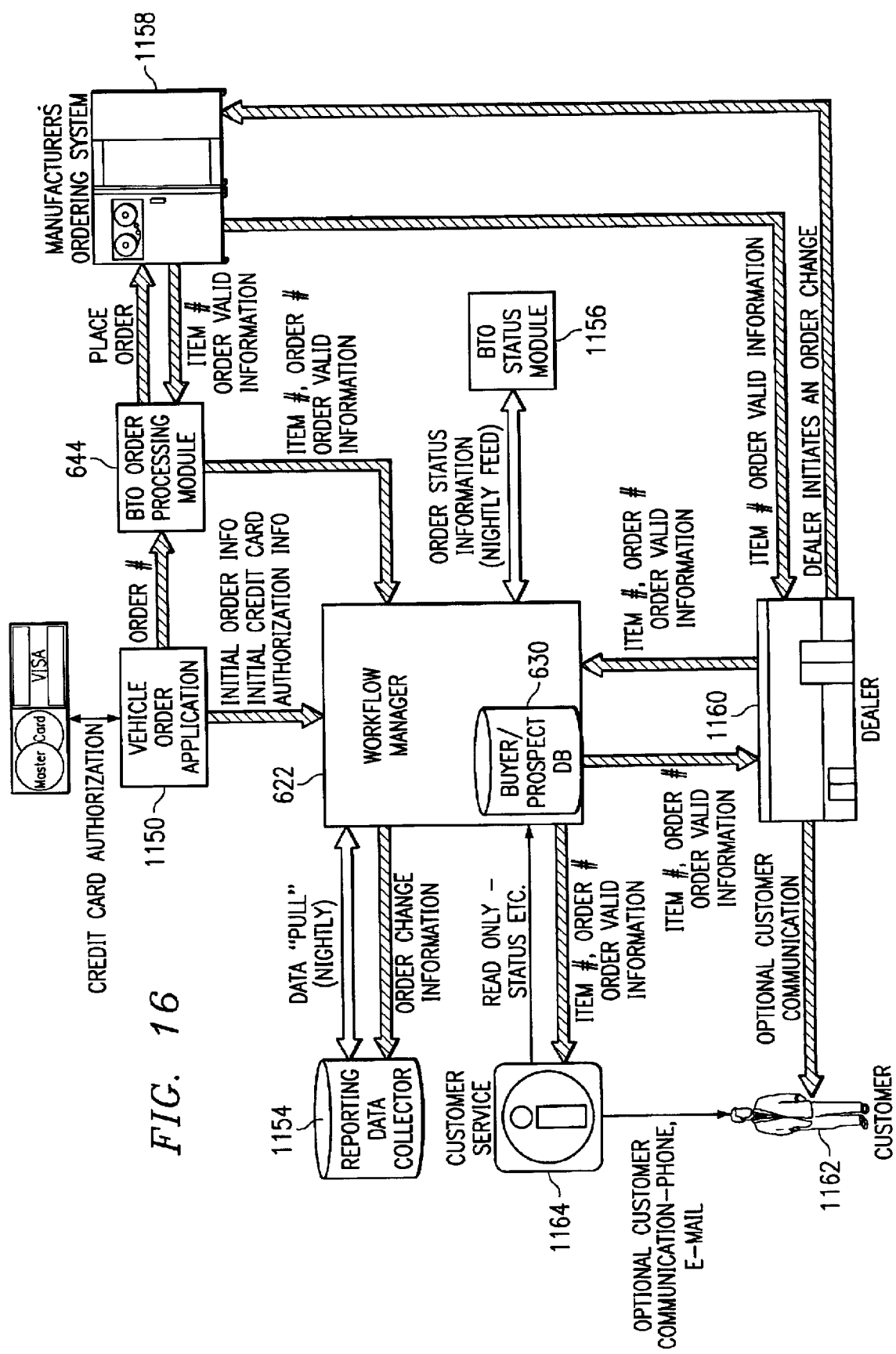
FIG. 16 is a more detailed block and flow diagram of an embodiment of message processing of the order process according to the teachings of the present invention.

Referring to FIG. 16, an overall data flow diagram for the order process according to an embodiment of the present invention is shown. As described above, the order process allows an Internet customer to submit a lead to a dealership or purchase vehicle from dealer inventory, vehicles in-transit, or orders scheduled to be built. Order process 644 receives an order number from a vehicle order application 1150, which typically resides at a web site, portal or is part of the portal. Vehicle order application 1150 also sends initial order information, initial credit card authorization information to workflow manager 622. Order process 644 places the order into the enterprise ordering system 1158, which resides on the enterprise mainframes. Enterprise ordering system 1158 returns an item number and other order validation information to order process 644. Enterprise ordering system 1158 also sends the item number and order validation information to a dealer 1160 that either has the selected vehicle or will take delivery of the vehicle to the consumer. The item number, order number and order validation information are also provided to a customer service process 1164, which is operable to communicate with the customer 1162 via several modes of communication. Dealer 1160 may also initiate change to an order by sending the change information to enterprise ordering system 1158 as well as to workflow manager 622. The order change information is provided to a reporting data collector 1154. Workflow manager 622 also provides order status information to status module 1156.

Figure 17A:
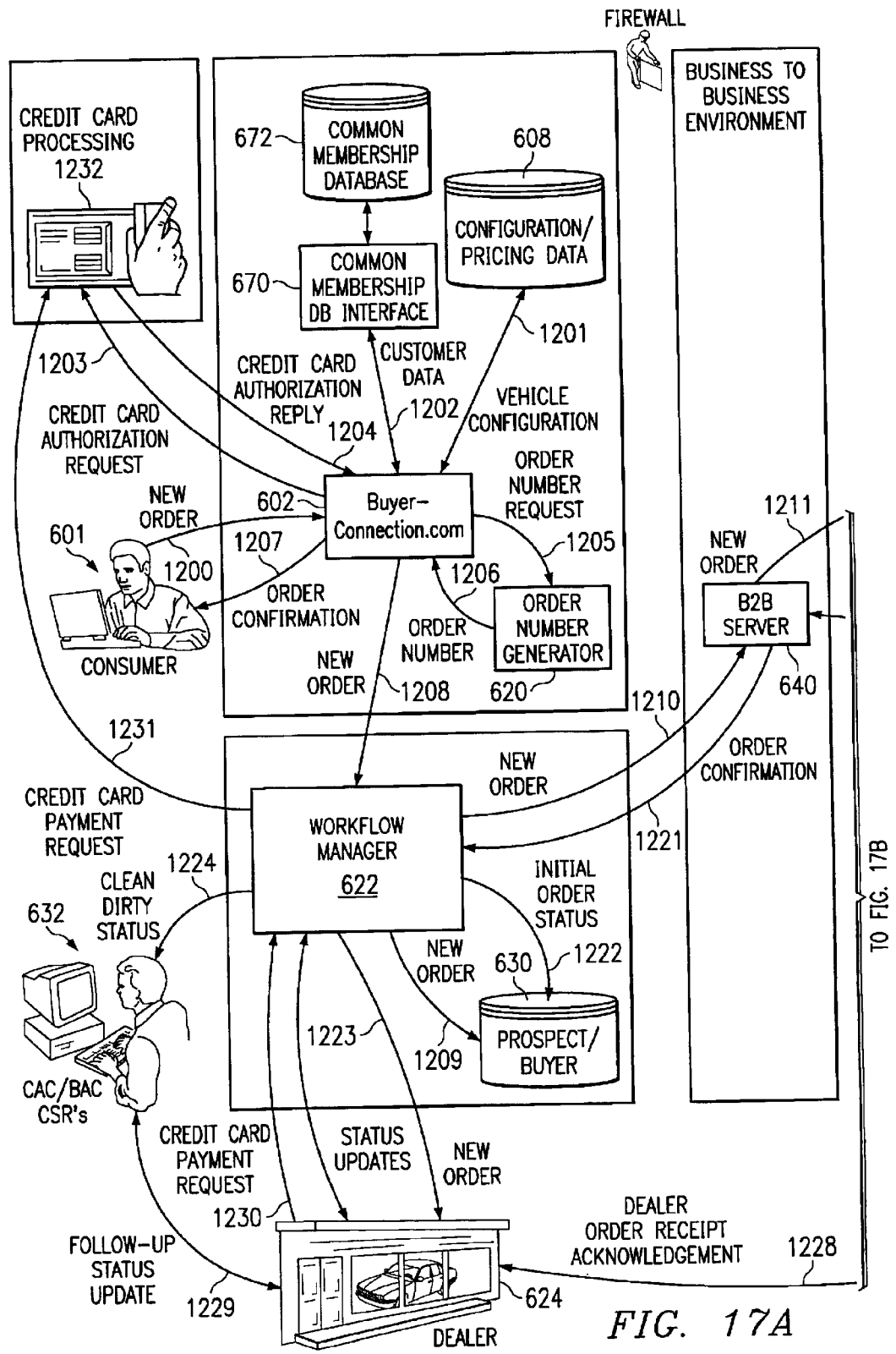
FIG. 17 is a more detailed block and flow diagram of an embodiment of new order message processing according to the teachings of the present invention.
Figure 17B:
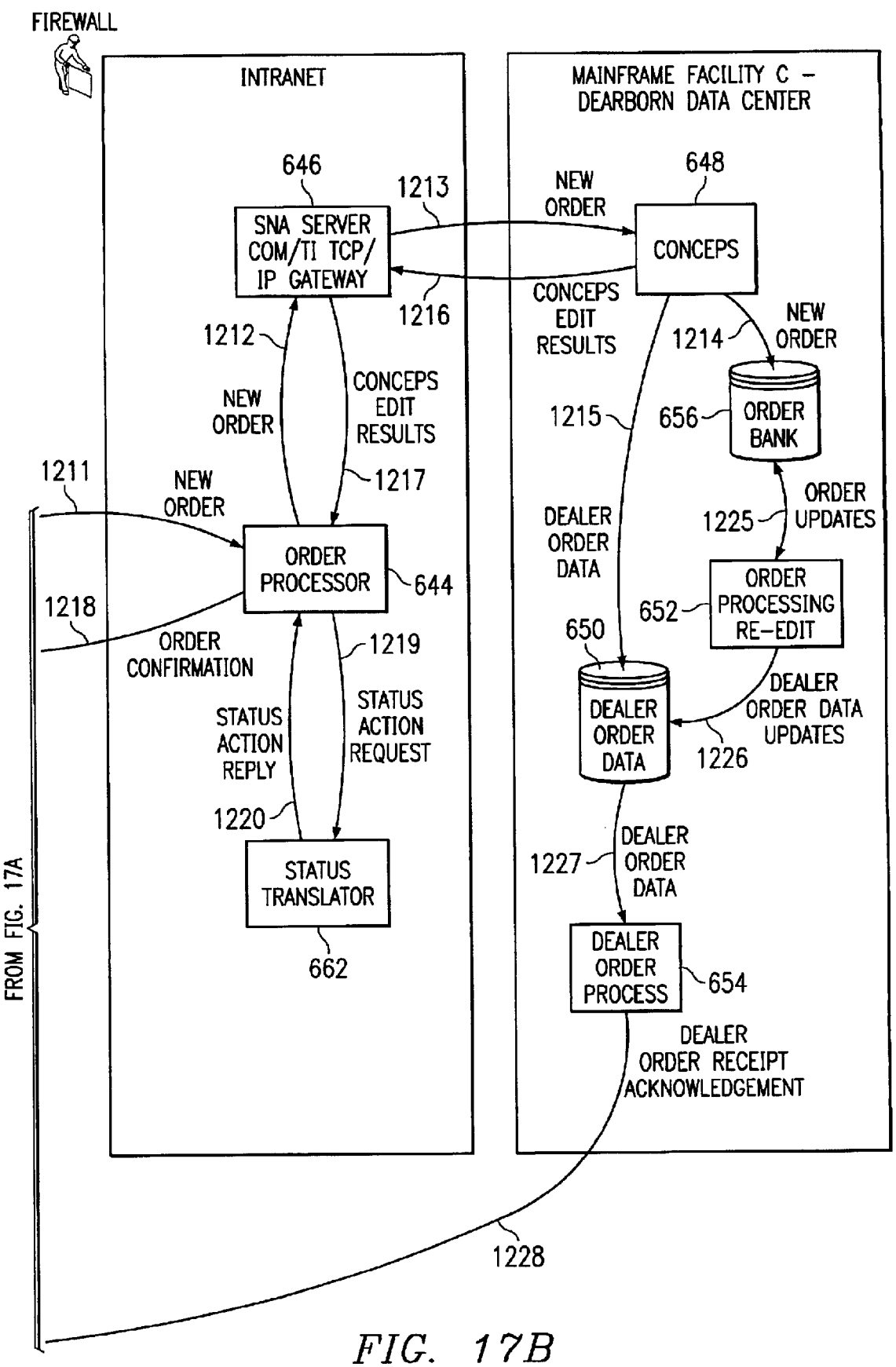

FIG. 17 is a more detailed block and flow diagram of an embodiment of new order processing according to the teachings of the present invention. A consumer 601 submits a new order 1200 to a web site 602, which is constructed as an interface between the vehicle manufacturer and the customers. As described previously, the consumer has performed a search and has selected a vehicle that satisfies the consumer's selection criteria. Web site 602 retrieves vehicle configuration information 1201 from configuration and pricing database 608, and customer data 1202 from common membership database 672 via interface 670. Web site 602 sends a request 1203 for credit card authorization to a credit card process 1232, which returns a credit card authorization reply 1204 to web site 602. Web site 602 also sends an order number request 1205 to an order number generator 620, which generates a unique order number 1206 used to identify the order. Web site 602 provides an order confirmation 1207 with the received order number to consumer, which is displayed on a web page. Web site 602 provides a new order message 1028 to workflow manager 622, which forwards the new order information 1209 to prospect/buyer database 630 and to B2B server 640 in the form of a new order message 1210. B2B server 640 forwards new order message 1211 to order process 644. Order process 644 then sends the new order information 1212 to SNA server 646, which also sends the new order information 1213 to CONCEPS 648. CONCEPS 648 forwards the new order 1214 to order bank 656. CONCEPS 648 sends the dealer order data portion 1215 of the new order to dealer order database 650. CONCEPS 648 then returns edit results 1216 to SNA server 646, which forwards the information 1217 to order process 644.

In response to receiving the CONCEPS edit results, order process 644 sends an order confirmation message 1218 to B2B server 640. Order process 644 may also request status action 1219 from a status action lookup process 662, which returns a status action reply 1220. B2B server 640 forwards the order confirmation message 1221 to workflow manager 622. Prospect/buyer database 630 is then updated with initial order status by workflow manager 622. Workflow manager 622 sends information on the new order to dealer 624. Workflow manager 622 also sends clean/dirty status 1224 to customer assistance center/business assistance center, and customer service representatives (CAC/BAC CSR) 632. Back at the enterprise mainframe, order processing re-edit process 652 updates order bank 656, and updates dealer order information stored in dealer order database 650. Dealer order data 1227 is forwarded to a dealer order process 654, which sends a dealer order receipt acknowledgement report 1228 to dealer 624. Customer service representatives 632 is provided with follow-up and status updates 1229. Workflow manager 622 provides dealer 624 with periodic status updates. Dealer 624 sends a credit card payment request 1230 to workflow manager 622, which forwards the request 1231 to credit card processor 1232.

Figure 18:
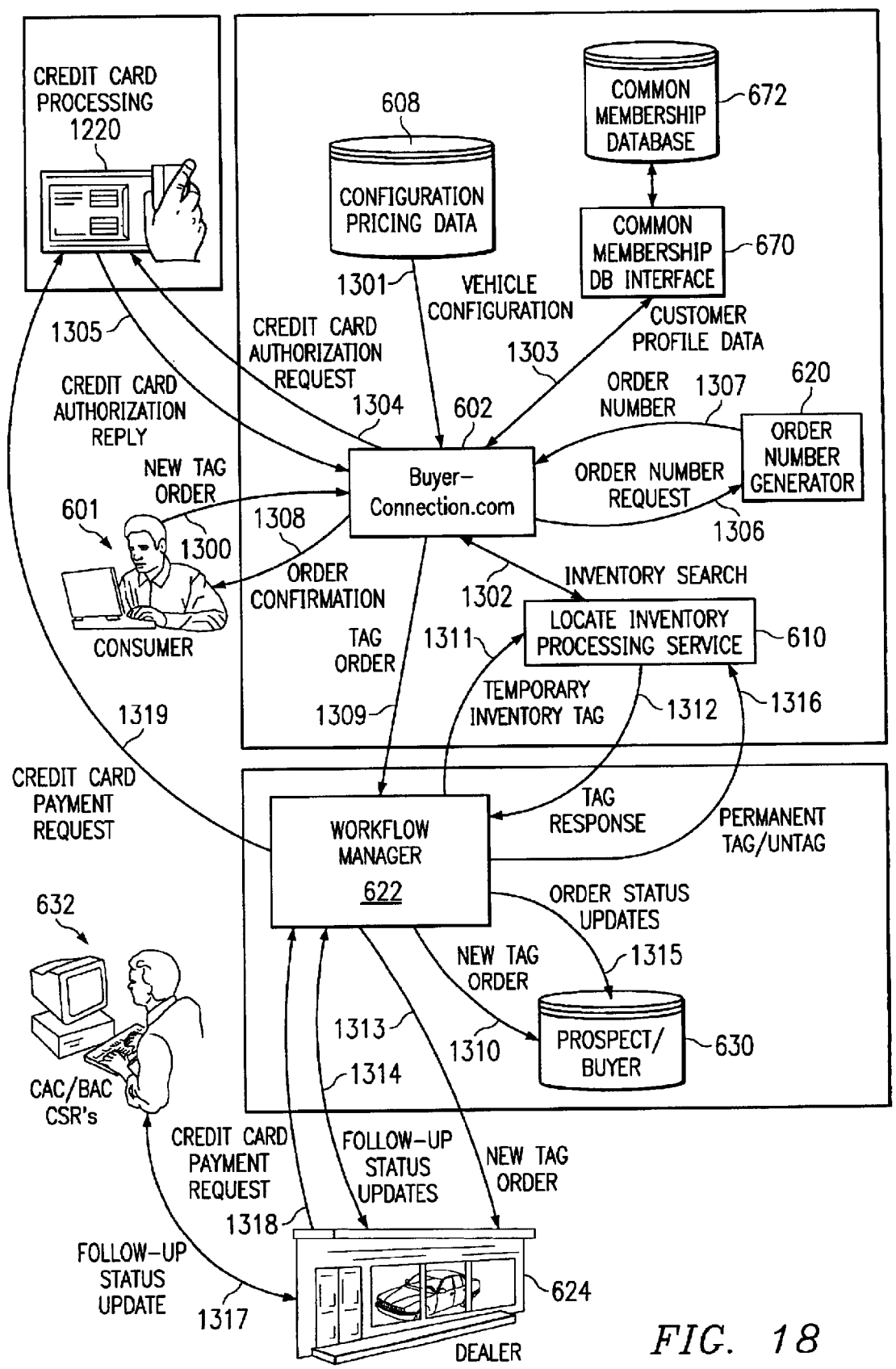
FIG. 18 is a more detailed block and flow diagram of an embodiment of tag order message processing according to the teachings of the present invention.
Figure 23:
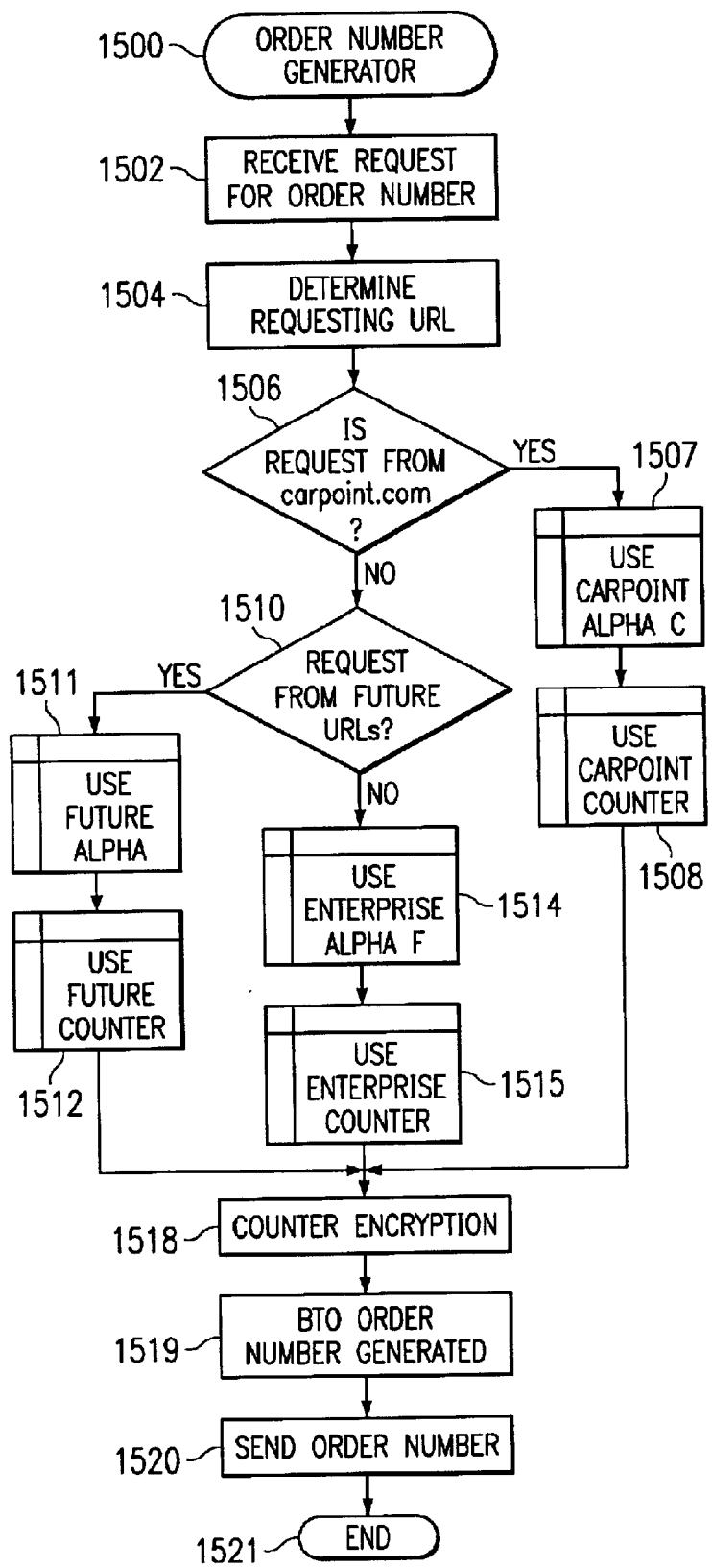
FIG. 23 is a flowchart of an embodiment of an order number generating process according to the teachings of the present invention.

FIG. 18 is a more detailed block and flow diagram of an embodiment of tag order processing according to the teachings of the present invention. A consumer 601 submits a tag order 1300 to web site or portal 602, which is constructed as an interface between the vehicle manufacturer and the customers. Web site 602 receives a vehicle configuration message 1301 from vehicle configuration and pricing database 608 and receives information 1302 on vehicle inventory search from locate process 610. Customer profile data 1303 are also stored into common membership database 672 via common membership database interface 670. Web site 602 also submits a credit card authorization request 1304 to a credit card processor 1220, which then returns a reply 1305. Web site 602 also sends an order number request 1306 to order number generator 620, which then returns a unique order number 1307. The process by which the order numbers are generated is shown in FIG. 23 and described below. Web site 602 then sends an order confirmation 1308 to consumer 601 with the generated order number.

Thereafter, web site 602 sends a tag order message 1309 to workflow manager 622, which forwards the new tag order information to prospect/buyer database 630. A temporary inventory tag message 1311 is then sent from workflow manager 622 to locate process 610. A temporary tag is used initially when an Internet consumer requests to tag or reserve a vehicle. When a vehicle is temporarily tagged, it is not returned in subsequent search results. Locate process 610 updates the data in the inventory database and sends a tag response message 1312 back as confirmation. Workflow manager 622 also informs dealer 624 by sending a new tag order 1313.

Periodically or when necessary, workflow manager 622 and dealer 624 communicate to inform one another of inventory availability follow-up an status updates 1314. Prospect/buyer database 630 is updated by order status updates 1315 from workflow manager 622. Workflow manager 622, at the request of dealer 624 or consumer 601, may also send request messages 1316 to permanently tag or untag a vehicle in the database. A permanent tag is typically submitted by a dealer through the workflow manager to indicate that the transaction is completed on a vehicle that had been previously temporarily tagged. A permanent tag message deletes the vehicle from the inventory database. An untag message is used to cancel a temporary tag on a vehicle. The untag message allows the specified vehicle to again be searched pursuant to subsequent search requests. An untag message may be submitted by a dealer, the CAC/BAC, CSR, consumer, or via locate administrative process that searches for expired temporary tags. A temporary tag automatically expires after a predetermined period, such as 30 days, for example. Customer service representatives 632 also updates or is updated by dealer 624 regarding inventory availability follow-up and status updates 1317. Dealer 624 also sends a credit card payment request 1318 to workflow manager 622, which sends the request 1319 to credit card processor 1220.

Figure 19:
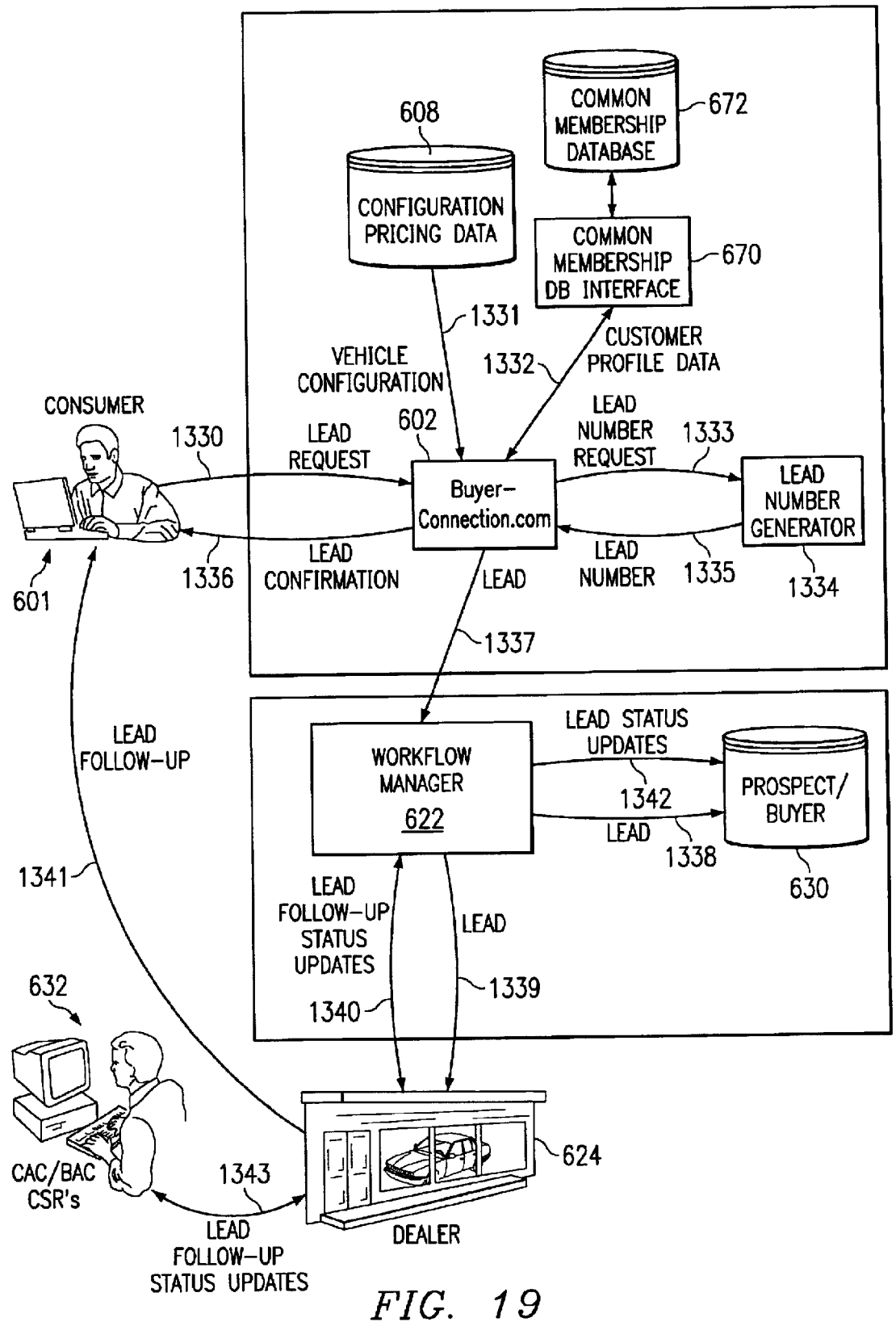
FIG. 19 is a more detailed block and flow diagram of an embodiment of lead message processing according to the teachings of the present invention.

FIG. 19 is a more detailed block and flow diagram of an embodiment of customer lead processing according to the teachings of the present invention. Consumer 601 requests 1330, from web site 602, information on a dealership, or a lead on the dealership. Vehicle configuration information 1331 is then retrieved from configuration/pricing database 608 to web site 602. Web site 602 also stores or retrieves customer profile data 1332 to or from common membership database 672. Web site 602 sends a request 1333 for a lead number to a lead number generator 1334. A lead number 1335 is generated and routed to web site 602. A lead confirmation 1336 is sent to consumer 601 to provide the information on the selected dealer. A lead message 1337 is then sent to workflow manager 622, which stores the dealer lead information 1338 associated with the consumer in prospect/buyer database 630. The lead information 1339 is also provided to dealer 624, so that the dealer may follow-up on the lead with the consumer. Dealer 624 may report to workflow manager 622 with lead follow-up and status update information 1340, when dealer 624 follows up 1341 with consumer 601. Lead status update information 1342 is provided to prospect/buyer database 630. Dealer 624 also provides customer service representatives 632 lead follow-up and status update information 1343.

Figure 20:
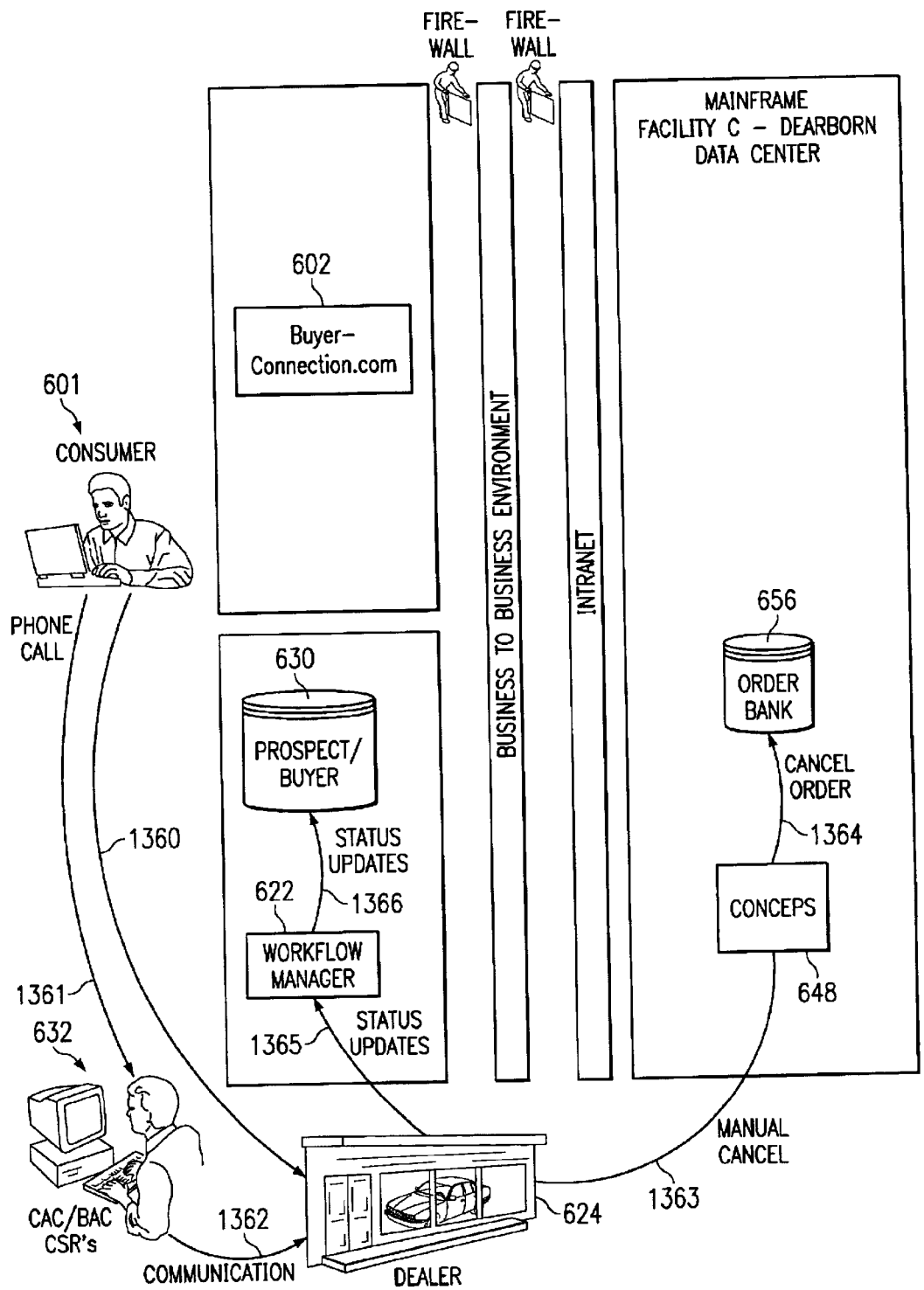
FIG. 20 is a more detailed block and flow diagram of an embodiment of cancel unscheduled order message processing according to the teachings of the present invention.

An unscheduled order may be cancelled as shown in the block and data flow diagram shown in FIG. 20. As opposed to a scheduled order, an unscheduled order is one that is initiated by the consumer and not previously planned or scheduled by the enterprise. Consumer 601 sends a cancel request 1360 to dealer 624. Consumer 601 may also convey his or her desire to cancel the order via some communication 1361 to customer service representatives 632, which conveys the cancel request 1362 to dealer 624. Dealer 624 then submits a cancel message 1363 to CONCEPS 648. In response, CONCEPS 648 updates order bank 656 with a cancel message 1364. Dealer 624 further sends a status update 1365 to workflow manager 622, which forwards a status update 1366 to prospect/buyer database 630.

Figure 21:
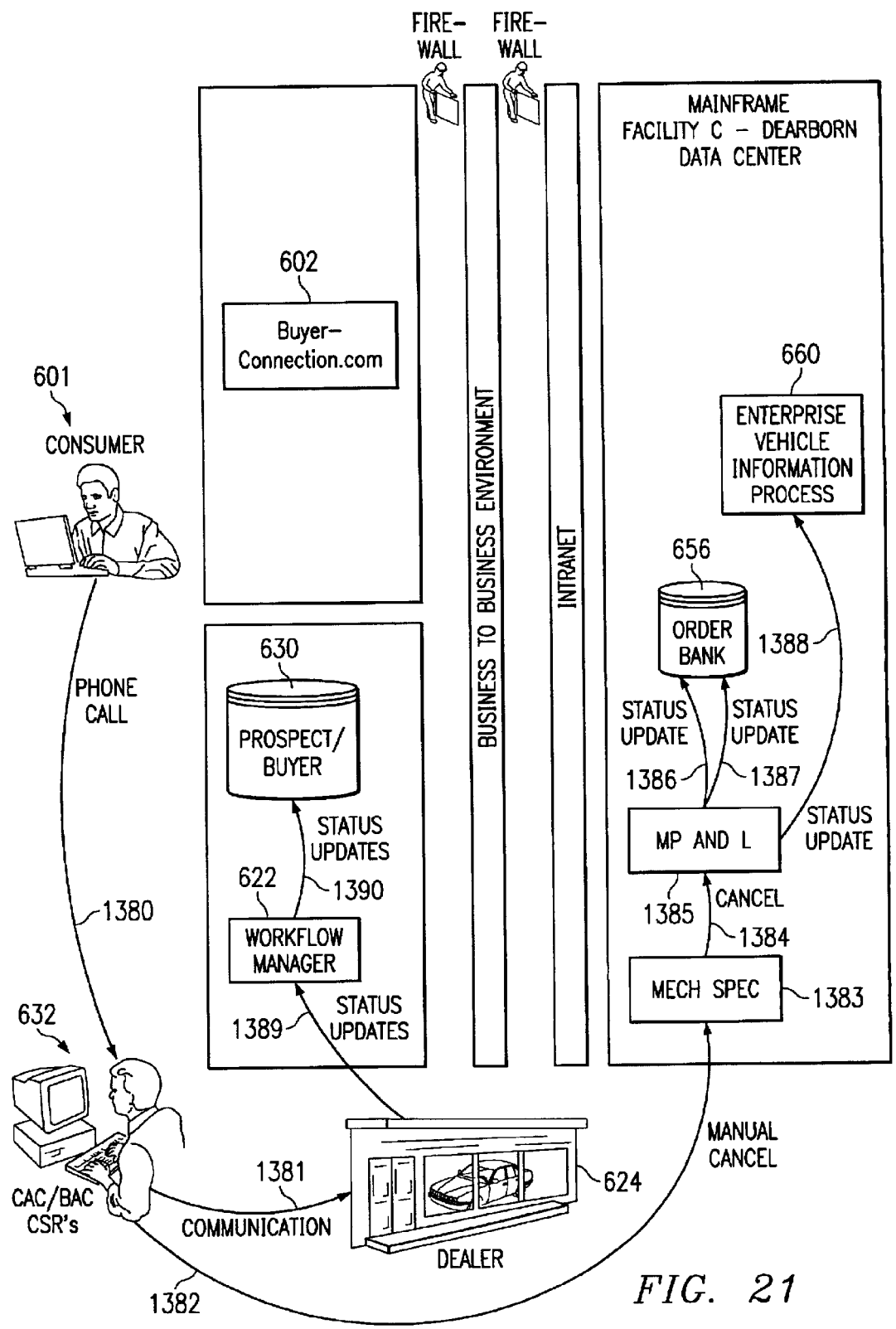
FIG. 21 is a more detailed block and flow diagram of an embodiment of cancel scheduled order message processing according to the teachings of the present invention.

A scheduled order may be cancelled as shown in the block and data flow diagram shown in FIG. 21. Consumer 601 communicates his/her desire to customer service representatives 632 to cancel the order 1380. In response, customer service representatives 632 communicate the cancel request to dealer 624 and also send a cancel request 1382 to a mech. spec. process 1382. Mech. spec. process 1382 sends a cancel message 1384 to a MP&L process 1385. MP&L process 1385 in turn sends status updates 1386 and 1388 to order bank 656 and enterprise vehicle information process 660. Dealer 624 further sends a status update 1389 to workflow manager 622, which forwards a status update 1390 to prospect/buyer database 630.

Figure 22:
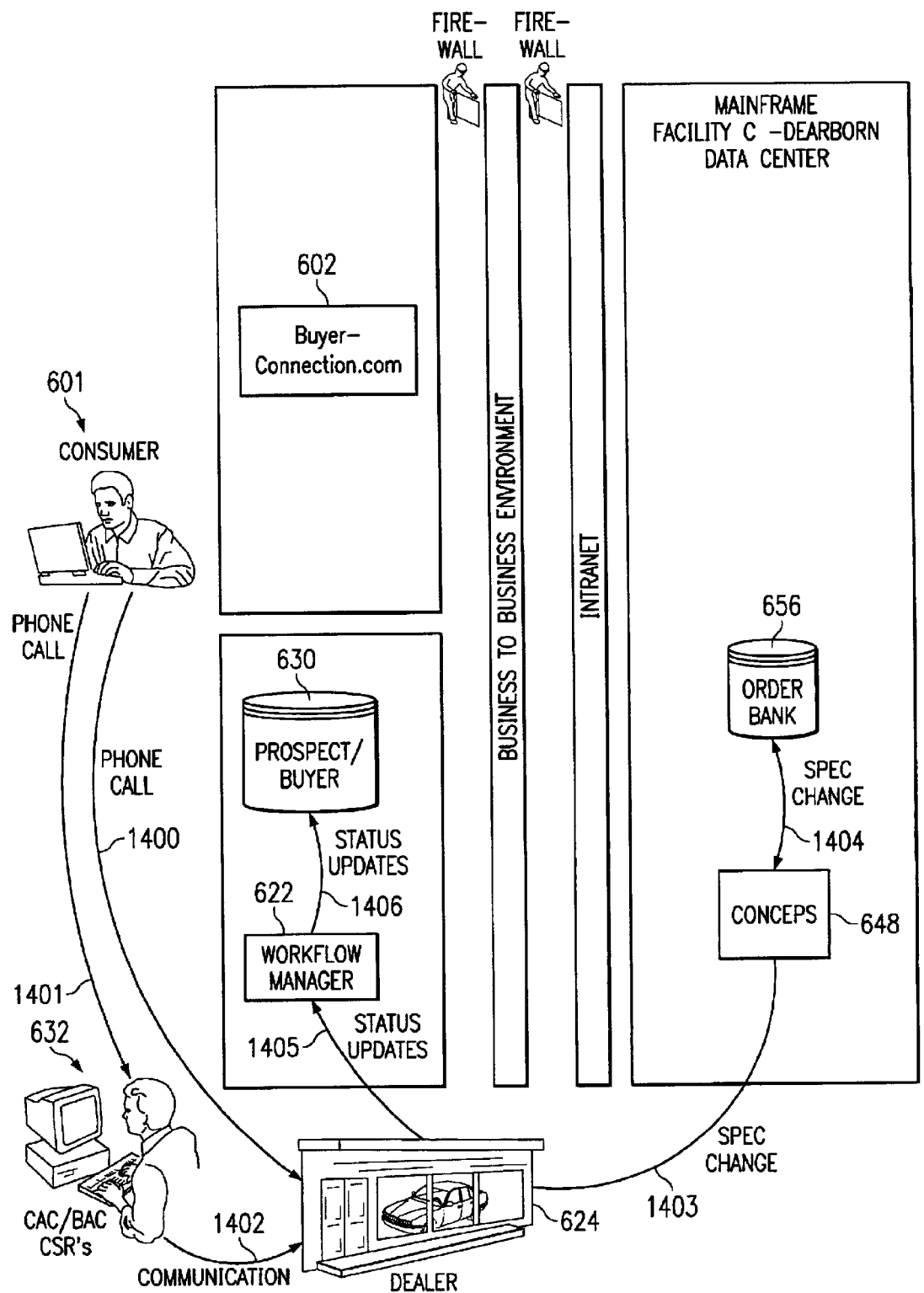
FIG. 22 is a more detailed block and flow diagram of an embodiment of specification change message processing according to the teachings of the present invention.

The consumer may also change the specification of the vehicle which he/she has ordered. A block and data flow diagram of an embodiment of the specification change process is shown in FIG. 22. Consumer 601 communicates 1400 a specification change request to dealer 624. Consumer 601 may also convey his or her desire to cancel the order via some communication 1401 to customer service representatives 632, which convey the specification change request 1402 to dealer 624. Dealer 624 then submits a specification change message 1403 to CONCEPS 648. In response, CONCEPS 648 updates order bank 656 with information on the specification changes 1404. Dealer 624 further sends a status update 1405 to workflow manager 622, which forwards a status update 1406 to prospect/buyer database 630.

FIG. 23 is a flowchart of an embodiment of an order number generator and process 1500 according to the teachings of the present invention. Order number generator 1500 receives a request to generate an order number, as shown in block 1502. A determination is made as to the origin of the request, as shown in block 1504, as any number of web sites authorized to do business with the present system may generate this request. In block 1506, it is determined whether the request came from a first web site, such as ford.com, buyerconnection.com or carpoint.com, for example. If the first web site generated the order number request, then a predetermined constant, alpha, and a counter are used to generate an order number, as shown in blocks 1507 and 1508. Similarly, for each web site, a different set of alpha and counter are used to generate a unique order number, as shown in blocks 1511–1515. In blocks 1518 and 1519, an encryption algorithm is used to encrypt the counter value. This is done so that the Nth order does not get assigned an order number N. The order number is then sent to the requester, as shown in block 1520. The process ends in block 1521.

Figure 24:
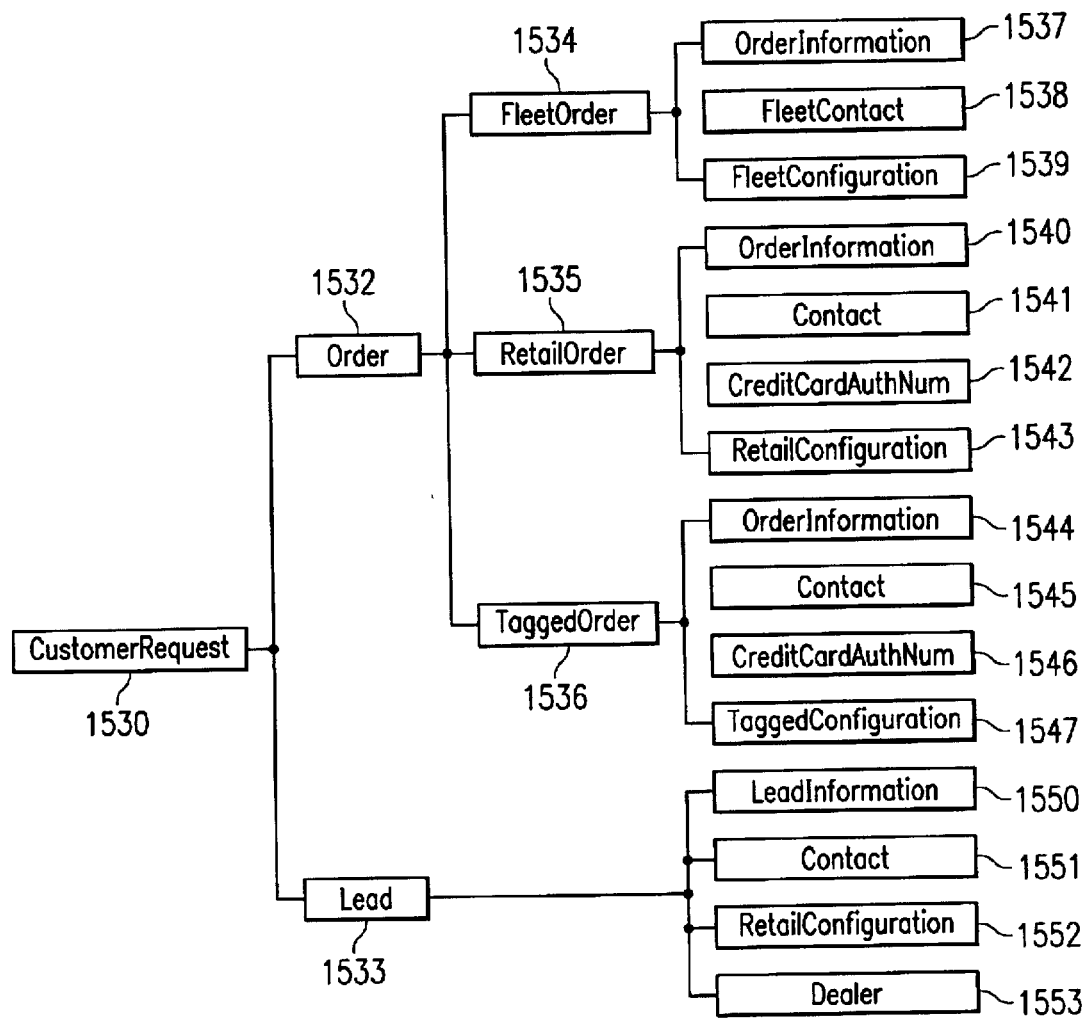
FIG. 24 is a diagram of an embodiment of a customer request message schema according to the teachings of the present invention.
Figure 25A:
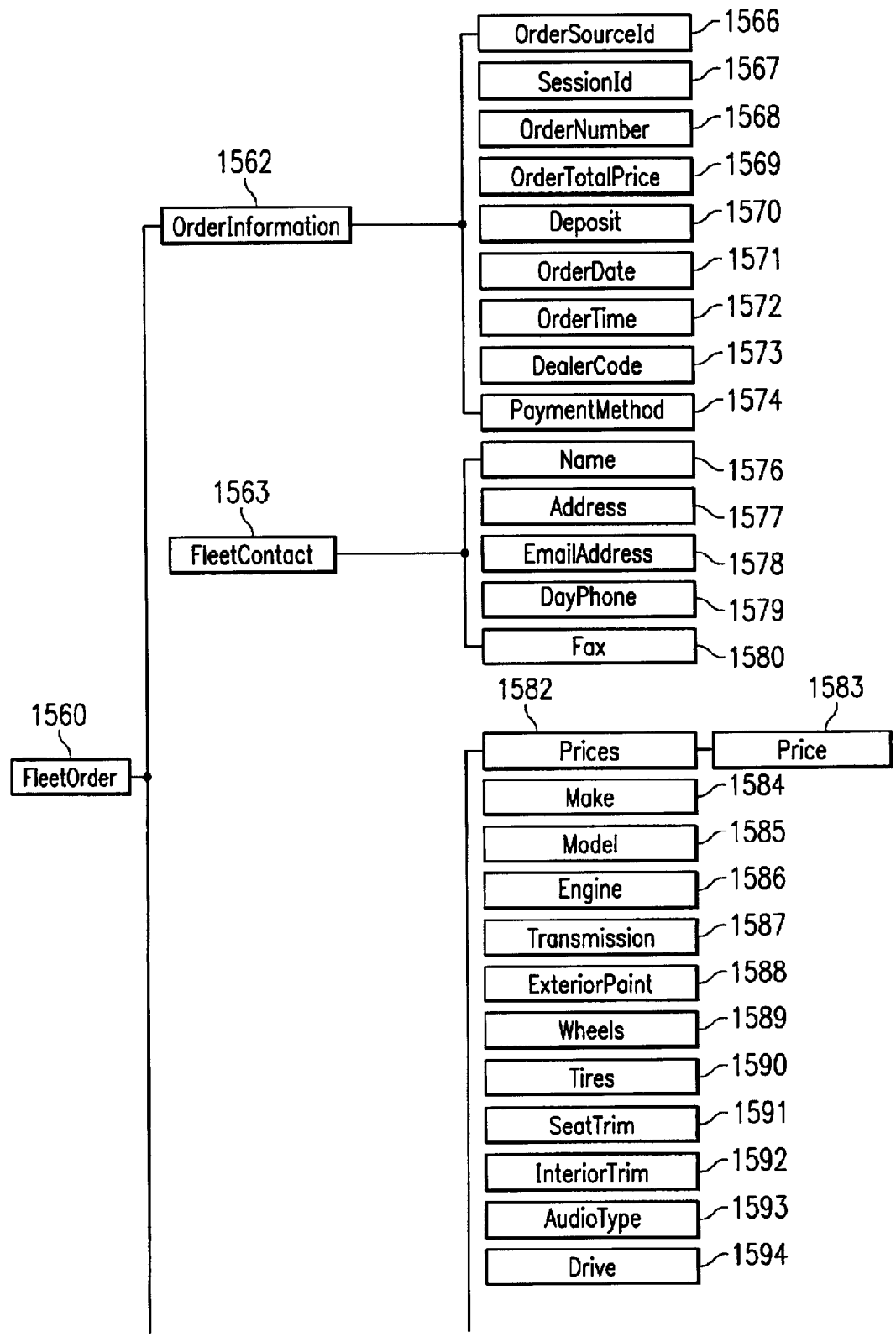
FIG. 25 is a diagram of an embodiment of a fleet order message schema according to the teachings of the present invention.
Figure 25B:
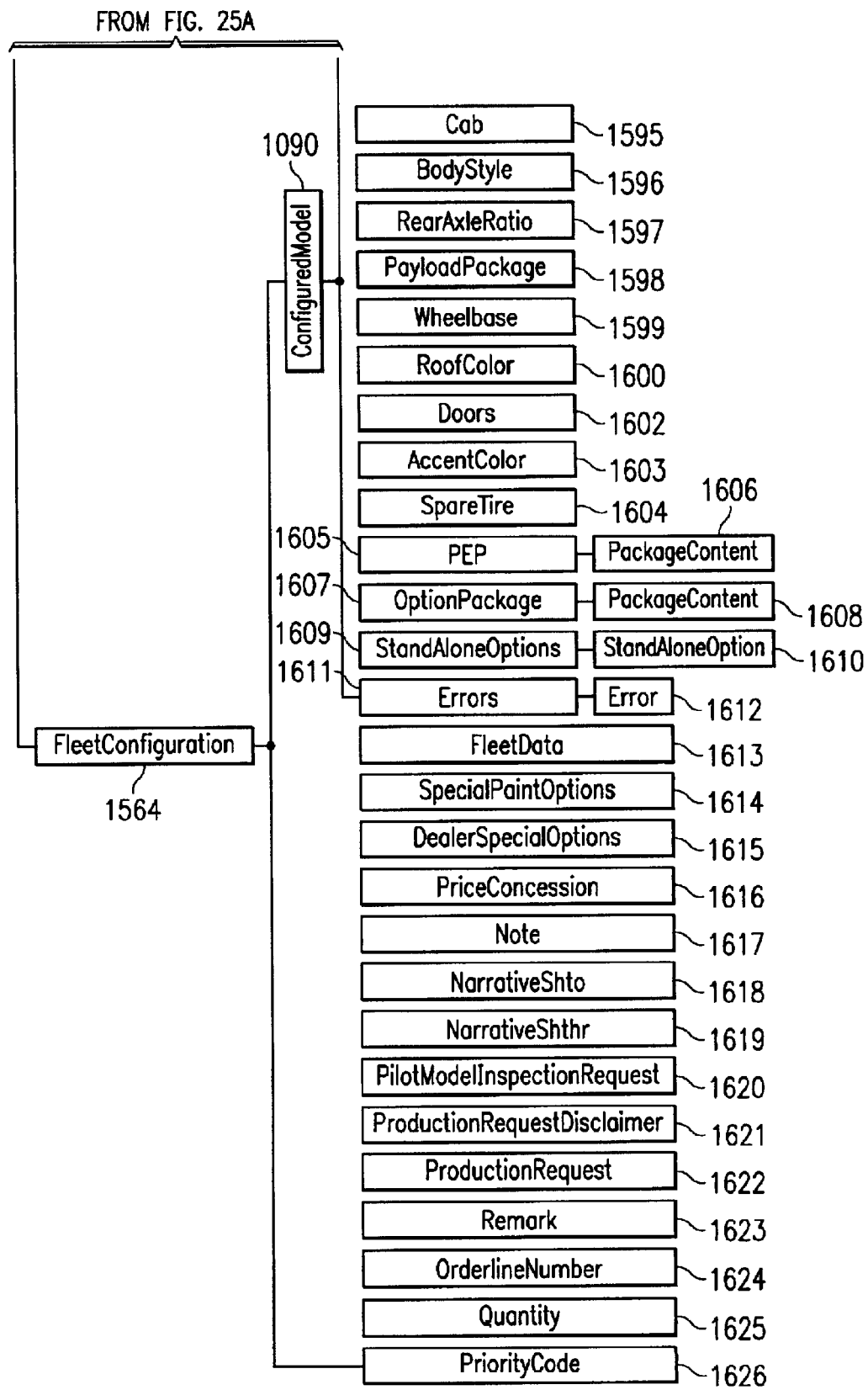

FIG. 24 is a message hierarchy diagram of customer request messages 1530 sent from the consumer web site to the workflow manager according to the teachings of the present invention. There are at least two types of customer request messages: an order 1532 and a lead 1533. There are at least three types of messages conveying an order: fleet order message 1534, retail order message 1535, and tagged order message 1536. A fleet order message 1535 is used primarily to place an order encompassing multiple vehicles. A tagged order message 1536 is used primarily to place an order on a vehicle that was identified by the locate process. The selected vehicle may be in dealer inventory, in-transit, in-process, or on the order bank. A retail order message 1535 is used primarily to place an order by a dealer. As discussed above, XML messaging or other comparable means may be used for communicating the order information between components in the present system.

Fleet order XML message 1535 includes three primary parameters: order information 1537, fleet contact 1538, and fleet configuration 1539. Similarly, retail order XML message 1535 includes an order information parameter 1540, a contact parameter 1541, a credit card authorization number parameter 1542, and a retail configuration parameter 1543.

Tagged order message 1536 also includes an order information parameter 1544, a contact parameter 1545, a credit card authorization number parameter 1546, and a tagged configuration parameter 1547. It may be seen that there is commonality between the message formats for the three types of order messages. The detailed format of each order message is described below.

The fleet order message includes a top level tag, FleetOrder 1560, and three tags, OrderInformation 1562, FleetContact 1563, and FleetConfiguration 1564, at the next level. As described above, OrderInformation tag 1562 is used to include data related to the order, FleetContact tag 1563 is used to include data related to the contact or the purchaser, and FleetConfiguration tag 1564 is used to include data related to the vehicle configuration of the ordered vehicles. The order information parameters include order source identifier 1566, session identifier 1567, order number 1568, order total price of the fleet 1569, deposit amount 1570, order date 1571, order time 1572, dealer identification code 1573, and payment method 1574. The fleet contact parameters include the name of the contact person 1576, address 1577, email address 1578, daytime phone number 1579, and facsimile number 1580.

The fleet configuration parameters include specifications on the configured model, which is the same or similar to the format used in the tag request message. The configured model parameters include price information (type, value, currency) 1582 and 1583, make (code, description) 1584, model (code, name, year, trim, description) 1585, engine specifications (code, displacement, number of cylinders, fuel type) 1586, transmission specifications (code, type, speed, description) 1587, exterior paint color (code, description) 1588, wheel specifications (code, diameter, description) 1589, tire specifications (code, manufacturer, description) 1590, seat trim color 1591, interior trim materials 1592, audio system specifications (code, radio, cassette, CD, description) 1593, two-wheel or four-wheel drive 1594, cab style 1595, body style 1596, rear axle ratio 1597, payload package (extra payload or towing capacity) 1598, wheel base length 1599, roof color 1600, number of doors 1601, accent color (such as exterior paint dolor for the bottom half of the vehicle) 1602, spare tire specification 1603, preferred equipment package (PEP) 1604, PEP package content 1606, option package 1607, option package content 1608, stand alone options 1609, stand alone package content 1610, and any error messages 1611 and 1612.

Another fleet configuration parameter is fleet data 1613, which contains information related to the fleet order. Another parameter is special paint options 1614, which contains additional exterior paint options that the fleet customer may specify. Dealer special options parameter 1615 allows the fleet customer to specify additional special options for the vehicles. Price concession 1616 is used to provide information on any price concessions that may have been made to secure the fleet order. A note parameter 1617 allows additional information related to the fleet order to be communicated. The next two parameters, narrative ship to 1618 and narrative ship through 1619 are used to provide detailed information on shipping the vehicle fleet. The ship to and ship through information includes name, street address, city, and state information. A pilot model inspection request parameter 1620 contains information related to pilot model inspection, such as contact name, phone number, and date. A production request disclaimer 1621 is used to convey information on the production request disclaimer, such as information related to the approval or rejection of the disclaimer. A production request parameter 1622 is used to communicate information on production request, such as units, month, week, contact name, and contact information. Additional information may be provided in a remarks parameter 1623. The next parameter, order line number 1624, provides the line number for a given configuration within an order. A quantity parameter 1625 is used to communicate the number of vehicle ordered for the fleet order. Lastly, a priority code parameter 1626 is a value used for production scheduling priority.

Figure 26A:
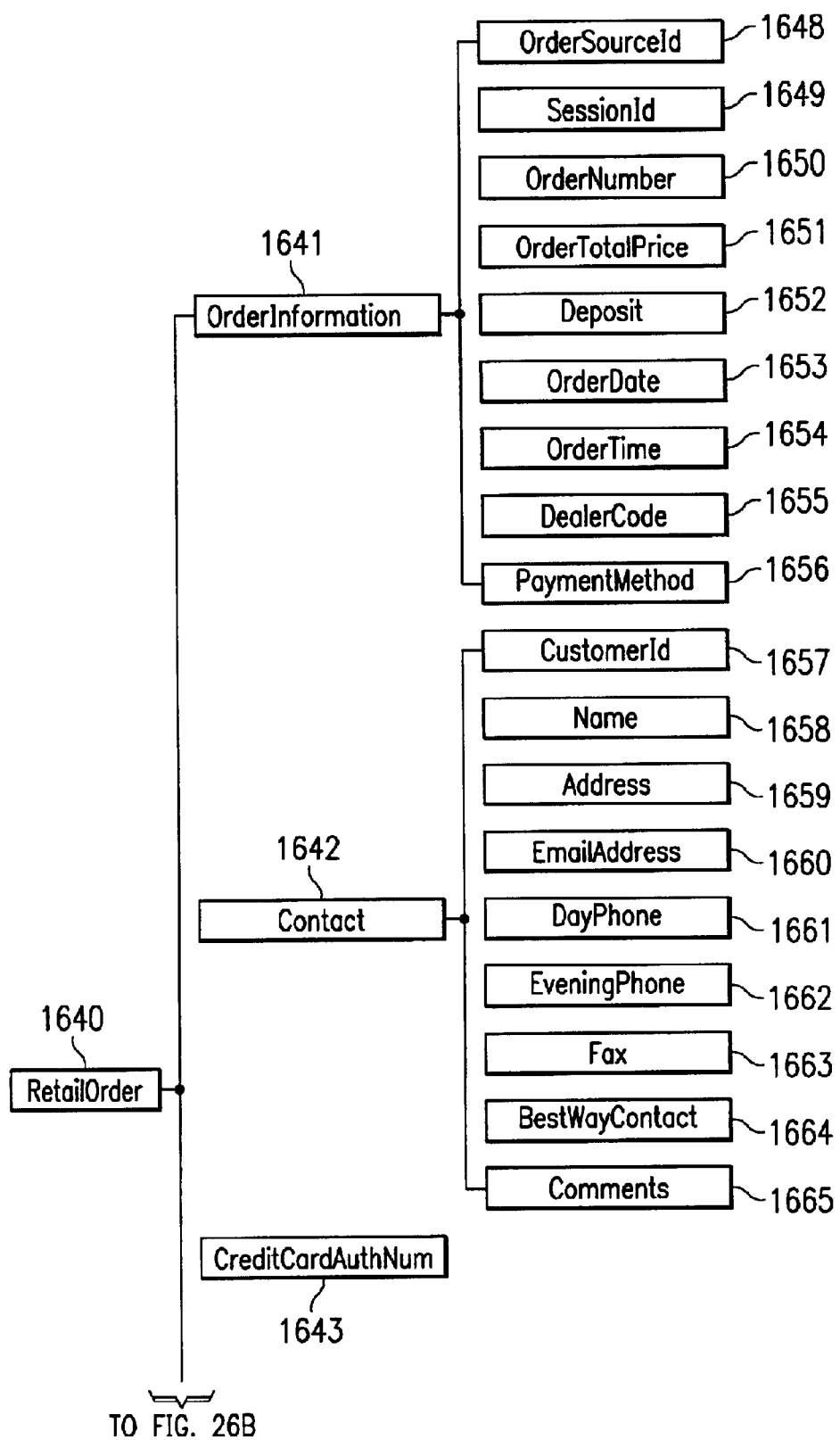
FIG. 26 is a diagram of an embodiment of a retail order message schema according to the teachings of the present invention.
Figure 26B:
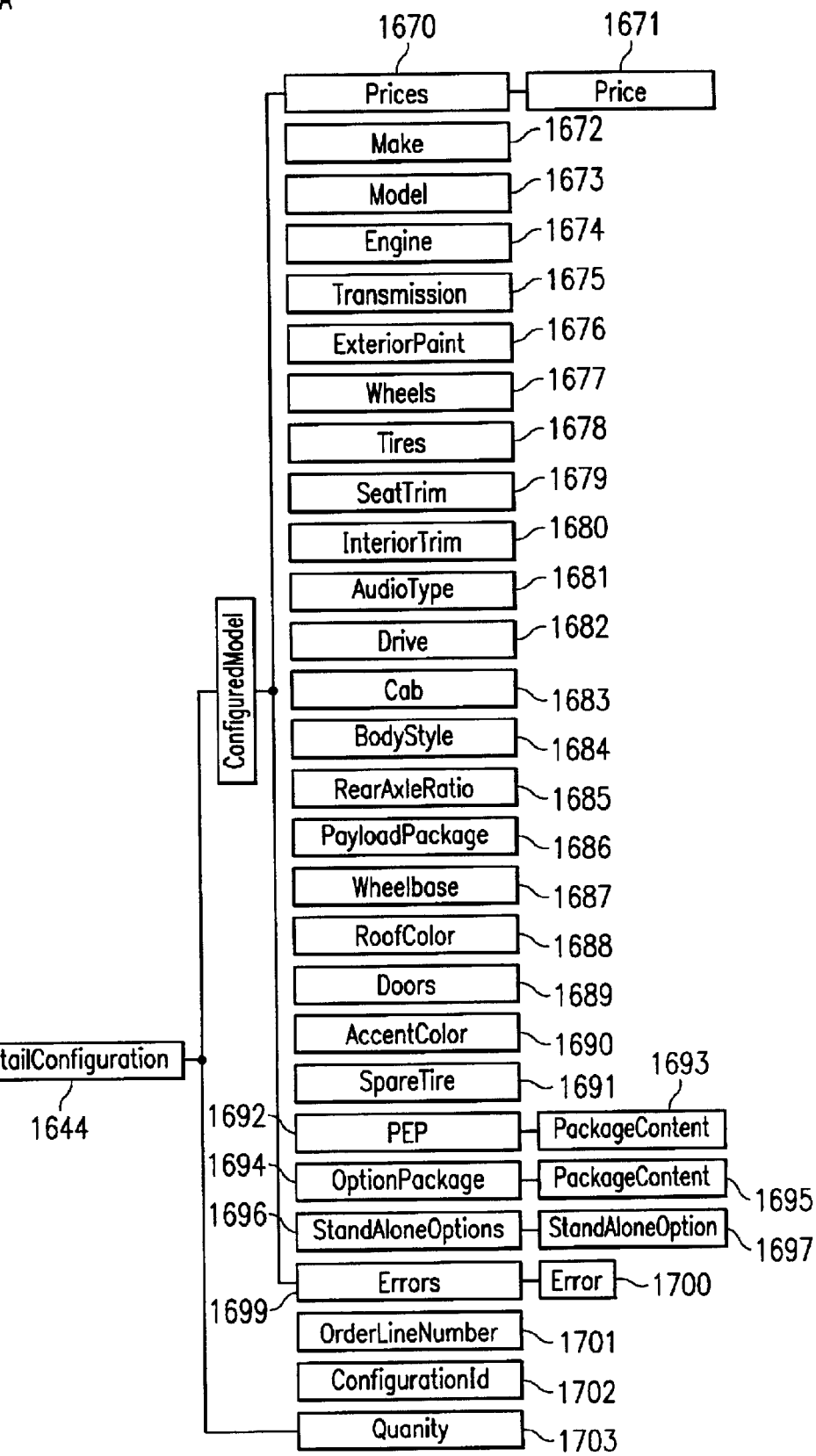

As shown in FIG. 26, the retail order message includes a top level tag, RetailOrder 1640, and four tags, OrderInformation 1641, Contact 1642, CreditCardAuthNum 1643, and RetailConfiguration 1644, at the next level. As described above, OrderInformation tag 1641 is used to include data related to the order, Contact tag 1642 is used to include data related to the contact or the purchaser, CreditCardAuthNum 1643 is used to include the credit card authorization number, and RetailConfiguration tag 1644 is used to include data related to the vehicle configuration of the ordered vehicles. The order information parameters include order source identifier 1648, session identifier 1649, order number 1650, total price of the order 1651, deposit amount 1652, order date 1653, order time 1654, dealer identification code 1655, and payment method 1656. The contact parameters include information on the customer, such as a customer identifier 1657, the name of the customer 1658, address 1659, email address 1660, daytime phone number 1661, facsimile number 1662, the best way to contact the customer 1664, and a field 1665 for including comments related to the customer.

The retail configuration parameters include specifications on the configured model, which is the same or similar to the format used in the tag request message and the fleet order message. The configured model parameters include price information (type, value, currency) 1670 and 1671, make (code, description) 1672, model (code, name, year, trim, description) 1673, engine specifications (code, displacement, number of cylinders, fuel type) 1674, transmission specifications (code, type, speed, description) 1675, exterior paint color (code, description) 1676, wheel specifications (code, diameter, description) 1677, tire specifications (code, manufacturer, description) 1678, seat trim color 1679, interior trim materials 1680, audio system specifications (code, radio, cassette, CD, description) 1681, two-wheel or four-wheel drive 1682, cab style 1683, body style 1684, rear axle ratio 1685, payload package (extra payload or towing capacity) 1686, wheel base length 1687, roof color 1688, number of doors 1689, accent color (such as exterior paint color for the bottom half of the vehicle) 1690, spare tire specification 1691, preferred equipment package (PEP) 1692, PEP package content 1693, option package 1694, option package content 1695, stand alone options 1696, stand alone package content 1697, and any error messages 1699 and 1700.

Another retail configuration parameter is street address, city, and state information. The next parameter, order line number 1701, provides the line number for a given configuration within an order. A configuration identifier 1702 is a unique configuration identifier that specifies the vehicle configuration selected by the customer in the order. A quantity parameter 1703 is used to communicate the number of vehicle ordered.

Figure 27A:
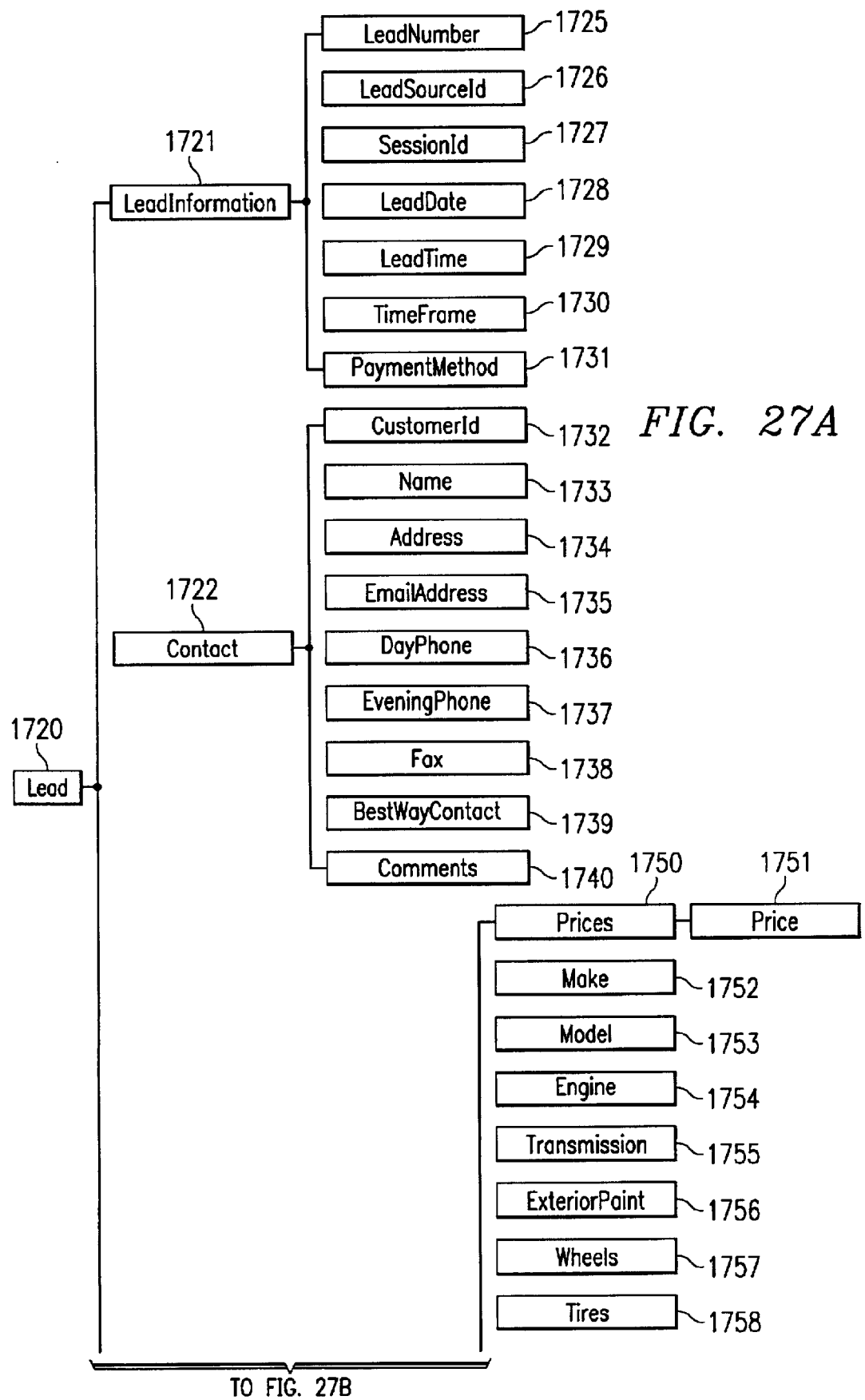
FIG. 27 is a diagram of an embodiment of a lead message schema according to the teachings of the present invention.
Figure 27B:
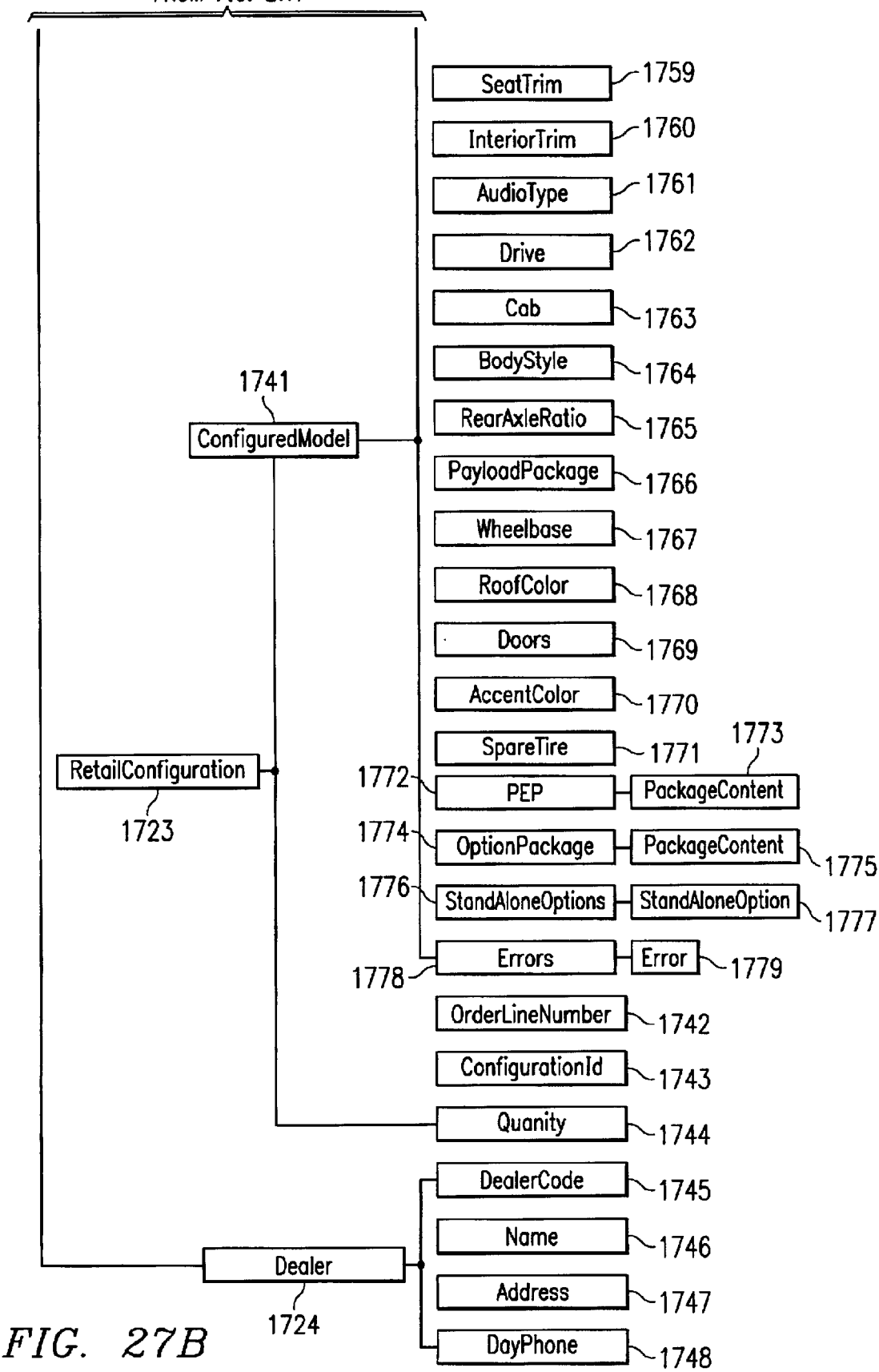

The lead message format is much like the fleet order and retail order message formats. FIG. 27 shows an embodiment of the lead message format according to the present invention. The lead message includes a top level tag, lead 1720, and four tags, LeadInformation 1721, Contact 1722, RetailConfiguration 1723, and Dealer 1723, at the next level. As described above, LeadInformation tag 1721 is used to include data related to a dealer lead that the customer is requesting, Contact tag 1722 is used to include data related to the customer desiring the lead information, RetailConfiguration tag 1723 is used to include data related to the vehicle configuration of the ordered vehicles, and Dealer 1724 is used to include data related to the dealer.

The lead information parameters include a lead number 1725, a lead source identifier 1726, session identifier of the online session with the customer 1727, lead date 1728, lead time 1729, time frame for contacting the customer 1730, and payment method 1731. The contact parameters include information on the customer, such as a customer identifier 1732, the name of the customer 1733, address 1734, email address 1735, daytime phone number 1736, evening phone number 1737, facsimile number 1738, the best way to contact the customer 1739, and a field 1740 for including comments related to the customer.

The retail configuration parameters include specifications on the configured model, which is the same or similar to the format used in the tag request message, the fleet order message, and the retail order message. The configured model parameters include price information (type, value, currency) 1750 and 1751, make (code, description) 1752, model (code, name, year, trim, description) 1753, engine specifications (code, displacement, number of cylinders, fuel type) 1754, transmission specifications (code, type, speed, description) 1755, exterior paint color (code, description) 1756, wheel specifications (code, diameter, description) 1757, tire specifications (code, manufacturer, description) 1758, seat trim color 1759, interior trim materials 1760, audio system specifications (code, radio, cassette, CD, description) 1761, two-wheel or four-wheel drive 1762, cab style 1763, body style 1764, rear axle ratio 1765, payload package (extra payload or towing capacity) 1766, wheel base length 1767, roof color 1768, number of doors 1769, accent color (such as exterior paint color for the bottom half of the vehicle) 1770, spare tire specification 1771, preferred equipment package (PEP) 1772, PEP package content 1773, option package 1774, option package content 1775, stand alone options 1776, stand alone package content 1777, and any error messages 1778 and 1779.

Another lead retail configuration parameter is order line number 1742, provides the line number for a given configuration. A configuration identifier 1743 is a unique configuration identifier that specifies the vehicle configuration selected by the customer in the order. A quantity parameter 1744 is used to communicate the number of vehicle the customer is interested in.

Lead message 1720 further includes a dealer parameter 1724. Dealer parameter 1724 is used to communicate information related to the dealer that the customer desires to contact, such as a dealer identifier or code 1745, the name of the dealer 1746, the address of the dealer 1747, and the phone number of the dealer 1748.

Status Process and Status Process Communication Message Schema

Figure 28:
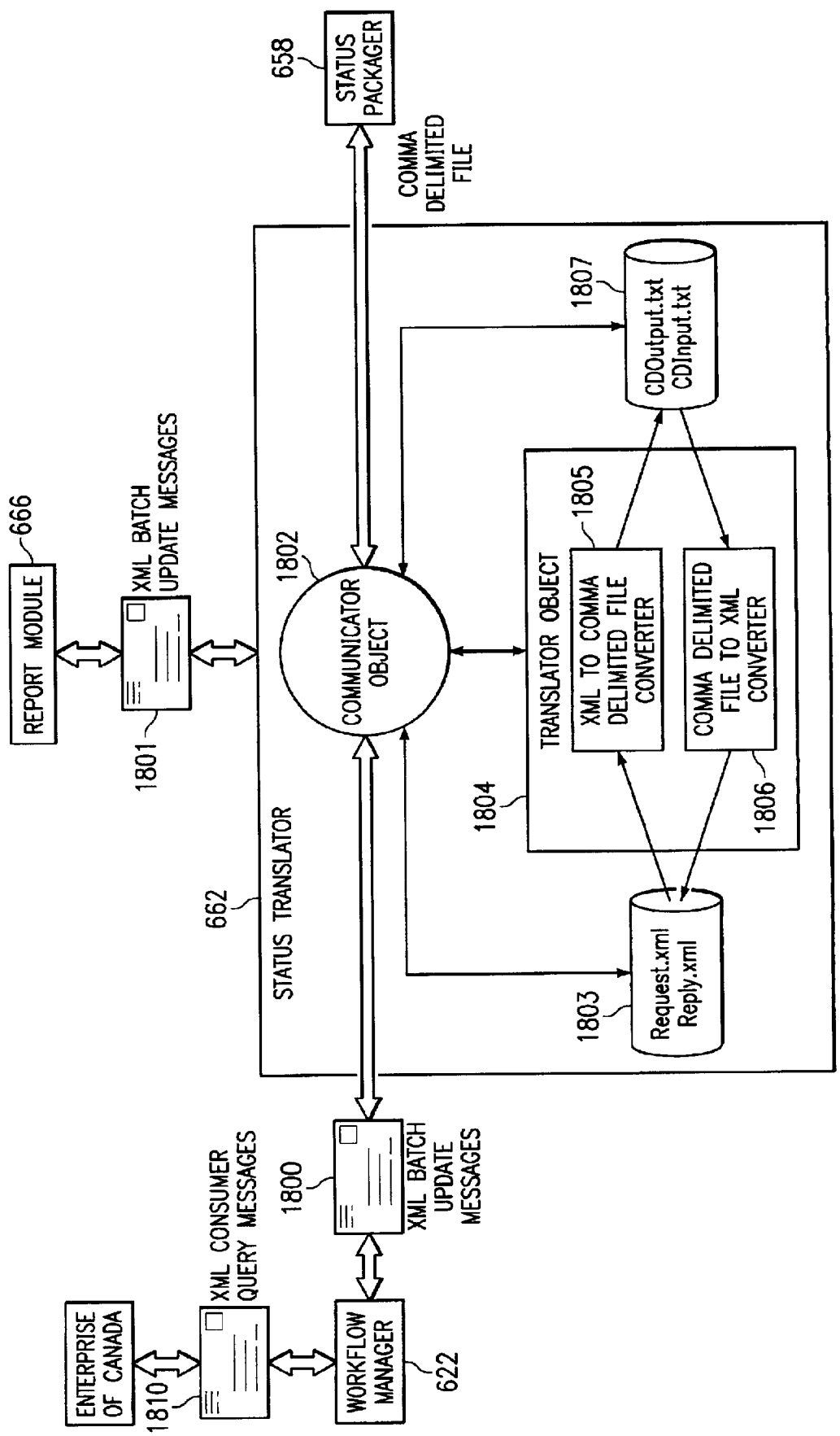
FIG. 28 is a block and flow diagram of an embodiment of a status process according to the teachings of the present invention.

FIG. 28 is a block and flow diagram of an embodiment of status translator process 662 and status packager 658 which constitute the status process according to the teachings of the present invention. The status process is operable to update, package, and deliver vehicle order status information to consumer, intranet sales consultants, consumer service representatives, and the prospect/buyer database. Periodically, such as nightly, workflow manager 622 sends a status update request to the status process. In response, the status process sends batch data update messages 1800 to workflow manager 622. the Status process also sends batch status data updates 1801 to report process 666.

Status translator 662 receives the data updates from status packager 658, which extracts the update information from the mainframe systems in the enterprise. For example, status packager 658 extracts update information from enterprise vehicle information process 660 and order bank 656 in the corporate mainframe facility and data center, as shown in FIG. 7. Status packager 658 tracks at least one field in the data records for changes, and communicates the changes. Status packager 658 matches certain data field contents in the orders with data from enterprise vehicle information process 660 and order bank 656 to detect changes to the order. For example, status packager 658 may track changes in the status code, sub-status code, produce date, shipped date, deliver date, estimated time of arrival, and the establishment of a full 17 position VIN, and reports the changes to status translator 662, which then reformats the data and sends it to workflow manager 622 and report process 666. Workflow manager 622 then stores the data in prospect/buyer database 630 (FIG. 7) Status packager 658 sends the status change data in a comma delimited flat file, for example, to status translator 662, which is then operable to translate it into an XML message, for example. In one embodiment of the present invention, the file transport communications mechanism between status packager 658 and status translator 662 is FTP (file transfer protocol) via WinINET, and the mechanism between status translator and workflow manager 622 is XML via HTTP.

Status translator 662 includes a communicator object 1802 and a translator object 1804. Communicator object 1802 receives either an XML message from workflow manager 622 or a comma delimited flat file from status packager, and hands both to translator object 1804 for file format conversion from one to the other. Translator object 1804 then carries out the file reformatting task and returns the converted file to communicator object 1802 for transmission to the appropriate destination. Workflow manager 622 then uses the order number, order line number, and item number in the XML message to locate the specific order record in buyer/prospect database. If a tag attribute, such as a change flag, of the order is true, then certain data field contents are added to the batch file as update data. For example, the status code, sub-status code, ETA, VIN, scheduled date, produced date, shipped date, delivered date, last update date, and last update time are added to the vehicle order status history in buyer/prospect database 630 if the change flag attribute indicates that data has been changed.

An online consumer may send a status request message 1810 from a consumer web site (shown as Ford of Canada in FIG. 28) to workflow manager 622, which allows workflow manager 622 to respond to the request with data from prospect/buyer database 630. Using the order source identifier and the customer identifier, workflow manager 622 extracts the relevant record(s) in prospect/buyer database 630; The status history data for that active record is also returned as part of the response. Workflow manager 622 then sends the status data to the consumer interface presentation application, i.e. the web site, for display to the consumer.

Figure 29:
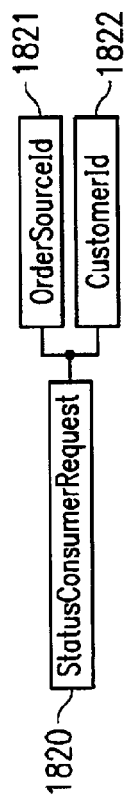
FIG. 29 is a diagram of an embodiment of a customer status request message schema according to the teachings of the present invention.
Figure 30:
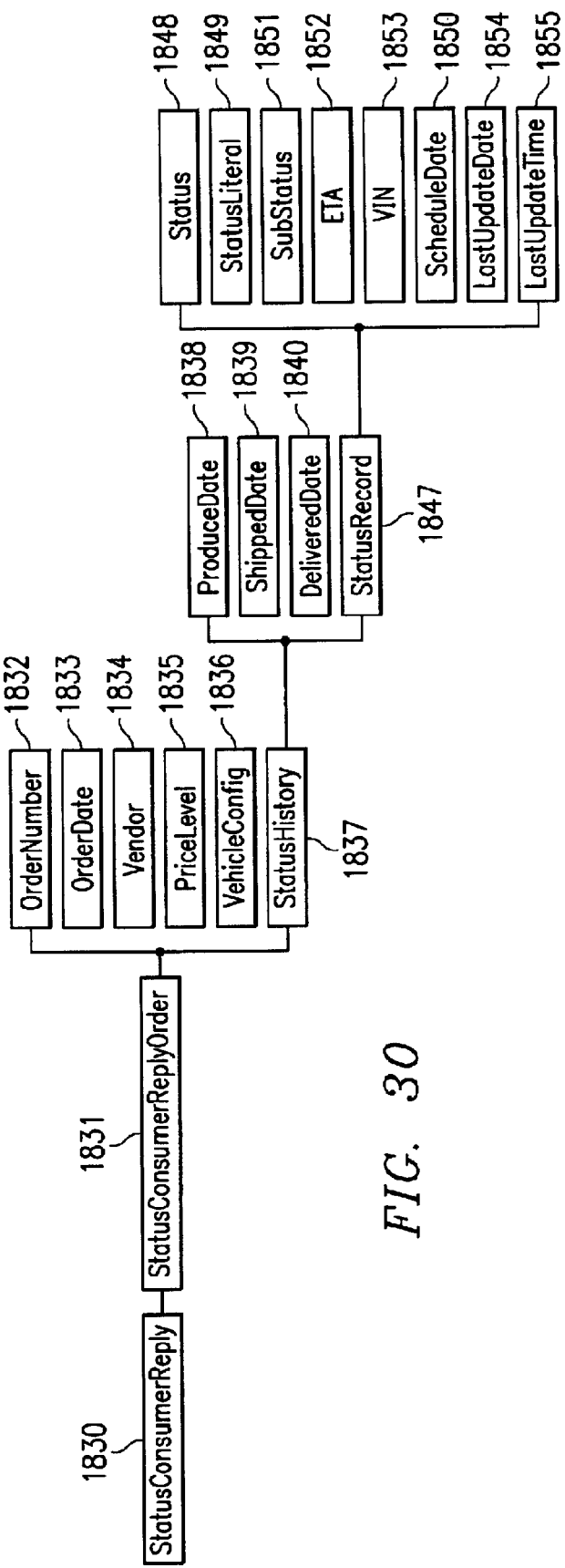
FIG. 30 is a diagram of an embodiment of a customer status reply message schema according to the teachings of the present invention.

FIG. 29 is a diagram of a consumer status query message schema according to the teachings of the present invention. The consumer status query message includes a StatusConsumerRequest tag 1820, which includes an order source identifier (OrderSourceId) 1821 and a customer identifier (CustomerId) 1822. Order source identifier 1821 is used to identify the presentation application, or the consumer web site, from which the status query was submitted. Customer identifier 1822 is used to identify the online consumer that submitted the status query. Using these two identifiers, workflow manager 622 locates all active orders for the customer, and generates a reply message, the format of which is shown in FIG. 30. In an embodiment of the present invention, the status query message and the reply message are implemented in XML.

Referring to FIG. 30, the customer status request reply message includes a top level StatusConsumerReply tag 1830, which identifies the message, and a next level tag, StatusCOnsumerReplyOrder 1831, which identifies each order within the consumer status reply message. For each order, OrderNumber 1832 is used to identify the order. In addition, OrderDate 1833, Vendor 1834, PriceLevel 1835, VehicleConfig 1836 also are used to describe the transaction. A StatusHistory parameter 1837 is used to provide information on the status and history of the order. StatusHistory 1837 includes ProduceDate 1838, ShippedDate 1839, and DeliveredDate 1840. StatusHistory further includes a StatusRecord tag 1847, which includes the following fields or parameters: a status code 1848 that represents the current status of the ordered vehicle, narrative text to describe the status code (StatusLiteral 1849), sub-status code 1851, ETA 1852, a scheduled date 1850 for delivery, VIN 1853, the last update date 1854, and the last update time 1855.

Figure 31:
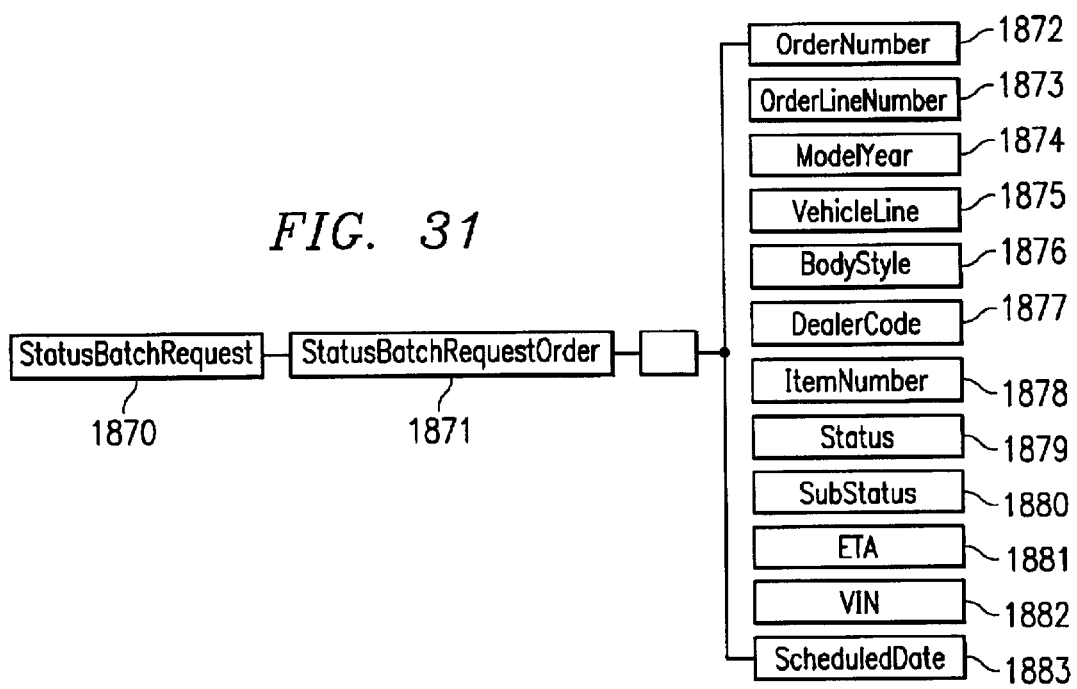
FIG. 31 is a diagram of an embodiment of a batch status request message schema according to the teachings of the present invention.

FIG. 31 is a diagram of an embodiment of the batch status query message according to the teachings of the present invention. The status batch request is sent from components in the system, such as workflow manager 622, to status translator 662. The status batch request contains a top-level tag, StatusBatchRequest 1870, which includes StatusBatchRequestOrder tag 1871 to identifies each order within the status batch request message. The parameters for each vehicle order includes the order number 1872, order line number 1873, model year 1874, vehicle line 1875, body style 1876, dealer code 1877, item number 1878, status code 1878, sub-status code 1880, ETA 1881, VIN 1882, and ScheduledDate 1883.

Figure 32:
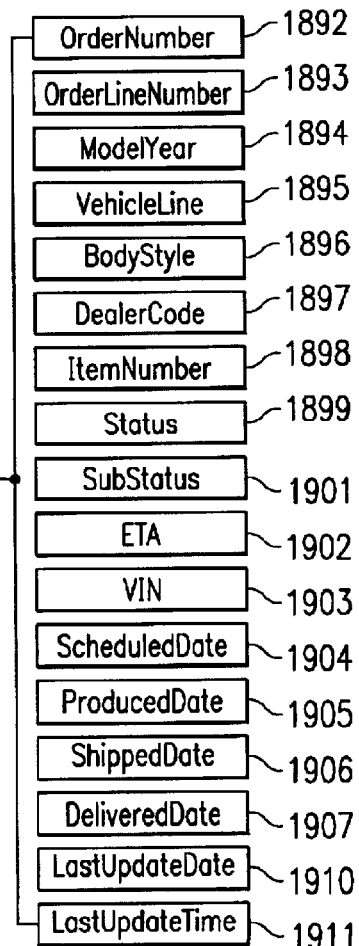
FIG. 32 is a diagram of an embodiment of a batch status reply message schema according to the teachings of the present invention.

FIG. 32 is a diagram of an embodiment of a batch reply message schema according to the teachings of the present invention. The status batch reply message includes a top level StatusBatchReply tag 1890, which includes a StatusBatchReplyorder tag 1891 that is used to identify each order in the message. For each order, the following parameters are provided: order number 1892, order line number 1893, model year 1894, vehicle line 1895, body style 1896, dealer code 1897, item number 1898, status code 1899, sub-status code 1901, ETA 1902, VIN 1903, ScheduledDate 1904, ProducedDate 1905, ShippedDate 1906, DeliveredDate 1907, last update date 1910, and last update time 1911. Status code 1899, sub-status code 1901, ETA 1902, and VIN 1903 each further includes a change flag that is used to indicate whether change to the data has been made.

Report Process and Report Process Communication Message Schema

Figure 33:
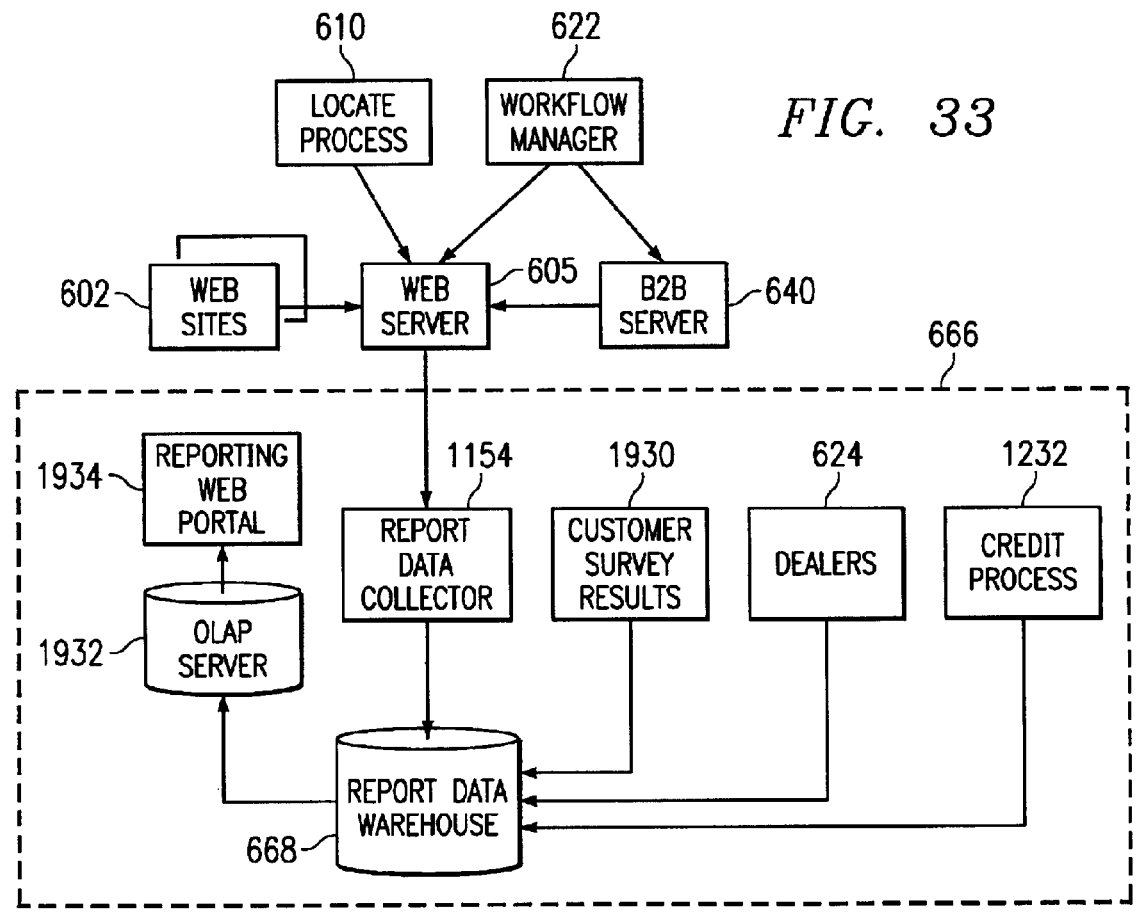
FIG. 33 is a block and flow diagram of an embodiment of a report process according to the teachings of the present invention.

FIG. 33 is a simplified block and flow diagram of report process 666 according to the teachings of the present invention. Report process 666 includes a data collector 1154, an OLAP (online analytical processing) server 1932, and a reporting web portal 1934. In operation, a user accesses report processor 666 via reporting web portal 1934, which communicates with OLAP server 1932. OLAP server 1932 contains formatted data accessed from the raw data stored in report data warehouse 668. Report process 666 first authenticates the user by verifying that the given user identifier and password are valid. As the user requests a specific report, whether the user has authorization to access the requested report is verified. A number of users may have access to the reports provided by report process 666, including online customers, dealers, enterprise engineers and managers, system administrators, system analysts and suppliers.

Report process 666 is operable to capture and store a variety of data from several components of the system, and then to display and print reports selected by the user. The consumer web sites 602 or the presentation applications capture data generated by user activity at the web site. For example, the user's click stream data and the session identifier are captured. If the user invokes an auxiliary information application at the web site to calculate the amount of interest on the car loan, for example, then that information is also captured. If the user generates a vehicle configuration, a configuration identifier will also be generated and captured. At the end of a session, an XML message is generated to include the entire session detailed data, identifiers, and click stream data, which is then sent to web server 605. For example, the XML message may include the web site identifier, session identifier, configuration identifiers, customer zip code, auxiliary information application invocation, configuration click stream for each configuration identifier done during the session, vehicle configuration specification for each configuration identifier, whether locate search results were selected, session start date and time, session end date and time, and the entry point and exit points.

The transport of the session data message may be a pseudo-real time or batch process that is run at the end of each session, or periodically, for example. Web server 605 then sends the messages to a report log utility of a report data collector 1154 which may perform some data cleansing function, such as parsing the message and correcting errors. Data collector 1154 then sends the update data to report data warehouse 668 periodically, such as once a day, via batch feed, for example. In addition, a copy of all the XML messages generated in the presentation applications and sent to workflow manager 622 are also routed to data collector 1154. The messages include tagged orders, retail orders, leads, vehicle searches, session data, status updates, and lead/order updates.

After a complete configuration, the user may search he selected configuration in inventory database 612. Locate process 610 is operable to pass a copy of the search result message to report log utility 1930. For each search results message, the session identifier, configuration identifier, and the match relevance for each criteria, are provided to the report process. Report data collector 1154 is operable to parse the XML message and extract the match relevance count for each criteria to pass to report data warehouse 668.

When a retail order or a tagged order is placed, the order message is routed to workflow manager 622 with the session identifier, configuration identifier, order number, and other order details. A copy of the order message is also routed, via web server 605, to data collector 1154, which processes it and stores the data in data warehouse 668. When workflow manager 622 receives order update messages from the order process, a copy of the order update message is also routed to data collector 1154 via web server 605. In addition, each time the status of the order is updated in workflow manager 622, a copy of the status update message is also sent to data collector 1154.

When a configuration is sent as a request for a lead, a lead message is routed to workflow manager 622, with the session identifier, configuration identifier, and other lead detailed data. A copy of the lead message is also routed to report data collector 1154 via web server 605. Reporting data collector 1154 parses the XML lead message and stores the data in report data warehouse 668. Each time the lead data is updated in workflow manager 622 because of dealer action, a copy of the update XML message is also routed to report data collector 1154. Alternatively, each time an order or a lead changes to an inactive status (sold, cancelled, future prospect) by dealer action, an update XML message is generated to include a history of the associated dealer events and sent to workflow manager 622 and report data collector 1154.

Dealer data is also provided to data collector 1154 for storage in report data warehouse 668. Dealer data may include the dealer code, P&A codes, dealer name, dealer address, dealer contact, dealer zip code, dealer zone, and dealer region. Report data warehouse 668 updates and generates metrics on the number of dealerships participating in the online program. Similarly, credit process 1232 may also feed credit data to data collector 1154 for storage in report data warehouse 668. In addition, customer survey results 1930 which are used to gauge customer satisfaction are also stored in report data warehouse 668.

Report process 666 is operable to generate numerical and graphical reports as requested by submitting standardized SQL to report database 668. Exemplary reports are listed below:

Financial Reports
Compare revenue stream generated through the web sites by brand, make, model, model year, and model trim against orders placed online
Metrics to be broken down for time frame (month, week) and/or by regions
Free Demand Data Reports:
Metrics on end customer click streams on the web site for configurations, resulting in:
  Abandoned
  Retail Ordered
  Tagged Order
  Request-for-Quotes (Leads)
  Searched
  Saved in garage for future follow-up
Rank order of user "first clicks"—hot spots on the web sites, brands, etc.
Rank order of popular (non-standard) options per model/trim level
Rank ordered top 10 models per brand
Rank ordered most popular build combinations, configuration items (options or features), colors, etc.
Percentage of users selecting auxiliary services from the web sites based on model/trim configurations
Order Status Metric Reports
How long on average does it take to build a vehicle, a vehicle of a certain brand, make, trim, etc.
How does the promised delivery date compare with the actual delivery date
Dealer Credit Metric Reports
How many credit applications by dealer, make, model, year
How many credit applications were approved, rejected, conditioned, and resulted in a purchase
Site/Application Performance Reports
Top-referring web sites
Metrics on exit points within the web sites
Metrics on web site traffic (number of user sessions, time, usage, etc.)
Number of requests per visit
Metrics on requests for credit and fulfillment percentage
Dealer Reports
Metrics on number of exact matches found
Metrics on new/used/pre-owned requests
Dealer inventory-related requests
Metrics on leads to dealers
Metrics on leads-to-close ratio
Metrics on initial dealer to closing dealer
Dealer Performance Reports
Participating dealers
Metrics on hits, leads, orders, etc.
Vehicle demand summary compared with regional average, etc.
Metrics on dealer response time on leads
Customer survey results
Locate, order and status module reports
Price Metric Reports
MSRP, dealer invoice, sold price, and ePrice trends, by dealer, by make, model, trim, etc.

Figure 34:
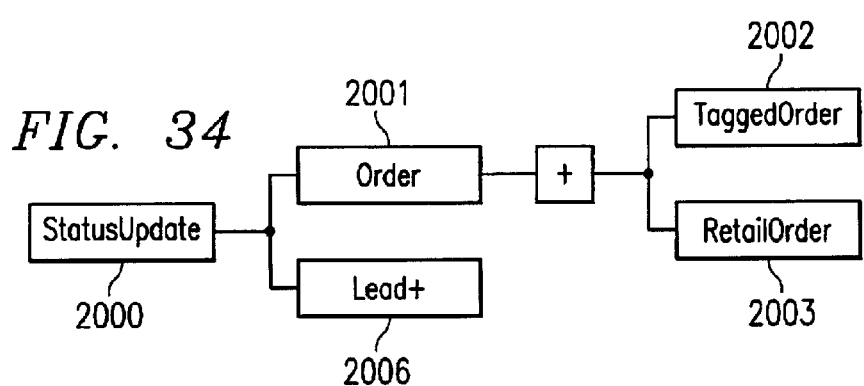
FIG. 34 is a diagram of an embodiment of a status report message schema according to the teachings of the present invention.

Three message formats are used by the report process. FIG. 34 is a diagram of the messages. A StatusUpdate tag 2000 is the top level tag for the messages, which includes two types of order messages 2001: tagged order 2002 and retail order 2003. Another report message is a lead message 2006.

Figure 35:
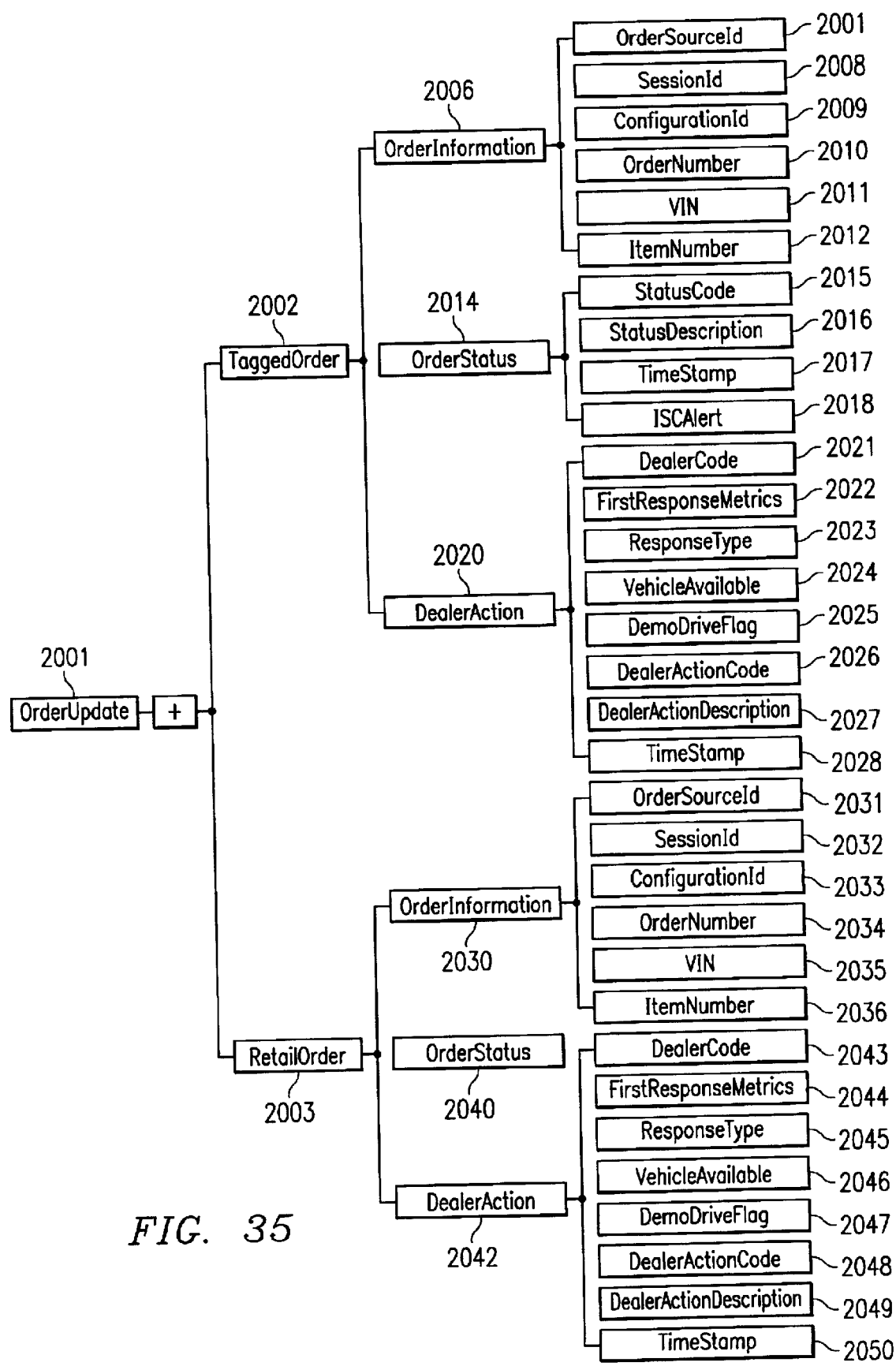
FIG. 35 is a diagram of an embodiment of a order report message schema according to the teachings of the present invention.

FIG. 35 is a diagram of the order update message format, which may be implemented in XML. Two kinds of orders 2001 are provided, tagged order 2002 and retail order 2003. TaggedOrder 2002 includes order information (OrderInformation) 2006, which includes order source identifier 2007, session identifier 2008, configuration identifier 2009, order number 2010, VIN 2011, and item number 2012. TaggedOrder 2002 also includes the status of the order (OrderStatus) 2014, which includes status code 2015, status description 2016, time stamp of the order 2017, and status alert (ISCAlert) 2018.

TaggedOrder further includes dealer action data 2020, which includes dealer code 2021, first response metrics 2022, response type 2023, vehicle availability 2024, demo drive flag 2025, dealer action code 2026, dealer action description 2027, and time stamp 2028. First response metrics 2022 is used to provide data that identifies the dealer response interval (hours, days, week, etc.), and response type 2023 identifies the type of communications response the dealer takes (telephone call, email, etc.). DemoDriveFlag 2025 is a boolean parameter that is used to indicate whether a demo drive has been taken or not.

RetailOrder 2003 also includes OrderInformation 2030, OrderStatus 2040, and DealerAction 2042 tags or parameters. OrderInformation 2030 also includes order source identifier 2031, session identifier 2032, configuration identifier 2033, order number 2034, VIN 2035, and item number 2036. DealerAction similarly includes dealer code 2043, first response metrics 2044, response type 2045, vehicle availability 2046, demo drive flag 2047, dealer action code 2048, dealer action description 2049, and time stamp 2050.

Figure 36:
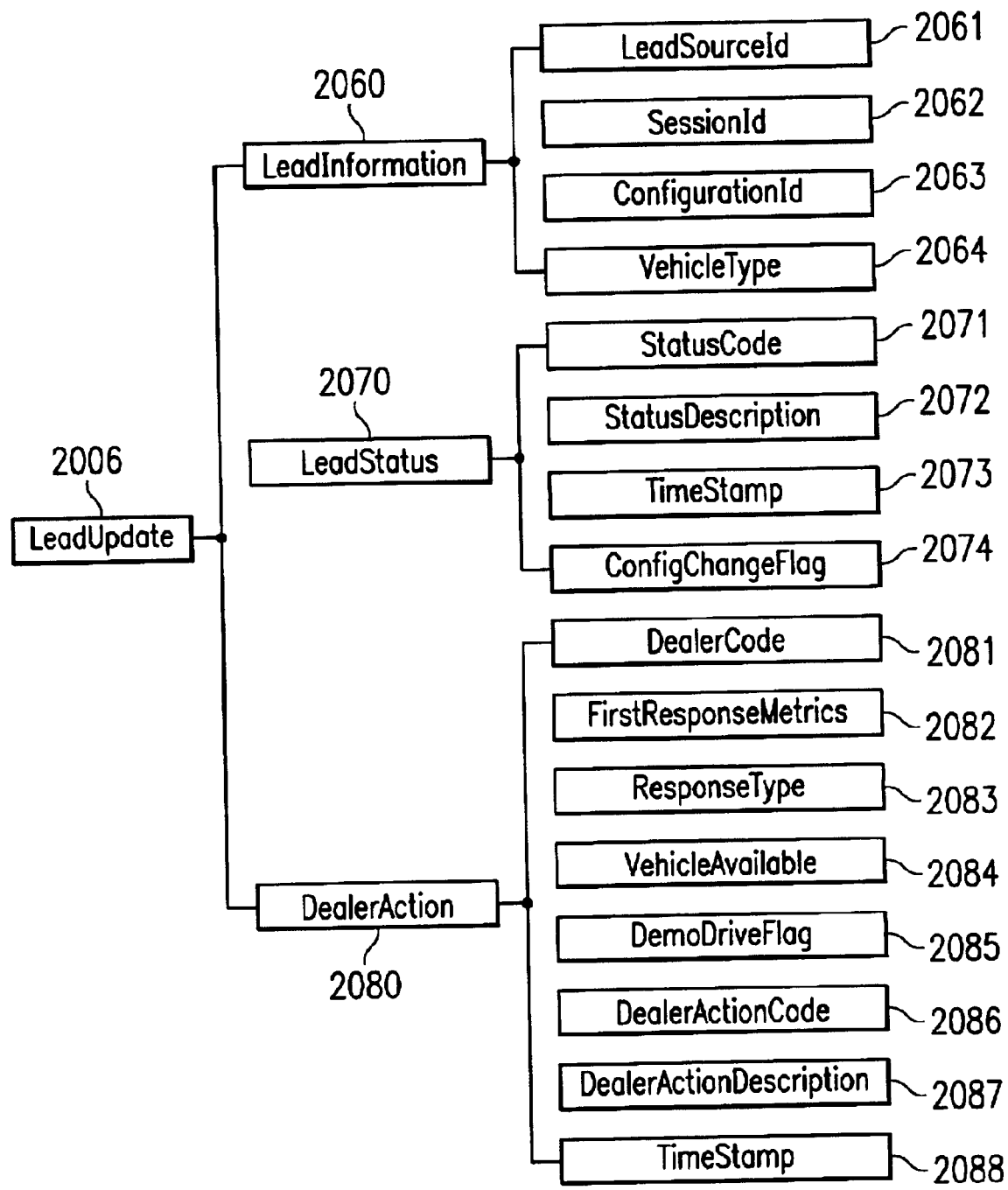
FIG. 36 is a diagram of an embodiment of a lead report message schema according to the teachings of the present invention.

FIG. 36 is a diagram of the lead update message format 2006 according to the teachings of the present invention.

Lead message 2006 includes lead information 2060, lead status 2070, and dealer action 2080. Lead information 2060 includes the lead source identifier 2061, session identifier 2062, configuration identifier 2063, and vehicle type 2064. Lead source identifier 2061 is used to indicate the originating web site from which the request is submitted. Session identifier 2062 identifies the online session during which the dealer lead request was submitted.

Lead status 2070 includes status code 2071, status description 2072, time stamp 2073, and configuration change flag 2074. Configuration change flag is a boolean parameter that indicates whether the configuration has been changed.

Dealer action 2080 is another parameter in the lead message format. Dealer action 2080 includes dealer code 2081, first response metrics 2082, response type 2083, vehicle availability 2084, demo drive flag 2085, dealer action code 2086, dealer action description 2087, and time stamp 2088.

Figure 37A:
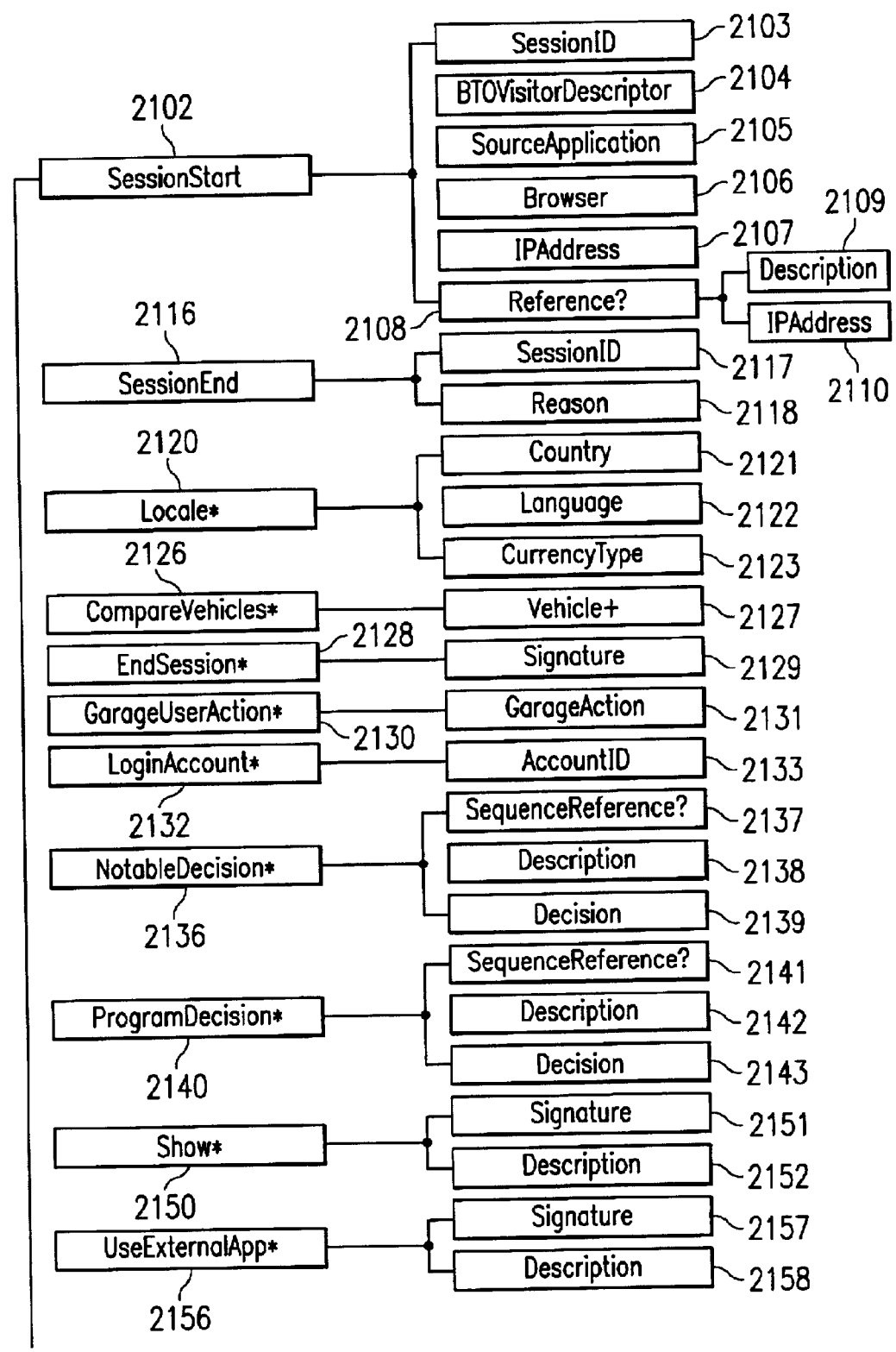
FIG. 37A is a diagram of an embodiment of the user session message format for transmitting user online session data to the report process.
Figure 37B:
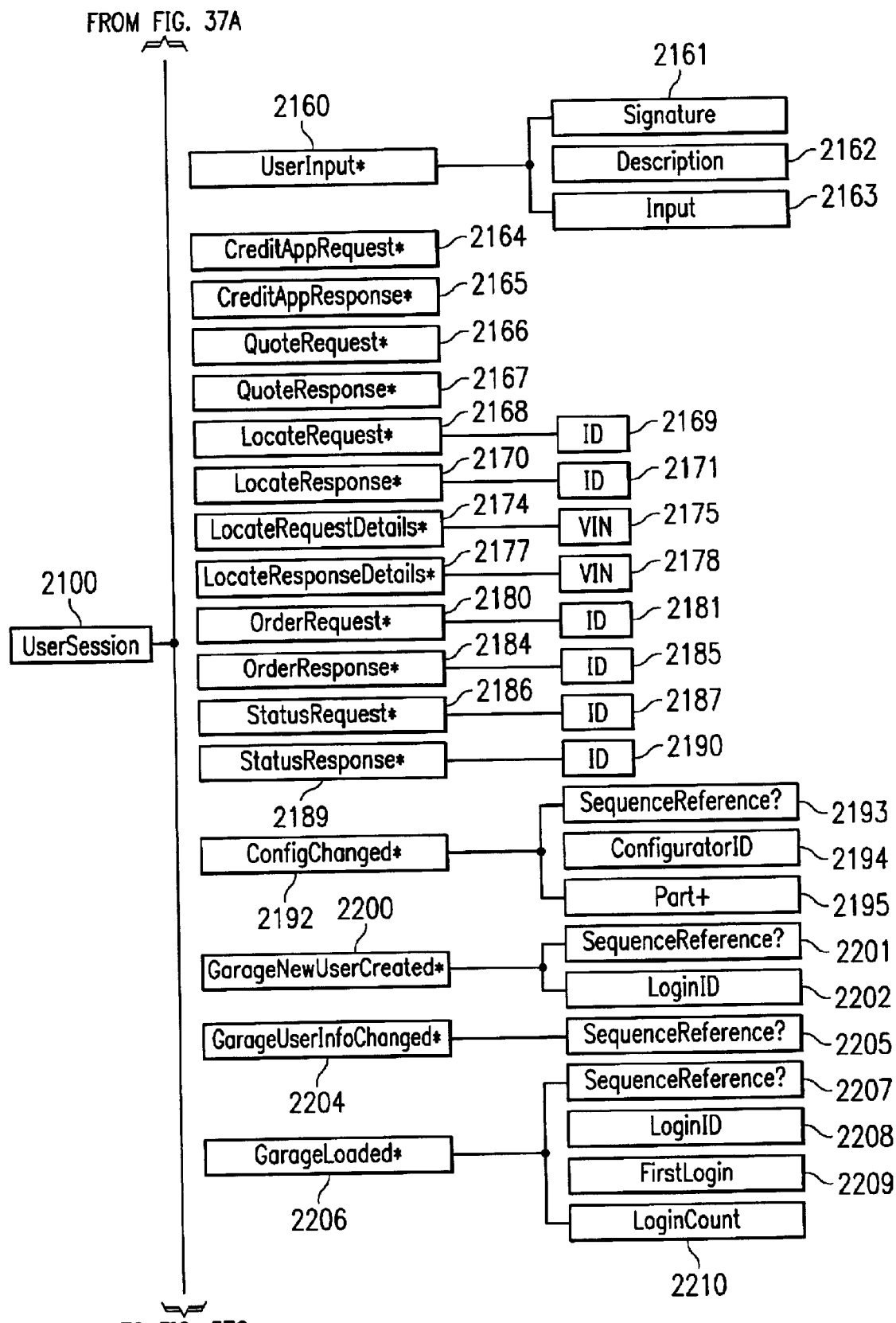
FIG. 37B is a continuation of FIG. 37A.
Figure 37C:
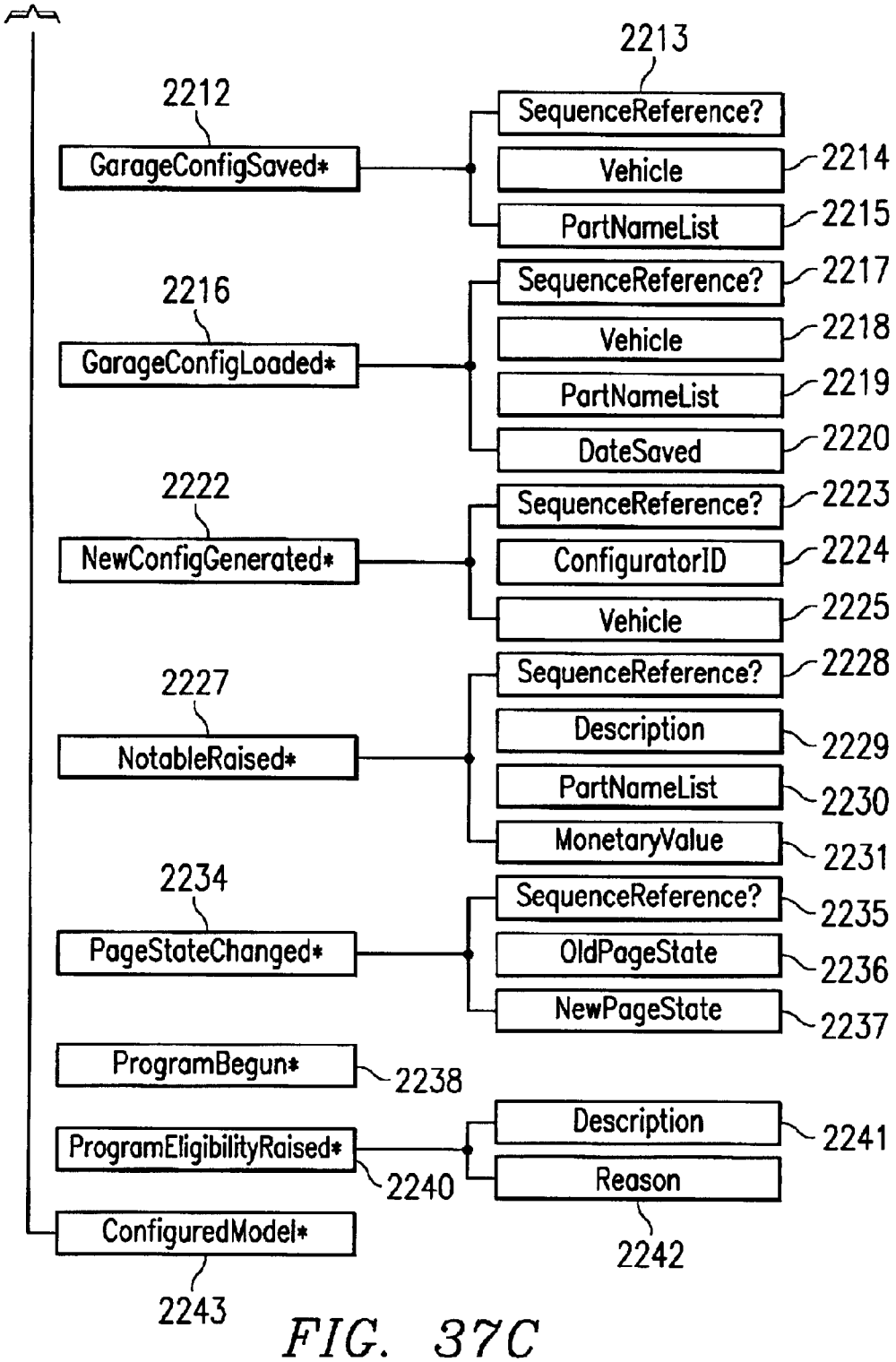
FIG. 37C is a continuation of FIG. 37B.

FIGS. 37A and 37B is a diagram of an embodiment of the user session message format for transmitting user online session data to the report process. A user session tag 2100 is the top-level tag of the message. A session start parameter 2102 includes session ID 2103, a visitor descriptor 2104, a source application identifier 2105, a browser indicator 2106, an IP (Internet protocol) address 2107 of the user, and a reference 2108 field with additional description 2109 and IP address 2110 parameters. A session end tag 2116 includes the session identifier 2117, and a reason 2118 the session ended. A locale tag 2120 is used to provide country 2121, language 2122, and currency type-2123 data. A compare vehicles tag 2126 is used to provide data on the vehicles 2127 the consumer comparison shopped. An end session tag 2128 is used to provide signature 2129 data. A garage user action tag 2130 is used to provide data on user activities related to the virtual online garage 2131. The user's account identifier 2133 is provided by a login account tag 2132. A notable decision tag 2136 is used to provide data on user decisions, such as sequence reference 2137, description, and decision 2139. A program decision tag 2140 is used to provide additional decision related data, such as sequence reference 2141, description 2142, and decision 2143. A show tag 2150 provides signature 2151 and description 2152 data on items, images or pages that the user chose to view. An use external application tag 2156 is used to provide signature 2157 and description 2158 data on auxiliary information applications invoked by the user. An user input tag 2160 is used to provide signature 2161, description 2162, and input 2163 data on user online inputs.

Additional tags 2164–2167 are used to provide data related to credit application requests, credit application responses, quote requests, and quote responses. A locate request tag 2168 is used to provide an identifier 2169 for the vehicle locate request, and a locate response tag 2170 is used to provide an identifier 2171 for the locate response. Locate request details tag 2174 and locate response details 2177 are used to provide VIN 2175 and 2178 of the vehicle for which the user requested detailed information. Furthermore, the identifiers 2181 and 2185 associated with an order request 2180 and order response 2184 are provided. The identifiers 2187 and 2190 associated with a status request 2186 and status response 2189 are provided. A configuration changed tag 2192 is used to provide sequence reference 2193, configurator identifier 2194 and part 2195 data associated with the user changing vehicle configurations. A garage new user created tag 2200 is used to provide sequence reference 2201 and login identifier 2202 associated with the user action of parking a vehicle in a virtual garage for the first time. Garage user information changed tag 2204 provides sequence reference data 2205. Garage loaded tag 2206 provides the sequence reference 2207, login identifier 2208, first login 2209 and login count 2210. Garage configuration saved tag 2212 provides sequence reference 2213, vehicle 2214, and parts name list 2215 of the garaged vehicle. Garage configuration loaded 2216 tag provides sequence reference 2217, vehicle 2218, parts name list 2219, and date saved 2220 of the vehicle configuration parked in the virtual garage. A new configuration generated tag 2222 is used to provide sequence reference 2223, configurator identifier 2224, and vehicle 2225 data on each new vehicle configuration generated by the user. A notable raised tag 2227 is used to provide sequence reference 2228, description 2229, parts name list 2230, and monetary value 2231 associated with the user activities. A page state changed 2234 tag is used to provide sequence reference 2235, old page state 2236, and new page state 2237 data. A program begun tag 2238 and program eligibility raised tag 2240 are used to provide data associated with the program. Description 2241 and reason 2242 data are provided. A configured model tag 2243 is provided to include data on the configured vehicle.

Constructed and operating in this manner, a customer is afforded the opportunity to specify the desired configuration and options of a product to search the inventory for availability. The vehicle availability anywhere along the pipeline from the manufacturer to the dealership may be determined. The customer may tag a vehicle that is currently anywhere in the pipeline that fits his/her criteria for purchase. In the event that the specified product is not currently available, the customer may place a custom order for the product. Therefore, the customer is able to make a purchase on a product or vehicle that he/she desires and track the status of the vehicle when it is custom ordered and manufactured.

Several processes have been described that carry out the locate, order, status, and report functionalities of the system and XML communication schema between the various components have been established.

Although the present invention has been described in the context of custom automotive vehicle inventory tracking and ordering, it is equally applicable to other products for which a consumer may select from among different configurations.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. An online system of locating a automotive (consumer) product having specific configuration in an enterprise production pipeline and inventory, comprising:

a locate client process operable to:
receive automotive product configuration data; and
generate a search request message incorporating the automotive product configuration data in response to user input;

an inventory database that stores automotive product availability data for automotive products that are on the order bank, being produced, in-transit to distribution facilities, and automotive products at the distribution facilities; and a locate server process operable to:
receive the search request message from the locate client process;

search the automotive product availability data in the inventory database for automotive products matching and substantially matching the automotive product configuration data;

generate a search reply message containing the matching automotive products; and return the search reply message to the locate client process.

2. The system, as set forth in claim 1, wherein the search request message and search reply message are XML messages.

3. The system, as set forth in claim 1, wherein the search reply message comprises:

a list of automotive products and respective configuration data; and a percentage value for each product in the list indicative of the degree of matching between the product and the automotive product configuration data contained in the search request message.

4. The system, as set forth in claim 1, wherein the search request message comprises a list of search criteria and a weighting of each criterion.

5. The system, as set forth in claim 1, wherein the search reply message comprises a pointer to an image of each automotive product.

6. The system, as set forth in claim 1, wherein the locate server process comprises:

a listener operable to receive the search request message from the locate client process;

a parser operable to receive the search request message from the listener and extract message parameters; and a searcher operable to search the automotive product availability data in the inventory database according to the message parameters.

7. The system, as set forth in claim 1, wherein the locate client process comprises:

a message converter operable to receive a search request document containing search criteria and convert to an XML document having a predetermined format; and a message client process operable to receive the XML document and convert to an XML search request message.

8. The system, as set forth in claim 7, further comprising a response parser operable to receive the search reply messages from the locate server process and generate record set objects therefrom.

9. An online method of locating a automotive (consumer) product having specific configuration in an enterprise production pipeline and inventory, comprising:

receiving a search request message having automotive product configuration data submitted by a user;

formulating a search query with search criteria corresponding to the automotive product configuration data;

searching automotive product availability data associated with automotive products that are on the order bank, in-production, in-transit, and in-inventory for a automotive product matching the automotive product configuration data;

generating a search reply message containing any automotive product determined based on the search of the automotive product availability data to substantially match the automotive product configuration data; and sending the search reply message to the user.

10. The method, as set forth in claim 9, further comprising:

receiving the search request message on a predetermined port;

parsing the search request message to extract product configuration data; and searching the automotive product availability data using the extracted automotive product configuration data.

11. The method, as set forth in claim 9, wherein receiving the search request message comprises receiving an XML search request message.

12. The method, as set forth in claim 9, wherein generating the search reply message comprises:

compiling a list of products and respective configuration data; and providing a percentage value for each automotive product in the list indicative of the degree of match between the automotive product and the automotive product configuration data contained in the search request message.

13. The method, as set forth in claim 9, wherein receiving the search request message comprises receiving a list of search criteria and a weighting of each criterion.

14. The method, as set forth in claim 9, further comprising:

receiving a search request document containing search criteria and converting to an XML document having a predetermined format; and converting the XML document to an XML search request message.

15. The method, as set forth in claim 9, further comprising:

displaying automotive product configuration information to the user on a web page; receiving automotive product configuration selection from the user; and displaying a search result list of automotive product substantially matching the automotive product configuration and percentage matching data on a web page.

16. The method, as set forth in claim 9, further comprising: importing in-inventory automotive product availability data from dealerships; and importing in-process automotive product availability data from an enterprise database.

17. The method, as set forth in claim 9, wherein generating the search reply message comprises:

incorporating a unique identifier of each substantially matching automotive product; incorporating automotive product configuration data of each substantially matching automotive product; and sorting the substantially matching automotive products by descending degree of match between the automotive product configuration data of the automotive products and the automotive product configuration data in the search request message.

18. The method, as set forth in claim 9, further comprising:

receiving a tag request message submitted by the user, the tag request message containing a unique product identifier;

modifying the automotive product availability data associated with the automotive product identified by the unique automotive product identifier in the inventory database; and generating a tag reply message confirming the completion of tagging the identified product.

19. The method, as set forth in claim 18, further comprising suppressing the tagged automotive product from subsequent search requests.

20. The method, as set forth in claim 15, further comprising displaying an image of the automotive product in response to receiving a user selection input.

21. The method, as set forth in claim 15, further comprising displaying detailed information associated with a automotive product in response to receiving a user selection input.

22. The method, as set forth in claim 15, further comprising:
receiving a user selection input of a automotive product in the list;
generating a search request message having an unique automotive product identifier associated with the selected automotive product;
searching the automotive product availability data for detailed data associated with the unique automotive product identifier;
generating a search reply message having the detailed data.

23. An online method of locating automotive vehicles having specific configuration in an enterprise production pipeline and inventory for purchase, comprising:
receiving a search request message having vehicle configuration data submitted by a user;
formulating a search query with search criteria corresponding to the vehicle configuration data;
searching vehicle availability data associated with vehicles that are on the order bank, in-production, in-transit, and in-inventory at the dealerships for a vehicle matching the vehicle configuration data;
generating a search reply message containing any vehicle determined based on the search of the product availability data to substantially match the vehicle configuration data, the search reply message including a vehicle identifier and vehicle configuration data of each substantially matching vehicle; and
sending the search reply message to the user.

24. The method, as set forth in claim 23, further comprising:
receiving the search request message on a predetermined port;
parsing the search request message to extract vehicle configuration data; and
searching the vehicle availability data using the extracted vehicle configuration data.

25. The method, as set forth in claim 23, wherein receiving the search request message comprises receiving an XML search request message.

26. The method, as set forth in claim 23, wherein generating the search reply message comprises:
compiling a list of vehicles and respective vehicle configuration data; and
providing a percentage value for each vehicle in the list indicative of the degree of match between the vehicle and the vehicle configuration data contained in the search request message.

27. The method, as set forth in claim 23, wherein receiving the search request message comprises receiving a list of search criteria and a weighting of each criterion.

28. The method, as set forth in claim 23, further comprising:
receiving a search request document containing search criteria and converting to an XML document having a predetermined format; and
converting the XML document to an XML search request message.

29. The method, as set forth in claim 23, further comprising:
displaying vehicle configuration information to the user on a web page;
receiving vehicle configuration selection from the user; and
displaying a search result list of vehicles substantially matching the vehicle configuration and percentage matching data on a web page.

30. The method, as set forth, in claim 23, further comprising:
importing in-inventory vehicle availability data from dealerships;
importing in-process vehicle availability data from an enterprise database; and
updating the vehicle availability data with the imported data.

31. The method, as set forth in claim 23, wherein generating the search reply message comprises:
incorporating a unique vehicle identifier of each substantially matching vehicle;
incorporating vehicle configuration data of each substantially matching vehicle; and
sorting the substantially matching vehicles by descending degree of match between the vehicle and the vehicle configuration data in the search request message.

32. The method, as set forth in claim 23, further comprising:
receiving a tag request message submitted by the user, the tag request message containing a unique vehicle identifier;
modifying the vehicle availability data associated with the vehicle identified by the unique vehicle identifier; and
generating a tag reply message confirming the completion of tagging the identified vehicle.

33. The method, as set forth in claim 32, further comprising suppressing the tagged vehicle from subsequent search requests.

34. The method, as set forth in claim 29, further comprising displaying a photographic image of the vehicle in response to receiving a user selection input.

35. The method, as set forth in claim 29, further comprising displaying detailed information associated with a vehicle in response to receiving a user selection input.

36. The method, as set forth in claim 29, further comprising:
receiving a user selection input of a vehicle in the list;
generating a search request message having an unique vehicle identifier associated with the selected vehicle;
searching the vehicle availability data for detailed data associated with the unique vehicle identifier;
generating a search reply message having the detailed data.

37. An online method of purchasing a vehicle, comprising:
displaying vehicle configuration data;
receiving user online input on vehicle configuration, including make, model, and color of the vehicle;
receiving user online input to search for a vehicle having the vehicle configuration;
generating a search request message incorporating the user-entered vehicle configuration;
sending the search request message to a locate process, the locate process operable to search vehicle availability data for vehicles that are on the order bank, in-production, in-transit, and in-inventory at the dealerships for a vehicle matching the vehicle configuration data;

receiving a search reply message including a list of vehicles determined based on the search of the vehicle availability data to substantially match the user-entered vehicle configuration; and displaying the list of vehicles.

38. The method, as set forth in claim 37, further comprising:

receiving an online user input selecting a vehicle from the list of vehicles;

receiving an online user input requesting to tag the selected vehicle;

generating a tag request message incorporating a unique vehicle identifier of the selected vehicle; and sending the tag request message to the locate process.

39. The method, as set forth in claim 37, wherein displaying the list comprises displaying the vehicles in descending percentage of degree of match to the user-entered vehicle configuration.

40. The method, as set forth in claim 37, further comprising:

receiving an online user input selecting a vehicle from the list of vehicles;

receiving an online user input requesting detailed data on the selected vehicle;

generating a search request message incorporating a unique vehicle identifier of the selected vehicle; and sending the search request message to the locate process.

41. The method, as set forth in claim 40, further comprising:

receiving a search reply message including detailed data on the selected vehicle; and displaying the detailed data.

42. The method, as set forth in claim 40, further comprising:

receiving a search reply message including a pointer to an image of the selected vehicle; and displaying the detailed data using the pointer.

43. The method, as set forth in claim 40, further comprising:

receiving a search reply message including a uniform resource locator to a web page containing an image of the selected vehicle; and displaying the web page specified by the uniform resource locator.

* * * * *